(12) United States Patent
Kittaka et al.

(10) Patent No.: US 6,968,096 B2
(45) Date of Patent: Nov. 22, 2005

(54) DIFFRACTION DEVICE USING PHOTONIC CRYSTAL

(75) Inventors: Shigeo Kittaka, Osaka (JP); Kazuaki Oya, Osaka (JP); Keiji Tsunetomo, Osaka (JP); Vladimir V. Serikov, Somerset, NJ (US)

(73) Assignee: Nippon Sheet Glass Co., Ltd., Osaka (JP)

( * ) Notice: Subject to any disclaimer, the term of this patent is extended or adjusted under 35 U.S.C. 154(b) by 61 days.

(21) Appl. No.: 10/623,448

(22) Filed: Jul. 18, 2003

(65) Prior Publication Data

US 2005/0013541 A1 Jan. 20, 2005

(51) Int. Cl.[7] ............................................. G02F 1/295
(52) U.S. Cl. ............................ 385/10; 385/37; 385/47
(58) Field of Search ............................. 385/10, 9, 14, 385/15, 16, 31, 33, 36, 37, 47

(56) References Cited

U.S. PATENT DOCUMENTS

| 6,591,035 B2 * | 7/2003 | Miller et al. ................ 385/24 |
| 6,735,368 B2 * | 5/2004 | Parker et al. ............... 385/122 |
| 2001/0012149 A1 * | 8/2001 | Lin et al. ..................... 359/344 |
| 2001/0026659 A1 * | 10/2001 | Sekine et al. ................. 385/40 |
| 2003/0214700 A1 * | 11/2003 | Sidorin et al. .............. 359/334 |

FOREIGN PATENT DOCUMENTS

| GB | WO 98/53351 | * 11/1998 | ............ G02B/6/12 |
| JP | 2002-174740 A | 6/2002 | |

OTHER PUBLICATIONS

Miura, Toru et al., "Propagation Characteristics of Hollow Optical Waveguide for Temperature–Insensitive Photonic Integrated Circuits," 8th *Microoptics Conference (MOC '01)*, Osaka, Japan, Oct. 24–26, 2001, pp. 52–55.

* cited by examiner

*Primary Examiner*—Frank G. Font
*Assistant Examiner*—Kianni C. Kaveh
(74) *Attorney, Agent, or Firm*—Crompton, Seager & Tufte, LLC

(57) ABSTRACT

A diffraction device using a photonic crystal includes a diffraction grating, which has a period and periodically divides electromagnetic waves, and an input medium and an output medium, which contact the diffraction grating. The input medium is air, and the output medium is a one-dimensional layer having a periodic characteristic in a single direction (Z axis direction). The photonic crystal is formed by a periodic multilayer film having a period corresponding to the sum of the thickness of a first substance and the thickness of a second substance, which are superimposed. The diffraction device drastically decreases the resolution corresponding to the difference of the separated frequencies.

21 Claims, 42 Drawing Sheets

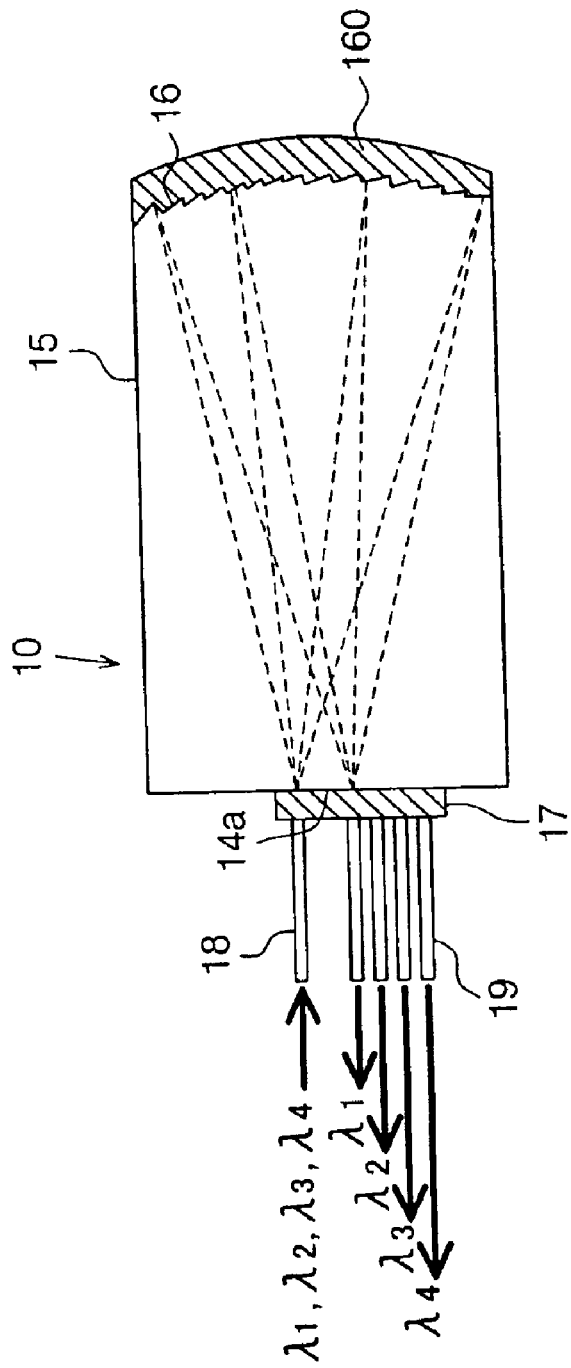
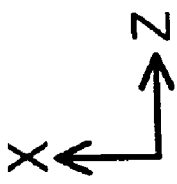
Fig.1

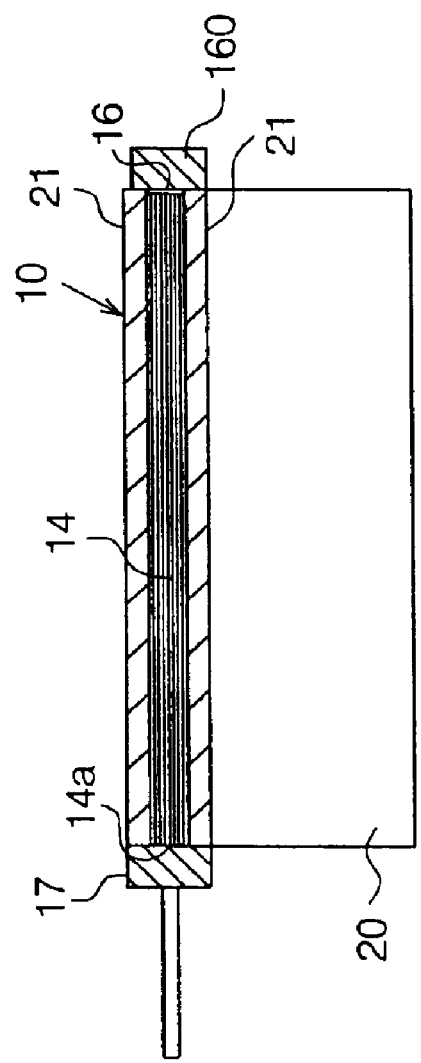
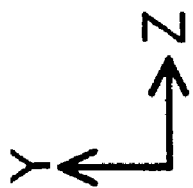
Fig.2

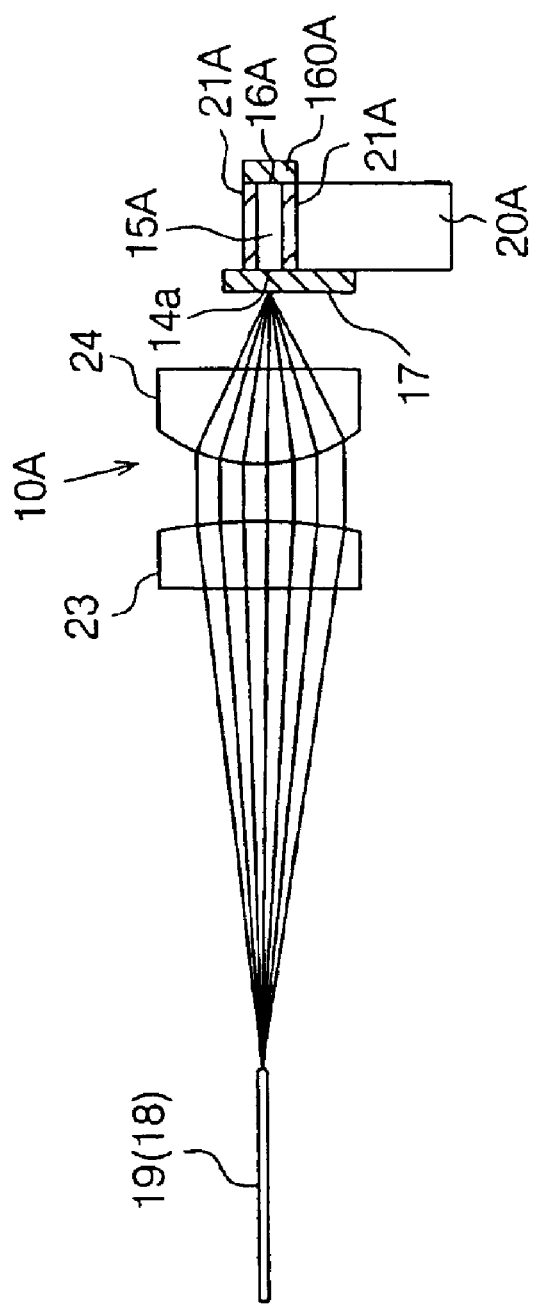
Fig.4
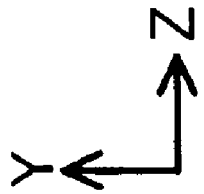

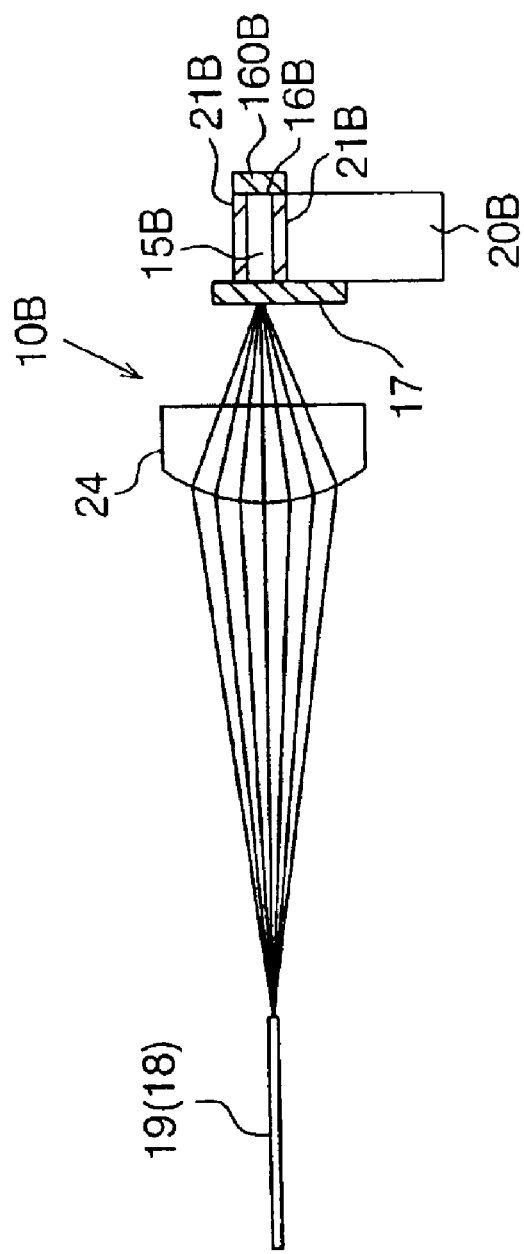
Fig.6
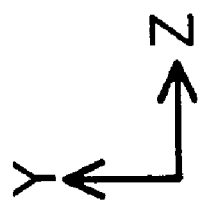

Fig. 28 Output light intensity depending on position of ridges and valley shape on end surface

DIFFRACTION DEVICE USING PHOTONIC CRYSTAL

BACKGROUND OF THE INVENTION

The present invention relates to a diffraction device, such as a spectroscope or a diffraction grating, for use in a spectral composition separating device, such as a demultiplexer, that separates an electromagnetic wave in accordance with differences in frequency.

When periodically dividing the wave front of an electromagnetic wave for light or the like, it is well known that phase differences produce diffraction waves. Thus, a diffraction grating for periodically dividing the wave front of an electromagnetic wave is widely used in spectroscopes or a diffraction lenses. In recent years, rapid progress has been made in the field of optical communication with technology for dense wavelength division multiplexing (DWDM). In this field, a diffraction grating is widely used since signals having very close wavelengths must be split or coupled. In addition to having a high resolution, the demultiplexer and multiplexer must be compact and inexpensive.

When dividing light having different frequencies with a diffraction grating, the resolution $\lambda_0/\Delta\lambda$ is represented as $\lambda_0/\Delta\lambda = mN$. In the equation, $\lambda_0$ represents the center wavelength, $\Delta\lambda$ represents the resolved wavelength difference, m represents the order of the diffraction wave, and N represents the number of steps (refer to "Applied Optics" Tadao Tsuruta, Baifuukan 1990).

As apparent from the above equations, there are two ways to increase resolution, one of which is increasing the number of steps and the other of which is using higher order diffraction wave.

The lower limit of the diffraction grating period is about the same as the wavelength. Thus, increasing the number of steps to improve resolution enlarges the device size and makes the production of a flawless diffraction grating difficult. Accordingly, the diffraction grating is formed in a blazed profile to strengthen one high order diffraction wave. Further, there is a device with an increased order diffraction wave, or a device that uses a diffraction wave having a higher order, such as an arrayed waveguide grating (AWG). In an AWG, a wave front is divided and guided to different waveguides. The waveguides have different lengths to form an extremely large optical path length difference. This enables diffraction wave having a high order, such as 30th order, to be easily obtained.

In DWDM, wavelengths having, for example, a center wavelength $\lambda_0$ of 1550 nm and an interval of $\Delta\lambda=0.8$ nm (the frequency interval being 100 GHz) must be separated. In such a case, $\lambda_0/\Delta\lambda=1937.5=mN$ is required. However, when using this mN value, a large amount of cross talk is produced. Thus, in the actual demultiplexer, mN=8000 is required to sufficiently decrease the cross talk between adjacent frequencies.

To achieve mN=8000, the number of steps is 8000 for a 1st order diffraction grating, and a diffraction grating having the size of 16 mm is required even if the grating period is 2 $\mu$m, for an AWG using 32 degree diffraction wave, the optical path length difference between adjacent waveguides is 1.55×32=49.6 ($\mu$m). The number of steps is 8000/32=250. Thus, the total optical path length difference reaches 49.6× 250=12400 ($\mu$m). To ensure such optical path length difference, the size of the AWG reaches 20 to 30 mm.

When a diffraction device, such as an AWG, is enlarged, manufacturing becomes difficult, manufacturing costs increase, and characteristic changes resulting from temperature increase.

Accordingly, it is an object of the present invention to provide a diffraction device that decreases the value of resolution ($\lambda_0/\Delta\lambda$), which corresponds to the difference between the separated frequencies, and uses a photonic crystal that reduces the size or improves the resolution.

SUMMARY OF THE INVENTION

To achieve the above object, the present invention provides a diffraction device for periodically dividing electromagnetic waves including a diffraction grating, an input medium contacting the diffraction grating, and an output medium contacting the diffraction grating. At least either one of the input medium and output medium includes a photonic crystal having a periodic characteristic in single direction (condition 1), or the diffraction grating comprising a photonic crystal, which periodically divides electromagnetic waves to produce a phase difference in a wave front with differences in propagation distances between the divided electromagnetic waves (condition 2).

In condition 1, at least either one of the input medium and output medium includes a photonic crystal in which the wavelength of a wave that propagates relative to a frequency of an electromagnetic wave changes significantly. Thus, the value $\lambda_0/\Delta\lambda$ of the resolution corresponding to the separated frequency difference is drastically decreased from that of the conventional diffraction grating. Accordingly, the product mN of the order of the required diffraction wave m and the number of steps N is small. This reduces the size of the diffraction grating and improves frequency resolution.

In condition 2, the diffraction grating periodically divides electromagnetic waves to produce a phase difference in a wave front, and the diffraction grating includes a photonic crystal in which a wavelength that propagates changes significantly relative to a change of frequency. This drastically decreases the optical path length required to produce a constant phase difference in comparison with a conventional diffraction grating. Accordingly, the size of the diffraction grating is reduced and the resolution is improved.

The photonic crystal satisfies the condition of $$2 \leq |(\Delta\lambda/\lambda_0)/(\Delta\omega/\omega_0)|,$$

whereas $\lambda_0$ represents the period of a propagating wave when an electromagnetic wave having frequency $\omega_0$ propagates in a certain direction in the photonic crystal, and $\lambda_0+\Delta\lambda$ represents the wavelength of the propagating wave relative to an electromagnetic wave having a frequency of $\omega_0+\Delta\omega$ when the frequency $\omega_0$ is changed by a slight amount.

In condition (1), a photonic crystal having a large dispersion is used on at least one side of the diffraction grating to obtain an angular difference greater than that of a diffraction grating having two sides formed by a homogeneous medium. To sufficiently achieve this effect, the absolute value of $(\Delta\lambda/\lambda_0)/(\Delta\omega/\omega_0)$, that is, the absolute value of constant K, which represents the level of dispersion of the photonic crystal defined by the following equation is 2 or greater:

$$(\Delta\lambda/\lambda_0) = -K(\Delta\omega/\omega_0)$$

This reduces the size of the diffraction grating and improves resolution.

When condition (2) is satisfied, the absolute value of $(\Delta\lambda/\lambda_0)/(\Delta\omega/\omega_0)$, that is, the absolute value of constant K, which represents the level of dispersion of the photonic crystal is 2 or greater. This reduces the size of the diffraction grating and improves resolution. When propagating an electromagnetic wave having a different frequency in a photonic crystal that satisfies the condition of the absolute value of the constant K being 2 or greater, the phase difference generated for a constant optical path length difference is much greater than when the diffraction grating is formed by a homogeneous medium. This drastically decreases the size of the diffraction grating for obtaining the same optical path length difference.

The photonic crystal configuring at least either one of the input medium and the output medium uses end surfaces perpendicular to the periodic direction of the photonic crystal as an input surface and an output surface, and the electromagnetic wave entering the input surface is propagated by a photonic band that exits in the vicinity of a photonic band gap in the photonic crystal.

In this structure, when an electromagnetic wave is input to the input surface of the photonic crystal that is perpendicular to the periodic direction, there is a frequency range in which a photonic band does not exist periodically in the propagation direction of the electromagnetic wave, or a photonic band gap. The change in the wavelength of the electromagnetic wave (wavelength of the propagation wave) relative to a change in the frequency increases near the photonic band gap. Thus, by using the proximal frequency range for the propagation of an electromagnetic wave, a compact demultiplexing device having a resolution, which corresponds to the difference between the separated frequencies, that is drastically reduced from that of a conventional diffraction grating is obtained.

The photonic crystal uses end surfaces from which the periodic characteristic is exposed as an input surface and an output surface, and in the photonic crystal, the electromagnetic wave entering the input surface is propagated by either one of a photonic band existing on a Brillouin zone boundary line of a photonic band structure or in the vicinity of the Brillouin zone boundary line, and a photonic band existing on a central line of a photonic band structure or in the vicinity of the central line.

In this structure, a photonic band existing on or near a Brillouin zone boundary line of a photonic band structure is used for the propagation of an electromagnetic wave to obtain high degree band propagation wave that advances in the Z axis direction, which is perpendicular to the periodic direction, in the photonic crystal. In the high degree band propagation wave, a "large change resulting from the wavelength of an effective refractive index" or a "group velocity abnormality" occurs. Such characteristics are used to manufacture an optical device, such as a light delaying device or a dispersion compensating device for optical communication, without decreasing the efficiency or S/N ratio of the incident wave energy. Further, when using a photonic band existing on or near the Brillouin zone boundary, the amplitudes of adjacent electric fields are equal. Thus, the confinement effect is large. In a photonic band structure, even if the photonic band used for the propagation of an electromagnetic wave exists on the Brillouin zone central line or near the central line, the same effects as when the photonic band exists on or near the boundary are obtained.

The photonic crystal uses an end surface parallel in the periodic direction of the photonic crystal as an input surface and an output surface. The diffraction device further includes an input phase modulating unit for generating a phase modulation wave having a period that is the same as or two times the period of the photonic crystal, wherein the input phase modulating unit is arranged contacting, near, or integrally with the input surface.

In this structure, when using the photonic band existing on the Brillouin zone central line or near the central line in the photonic band structure for the propagation of an electromagnetic wave, for a photonic crystal having period a, when inputting an appropriate phase-modulated wave having period a in the same direction, only propagation wave belonging to a certain high degree band is obtained. When using the photonic band existing on or near the Brillouin zone boundary in the photonic band structure for the propagation of an electromagnetic wave, it is preferred that a photonic crystal having period 2a in the same direction be input. Accordingly, a high degree band propagation wave using a photonic band on or near the Brillouin zone boundary or a photonic band propagation wave on or near the central line of the Brillouin zone is efficiently generated in the photonic crystal.

The phase modulating unit is a phase grating having a period that is the same as or two times the period of the photonic crystal.

The diffraction device further includes an output phase modulating unit for converting wave output from the photonic crystal to a plane wave. The output phase modulating unit is arranged contacting, near, or integrally with the output surface.

In this structure, the output wave from the photonic crystal is returned to a plane wave. This facilitates coupling with optical fibers.

The photonic crystal has an inclined input surface or inclined output surface that is inclined relative to the periodic direction of the photonic crystal, and inputs a plane wave to the inclined input surface or outputs a plane wave from the inclined output surface.

In this structure, incident wave enters the inclined input surface of the photonic crystal. This results in a propagation wave on the Brillouin zone boundary and efficiently forms high degree band propagation wave using a band on the Brillouin zone in the photonic crystal. When the propagation wave in the photonic crystal is output from the inclined output surface of the photonic crystal, the output wave is returned to a plane wave. This facilitates coupling with optical fibers or the like.

An end surface of the photonic crystal, configuring at least either one of the input medium and the output medium, includes a reflective diffraction grating that periodically divides the electromagnetic wave, and an electromagnetic wave including a plurality of frequency components, is input to the photonic crystal, with the reflective diffraction grating producing diffracted wave for each of the plurality of frequency components of the electromagnetic wave in different directions.

In this structure, by using propagation wave resulting from the high degree band, the photonic crystal causes the wavelength dispersion (K value having large absolute value) to be extremely large. Thus, in comparison to when forming the input medium and the output medium with a homogeneous medium, the resolution $\lambda_0/\Delta\lambda$ corresponding to the difference of the separated frequency is drastically decreased. This shortens the reflective grating size. Thus, the diffraction device of a demultiplexer/multiplexer may be very compact.

The input medium and the output medium are configured by the photonic crystal and as a waveguide having an input surface parallel to the periodic direction of the photonic crystal. The reflective diffraction grating is a blazed reflective diffraction grating arranged in an end surface of the waveguide. The diffraction device is configured as a demultiplexer for outputting the electromagnetic wave, which includes the plurality of frequency components input from the input surface of the waveguide, with the blazed reflective diffraction grating from the input surface as diffraction waves in different directions for each frequency component to couple the electromagnetic wave with a separate electromagnetic wave detection portion or the waveguide.

In this structure, the blazed reflective diffraction grating (reflective blazed grating) performs the splitting and converging of wave simultaneously through diffraction. Thus, it not necessary to have the input surface of the waveguide formed in a convex lens-like manner or provide a lens element having a convex lens effect to input wave to the input surface. This simplifies the structure of the multiplexer.

The diffraction device further includes a lens element having a convex lens effect to input the electromagnetic wave including the plurality of frequency components to the input surface of the waveguide configured by the photonic crystal as parallel light bundle. Electromagnetic waves of the waveguide configured by the photonic crystal and output in different direction for each frequency component, are collected by the lens element or another lens element and coupled with the wave detector when used there with or the waveguide.

In this structure, the distance from a waveguide of an optical fiber, which transmits incident wave, or a separate electromagnetic wave detection portion to a waveguide formed by a photonic crystal may be changed as required. This increases the freedom of design.

The input surface of the waveguide configured by the photonic crystal is a convex lens-like input surface. The electromagnetic waves include the plurality of frequency components being input to the waveguide as a parallel light bundle produced by the convex lens-like input surface. A collected light bundle produced by the input surface of the convex lens-like surface from the electromagnetic wave output from the photonic crystal in a different direction, for each frequency component, is coupled with the wave detector or the waveguide.

In this structure, the input surface of the waveguide formed by the photonic crystal is an input lens surface having a positive lens effect. Thus, the lens element for inputting an electromagnetic wave as a parallel light bundle to the input surface of the waveguide formed by the photonic crystal is not necessary and simplifies the structure. An input surface having a positive lens effect includes a convex lens shape and a concave lens shape. This is because the effective refractive index in the photonic crystal may be 1 or less. In such a case, the positive lens effect may not be obtained even if the input surface has a convex lens shape.

The blazed reflective diffraction grating has a concave mirror-like diffraction grating surface and collects electromagnetic waves separated into frequency components with the concave mirror-like diffraction grating surface and outputs the collected electromagnetic waves from the waveguide configured by the photonic crystal.

In this structure, the blazed reflective grating has a concave mirror-like diffraction grating surface and thus simultaneously performs the splitting of an electromagnetic wave propagated through the photonic crystal into frequency components of diffracted wave in different directions due to diffraction and the converging of the split frequencies in the waveguide of the corresponding separate electromagnetic wave detection portion or output optical fiber.

The waveguide configured by the photonic crystal and having the input surface is a slab waveguide.

In this structure, a waveguide in which an incident wave and a diffraction wave of the reflective diffracted grating propagate is a slab waveguide formed by a photonic crystal. This reduces the size and improves the resolution of the diffraction device that forms a multiplexer or a demultiplexer.

The diffraction device further includes an input phase modulating unit for generating a phase modulation wave having a period that is the same as or two times the period of the photonic crystal. The input phase modulating unit is arranged contacting, near, or integrally with the input surface of the waveguide configured by the photonic crystal.

The input phase modulating unit is a phase grating having a period that is the same as or two times the period of the photonic crystal.

The diffraction device further includes an array waveguide grating including an input slab waveguide connected to the input waveguide, an output slab waveguide connected to output waveguide, and an arrayed waveguide connected between the two slab waveguides and generating an optical path length difference. The arrayed waveguide comprised of the photonic crystal as the diffraction grating that periodically divides electromagnetic waves and produces a phase difference of the divided electromagnetic waves.

In this structure, the arrayed waveguide is formed by the photonic crystal in which the wavelength of the propagated wave relative to the frequency of the electromagnetic wave changes drastically, that is, when the wavelength difference is K times greater the frequency difference. This drastically decreases the difference in the optical propagation distance required to produce a specific phase difference in comparison to a conventional arrayed waveguide grating (AWG). Accordingly, in the arrayed waveguide grating, the size of the arrayed waveguide is reduced and the resolution is improved.

The arrayed waveguide includes a plurality of waveguides, each comprised of the photonic crystal. Adjacent waveguides have different lengths.

In this structure, the length of the arrayed waveguide is drastically shortened to obtain the same optical path length difference. As a result, the size of the entire arrayed waveguide grating (AWG) is reduced and the resolution is improved.

The arrayed waveguide includes a plurality of waveguides, each comprised of the photonic crystal with adjacent waveguides having the same length, and by changing the period, material, or configuration of the photonic crystal comprising each of the waveguides, an optical path length difference is produced between adjacent waveguides.

In this structure, each waveguide of the arrayed waveguide may be formed in a linear manner. Further, by changing the period, material, or structure, for example, the wavelength dispersion of each waveguide, of the photonic crystal forming each of the waveguides, a predetermined optical path length difference is produced between adjacent waveguides. Thus, the entire structure of the diffraction device, which serves as the arrayed waveguide grating (AWG), is linear. This facilitates the manufacturing of a device using the AWG.

The diffraction device further includes an input phase modulating unit for generating a phase modulating wave having a period that is the same as or two times the period of the photonic crystal configuring the arrayed waveguide. The phase modulating unit is arranged contacting, near, or integrally with one of the input surface of the input waveguide, the input surface of the input slab waveguide, and the input surface of the arrayed waveguide.

In this structure, most of the propagation wave in the input slab waveguide is efficiently used to generate a high degree band propagation wave in the arrayed waveguide.

The diffraction device further includes an output phase modulating unit for converting wave output from the arrayed waveguide to a plane wave. The output phase modulating unit is arranged contacting, near, or integrally with one of the output surface of the output waveguide, the output surface of the output slab waveguide, and the output surface of the arrayed waveguide.

In this structure, the wave output from the arrayed waveguide to the output slab waveguide is returned to a front wave from high degree band propagation wave.

The phase modulating unit is a phase grating having a period that is the same or two times the period of the photonic crystal configuring the arrayed waveguide.

The photonic crystal is a multilayer body in which dielectric bodies having different refractive indices are superimposed in periods that are about the same as the wavelength of light.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a plan view showing the structure of a diffraction device according to a first embodiment of the present invention;

FIG. 2 is a partial cross-sectional side view of the diffraction device of FIG. 1;

FIG. 4 is a partial cross-sectional side view of the diffraction device of FIG. 3;

FIG. 6 is a partial cross-sectional side view of the diffraction device of FIG. 5;

DETAILED DESCRIPTION OF THE PREFERRED EMBODIMENTS

Preferred embodiments of the present invention will now be discussed with reference to-the drawings.

Before describing a diffraction device that uses a photonic crystal, the resolution ($\lambda_0/\Delta\lambda$) of the diffraction grating will now be discussed.

[Resolution of Diffraction Grating]

A diffraction grating has a phase difference produced by arranging periodic stepped portions in its refraction surface or reflection surface. The input side and output side of the diffraction grating are formed by homogeneous mediums such as glass or air.

An example in which the diffraction device separates an electromagnetic wave having a center frequency of $\omega_0$ and a slight frequency difference of $\Delta\omega$ will now be discussed. As described above, the resolution of the diffraction grating is represented by $\lambda_0/\Delta\lambda=mN$. Since the refractive index is constant for a vacuum, the following equation is satisfied:

$$\Delta\lambda/\lambda_0 = -\Delta\omega/\omega_0 \quad \text{(equation 1)}$$

Even if the medium is glass or the like, the refractive index relative to the slight frequency difference $\Delta\omega$ hardly changes. Thus, the relationship of equation 1 is substantially satisfied. Accordingly, the product of the order m (hereinafter referred to as diffraction order) of the diffraction wave and the number of steps N (mN value) that is necessary to guarantee the resolution is:

$$mN = |\omega_0/\Delta\omega| \quad \text{(equation 2)}$$

Due to the unique photonic band structure in the photonic crystal, the period of the propagation wave changes greatly relative to the frequency difference $\Delta\omega$. That is, it is known that the photonic crystal has a unique dispersion characteristic in which the wavelength of the propagating wave relative to the frequency of the electromagnetic wave changes greatly. Constant K is defined as a value representing the level of dispersion through the following equation:

$$\Delta\lambda/\lambda_0 = -K(\Delta\omega/\omega_0) \quad \text{(equation 3)}$$

For a normal homogeneous medium having small dispersion, K is substantially equal to 1. By using the value of K, the product of the diffraction order m and the number of steps N that is required to ensure the resolution is represented by:

$$mN = \lambda_0/\Delta\lambda = |(\omega_0/\Delta\omega)/K| \quad \text{(equation 4)}$$

When comparing equation 2 and equation 4, it is apparent that the mN value necessary for ensuring the same frequency resolution ($\omega_0/\Delta\omega$) decreases to $|1/K|$ by using a photonic crystal having an absolute value of K that is greater than that of a homogeneous medium.

Figure 12:
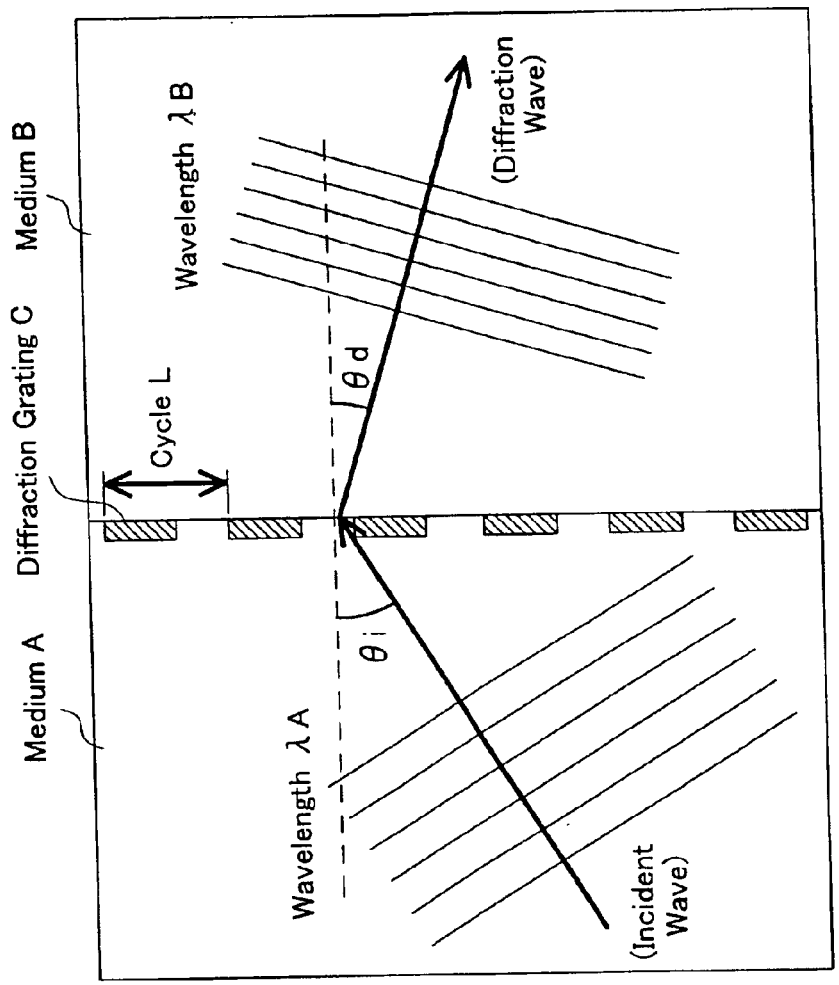
FIG. 12 is a schematic diagram illustrating the resolution of the diffraction grating.

FIG. 12 is a schematic diagram showing an example in which a wave front (incident wave) having frequency $\omega_0$ enters a diffraction grating C having period L. In FIG. 12, the wavelength of the incident wave propagated through an input side medium A is represented by $\lambda A$, the incident angle of the wave front entering an output side medium B is represented by $\theta i$, the wavelength of the incident wave that is propagated through the medium B as diffraction wave by a diffraction grating C is represented by $\lambda B$, and the diffraction angle is represented by $\theta d$. The relationship between the incident angle and the diffraction angle is represented by the following equation:

$$\sin\theta d/\lambda B - \sin\theta i/\lambda A = m/L \quad \text{(equation 5)}$$

In the above equation, m represents the diffraction order.

When representing the values of constant K defined in equation 3 for the medium A and medium B with KA and KB, with respect to the frequency $\omega_0(1-s)$, the period of the wavelength of the incident wave that propagates through the medium A is represented by $\lambda A(1+KA \cdot s)$, and the period of the wavelength of the wave front that propagates through the medium B is represented by $\lambda B(1+KB \cdot s)$.

The absolute value of s is much smaller than 1, and KA and KB may be considered as constant values.

When the incident wave of the frequency $\omega_0$ and $\omega_0(1-s)$ enter at the same angle $\theta i$, the diffraction angles are represented by $\theta d$ and $\theta d'$, respectively, the following is obtained from equation 5.

$$\sin\theta d = (m/L)\lambda B + (\lambda B/\lambda A)\sin\theta i; \text{ and}$$

$$\sin\theta d' = (m/L)\lambda B(1+sKB) + (\lambda B/\lambda A)\{(1+skb)/(1+sKA)\}\sin\theta i$$

If $\Delta\sin\theta d = \sin\theta d' - \sin\theta d$ is satisfied, the following equation is obtained:

$$\Delta\sin\theta d = s(m\lambda B/L)KB + s(\lambda B/\lambda A)\sin\theta i\{(KB-KA)/(1+sKA)\}.$$

When simplifying s since it is small, the following equation is obtained:

$$\Delta\sin\theta d = s(m\lambda B/L)KB + s(\lambda B/\lambda A)\sin\theta i(KB-KA) \quad \text{equation 6}$$

The term $\Delta\sin\theta d$ in equation 6 will hereinafter be referred to as angular difference. A larger absolute value of the angular difference improves the resolution of the diffraction grating (i.e., the resolution when splitting light having different frequencies with the diffraction grating).

In equation 6, the angular difference is the sum of the portion related to diffraction (first term, hereinafter referred to as the diffraction term) and the portion related to refraction (second term, hereinafter referred to as the refraction term).

In the structure of FIG. 12, with respect to the angular difference Δ sin θd, the following examples may be given.

(a) When medium A and medium B are both homogeneous mediums having small dispersions, KA=KB=1 is satisfied. Thus Δ sin θd=s (mλB/L) is satisfied. This value represents the angular difference with a normal diffraction grating.

(b) When medium A is a homogeneous medium having a small dispersion, and medium B is a photonic crystal having a large dispersion, KA=1 is satisfied. Thus, the following equation is satisfied:

Δ sin θd=s(mλB/L)KB+s(λB/λA)sin θi(KB−1)

When |KB|>1 is satisfied. Thus, when the condition of example (a) is satisfied, the angular difference based on the diffraction term becomes greater than the angular difference based on the normal diffraction grating. Positive and negative values may be selected for the diffraction order m to match the refraction term and the diffraction term to negative or positive values. This enables the absolute value of the angular difference to be greater than the normal diffraction grating.

(c) When medium B is a homogeneous medium having a small dispersion, and medium A is a photonic crystal having a large dispersion, KB=1 is satisfied. Thus, the following equation is satisfied:

Δ sin θd=s(mλB/L)+s(λB/λA)sin θi(1−KA)

The diffraction term is the same as in the above example (a), and the dispersion effect of the photonic crystal is not obtained. However, the absolute value of the refraction term increases. Therefore, the positive and negative values may be selected for the diffraction order m so that the absolute value of the angular difference becomes greater than the normal diffraction grating.

(d) When the medium A and medium B are photonic crystals having the same large dispersion, KA=KB=K is satisfied. Thus, the following equation is satisfied:

Δ sin θd=s(mλB/L)K

Although the refraction term disappears, as long as |K|>1 is satisfied, the angular difference of the diffraction term is greater than in the above condition (a).

(e) When the medium A and medium B are photonic crystals having large dispersions different from each other, the angular difference remains the same as in equation 6. As described above, a larger |KB| is effective for increasing the absolute value of the diffraction term. However, the refraction term may also be increased depending on the combination of KA and KB. Thus, this enables the absolute value of the angular difference obtained from the two values to be further increased.

As described in the above examples (b) to (e), the first feature of the present invention is a diffraction device including the diffraction grating C and at least one of the medium A and medium B arranged adjacent to the diffraction grating C being formed from a photonic crystal having a large dispersion. Such a structure achieves an angular difference that is greater than that of the normal diffraction device and improves the frequency resolution ($\omega_0/\Delta\omega$) of the diffraction grating. To fully make use of such advantages of the present invention, it is preferred that the absolute value of K be 2 or greater. In other words, it is preferred that the following condition be satisfied:

2≤|K|=|(Δλ/λ$_0$)/(Δω/ω$_0$)|

If the absolute value of K is 2 or less, the reduction in size is difficult and the resolution improvement effect is too small in comparison to when using a diffraction device of a normal homogeneous medium.

Further, it can easily be understood that when propagating an electromagnetic wave having different frequencies in a photonic crystal having a large absolute value for K, the phase difference produced for each certain optical path length is much greater than that of a normal homogeneous medium having a small dispersion. A second feature of the present invention is a diffraction grating like the arrayed waveguide in the arrayed waveguide grating (AWG), that is, the diffraction device including the photonic crystal formed by a diffraction grating that produces a phase difference in the wave front with the difference between optical propagation distances of the divided electromagnetic wave. Such structure drastically shortens the length of the arrayed waveguide.

[First Embodiment]

A diffraction device using a photonic crystal according to a first embodiment of the present invention will now be discussed with reference to FIGS. 1 and 2.

A diffraction device 10 using a photonic crystal shown in FIGS. 1 and 2 is embodied in a multiplexer/demultiplexer having the first feature of the present invention and has a structure corresponding to example (d).

The diffraction device 10 includes a slab waveguide 15, which is a slab waveguide made by the photonic crystal, formed by a primary photonic crystal 14 having a periodic characteristic in the Y axis direction.

The slab waveguide 15 has an end surface that is parallel to the periodic direction (Y axis direction) of the photonic crystal 14. In other words, the slab waveguide 15 has an exposed end surface having a periodic characteristic that serves as an input and output surface 14a.

The other end surface of the slab waveguide 15, or the end surface of the photonic crystal 14 opposite to the input surface 14a has an arcuate reflective blazed grating (blazed reflective diffraction grating) 16, which functions as a diffraction grating for periodically dividing the electromagnetic wave.

The input surface 14a of the slab waveguide 15 has a phase grating 17 for improving the coupling efficiency of the wave front propagated through a homogeneous medium (incident wave) and a propagation wave in the photonic crystal 14. A single input optical fiber 18, which is single-mode optical fiber, and a plurality of output optical fibers 19 are connected to the outer surface of the phase grating 17.

An incident wave (wave front), in which a plurality of optical signals (λ1 to λ4) are multiplexed, is transmitted as an electromagnetic wave including a plurality of frequency components in the input optical fiber 18. The incident wave from the end of the input optical fiber 18 enters the slab waveguide 15 through the input surface 14a via the phase grating 17. Further, the light entering the slab waveguide 15 is propagated by the high degree band in the photonic crystal 14. The high degree propagation wave is reflected by the reflective blazed grating 16 and diffracted. This splits the light in accordance with each frequency. The diffraction of the reflective blazed grating 16 guides each frequency of the split high degree band propagation wave to a corresponding output optical fiber 19, where the frequencies are coupled, via the phase grating 17. The phase grating 17 will be discussed later.

In this manner, the reflective blazed grating 16, which has a concave mirror-like diffraction grating surface, functions to simultaneously split the diffracted wave propagated in a different direction for each of the frequency components through diffraction and converge light by guiding the split frequencies to the output optical fiber 19.

The surface of the reflective blazed grating 16 has electric field patterns that differ alternately as will be described later. Thus, it is difficult for the light to leak externally from the surface. Accordingly, the surface of the reflective blazed grating 16 may serve as a reflective surface. However, in the first embodiment, a reflective layer 160, such as a metal layer, is applied to the surface to ensure that light does not leak from the surface.

The photonic crystal 14 that forms the slab waveguide 15 is a periodic multilayer film applied to an upper surface of a substrate 20. A reflective layer 21, which is a metal layer, is applied to each of the two surfaces on each side of the photonic crystal 14 in the Y axis direction. The reflective layers 21 confine the light that propagates through the photonic crystal 14 in the vertical direction (Y axis direction) as viewed in FIG. 5 so that the light does not leak externally from the upper surface and toward the substrate from the lower surface.

Due to the high degree band propagation wave, the photonic crystal 14 of the diffraction device 10 has an extremely high wavelength dispersion (K value having a large absolute value). In the first embodiment, the photonic crystal 14 has a constant K, which represents the level of the dispersion (equation 3), with an absolute value of 2 or greater. In other words, the first embodiment satisfies the following condition:

$$2 \leq |K| = |(\Delta\lambda/\lambda_0)/(\Delta\omega/\omega_0)|$$

When the absolute value of K is 2 or less, in comparison to a diffraction grating having a normal homogeneous medium, the effect for reducing size or improving the frequency resolution ($\omega_0/\Delta\omega$) is small. Thus, it is preferred that the absolute value be 2 or greater.

In the first embodiment, the plurality of output optical fibers 19 each function as an electromagnetic wave detector or a waveguide.

The first embodiment has the advantages described below.

The slab waveguide 15 serves as an input medium contacting the reflective blazed grating 16, which functions as a diffraction grating, and an output medium. The slab waveguide 15 is formed by a one-dimensional photonic crystal having a period characteristic in a single direction (Y axis direction) in which the wavelength of a wave propagated relative to the frequency of the incident wave changes greatly. Thus, an angular difference larger than the normal diffraction device is obtained in the same manner as in the above example (a). Further, the resolution ($\lambda_0/\Delta\lambda$) corresponding to the frequency of the separated frequencies is drastically decreased. Accordingly, the product of the order m required by the refraction light and the number of steps N may be small. This enables the reflective blazed grating 16 to have a reduced size and improved resolution.

The photonic crystal 14 satisfies the condition in which the absolute value of the constant K representing the level of dispersion is 2 or greater so that as described in the above example (d), the angular difference of the diffraction term is greater than the normal diffraction device as described in the above example (a). This enables the reflective blazed grating 16 to have a reduced size and improved resolution.

The photonic crystal 14 using the slab waveguide 15 uses a high degree band propagation wave so that it has an extremely large wavelength dispersion (i.e., large absolute value for the K value). Thus, in comparison to when the slab waveguide 15 is formed by a homogeneous medium, the reflective blazed grating 16 is shortened. This enables the diffraction device 10A, which is embodied in a multiplexer/demultiplexer, to have a reduced size and improved frequency resolution ($\omega_0/\Delta\omega$).

As described above, the reflective blazed grating 16 performs diffractive splitting and converging simultaneously. Thus, it is not necessary to form the input surface 14a of the slab waveguide 15 into a shape that achieves a positive lens effect like that of a convex lens. Further, it is not necessary to provide a lens element that achieves the normal lens on the input surface 14a for the entering light. This simplifies the structure of the multiplexer/demultiplexer.

The reflective layers 21 are formed on each side surface of the photonic crystal 14 that forms the slab waveguide 15 in the Y axis direction. The reflective layers 21 prevent wave propagating through the photonic crystal 14 from leaking out of the surfaces arranged in the Y axis direction. Accordingly, the wave propagating through the photonic crystal 14 is confined in the vertical direction (Y axis direction) to achieve a multiplexer/demultiplexer that decreases loss.

The input surface 14a of the photonic crystal 14 that forms the slab waveguide 15 has the phase grating 17, which improves the efficiency for coupling the incident wave that propagates through the homogeneous medium (in the first embodiment, the input optical fiber 18) and the high degree band propagation wave in the photonic crystal 14. Thus, most of the incident wave energy is used for the high degree band propagation wave, and the output wave from the slab waveguide 15 is returned to a plane wave. This facilitates the connection of the optical fibers 18 and 19 with the slab waveguide 15 with a high coupling efficiency.

The surface of the reflective blazed grating 16 is covered with a metal layer, such as the reflective layer 160. Thus, light is prevented from leaking out from the surface.

In FIGS. 1 and 2, the diffraction device 10 is used as a demultiplexer. However, the input side and the output side may be switched with each other to use the diffraction device 10 as a multiplexer.

[Second Embodiment]

A diffraction device using a photonic crystal according to a second embodiment of the present invention will now be discussed with reference to FIGS. 3 and 4.

Figure 3:
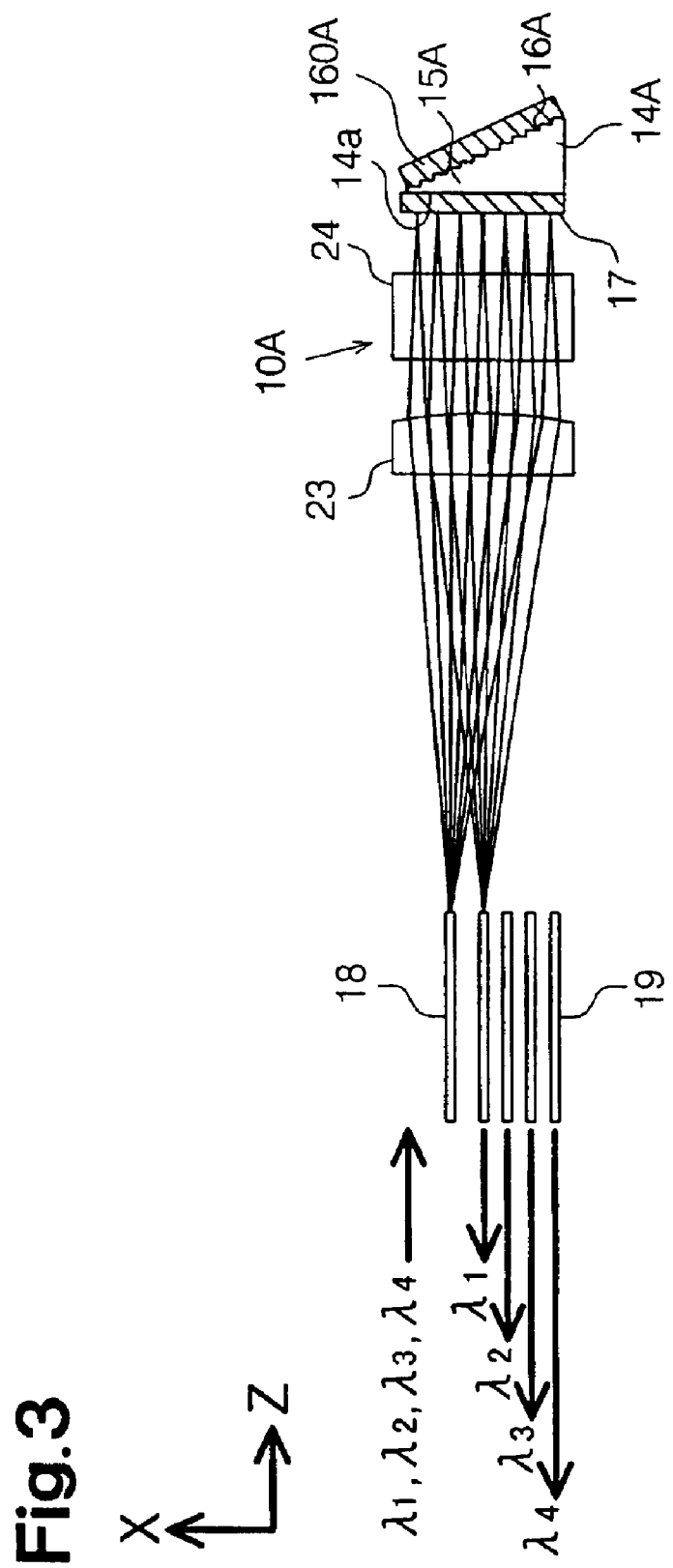
FIG. 3 is a plan view showing the structure of a diffraction device according to a second embodiment of the present invention.

A diffraction device 10A using a photonic crystal shown in FIGS. 3 and 4 is embodied in a multiplexer/demultiplexer having the first feature of the present invention and has a structure corresponding to example (d). In the description of the second embodiment, components that are the same as the corresponding components of the first embodiment are denoted with the same reference numeral and the alphabet "A" following the numeral. Such components will not be described.

In the first embodiment, the light (the light in which optical signals λ1 to λ4 having a plurality of frequencies are multiplexed) transmitted by the input optical fiber 18 enters the slab waveguide 15 from the end of the input optical fiber 18 through the input surface 14a via the phase grating 17. The incident wave is propagated by the high frequency band in the photonic crystal 14, reflected by the reflective blazed grating 16. The reflected wave is split by diffraction in accordance with frequency. The phase grating 17 forms a wave front with the high degree band propagation wave, which is divided in accordance with frequency, exiting the input surface 14a. The converging effect of the reflective blazed grating 16 guides each frequency to the corresponding output optical fiber 19 via the phase grating and couples the frequencies.

In comparison, the diffraction device 10A of the second embodiment includes lens elements having a positive lens effect that forms a beam with the incident wave transmitted by the input optical fiber 18 in the X axis direction and inputs the beam into the input surface 14a of the slab waveguide 15A that is formed by the photonic crystal 14A. A collimator lens 23 and a cylindrical lens 24, which function as the lens element are arranged between the phase grating 17 and the single input optical fiber 18 and the plurality of output optical fibers 19.

A reflective blazed grating 16A, which functions as a diffraction grating for periodically dividing an electromagnetic wave, differs from the reflective blazed grating 16 having a concave mirror-like diffraction grating surface in that it has a flat diffraction grating surface formed on the other end surface, which is flat, of the slab waveguide 15A. Thus, the reflective blazed grating 16A differs from the reflective blazed grating 16, which simultaneously performs the separation and conversion of light, in that only the separation of wave is performed through diffraction.

In the diffraction device 10A having such a structure, the light transmitted by the input optical fiber 18 is converted to a parallel beam in the X axis direction and a collected beam in the Y axis direction and input to the slab waveguide 15A from the input surface 14A via the phase grating 17. The input wave is propagated by the high degree band in the photonic crystal 14A. The high degree band propagation wave is reflected by the reflective blazed grating 16A and split in accordance with frequency by diffraction. The high degree propagation wave split in accordance with frequency is output from the input surface 14A of the slab waveguide 15A and converted to a simple wave by the phase grating 17. The converging effect of the cylindrical lens 24 and the collimator lens 23 guide each frequency of the output light, which is split in accordance with frequency and converted to a wave front, to the corresponding output optical fiber 19 and couples the frequencies.

Like the first embodiment, the second embodiment is advantageous in that it achieves a multiplexer/demultiplexer having a simple structure. The second embodiment additionally has the advantages described below.

The reflective blazed grating 16A has a flat diffraction grating surface and is thus easier to manufacture than the reflective blazed grating 16 of the first embodiment that has a concave mirror-like diffraction grating surface.

The distance between the phase grating 17 and the single input optical fiber and the plural output optical fibers may be adjusted by changing the focal distance between the collimator lens 23 and the cylindrical lens 24. This increases the freedom of design.

The length of the slab waveguide 15A in the Z axis direction, which is formed by the photonic crystal 14A, may be shortened in comparison with that of the first embodiment.

[Third Embodiment]

A diffraction device using a photonic crystal according to a third embodiment of the present invention will now be discussed with reference to FIG. 5 and FIG. 6.

Figure 5:
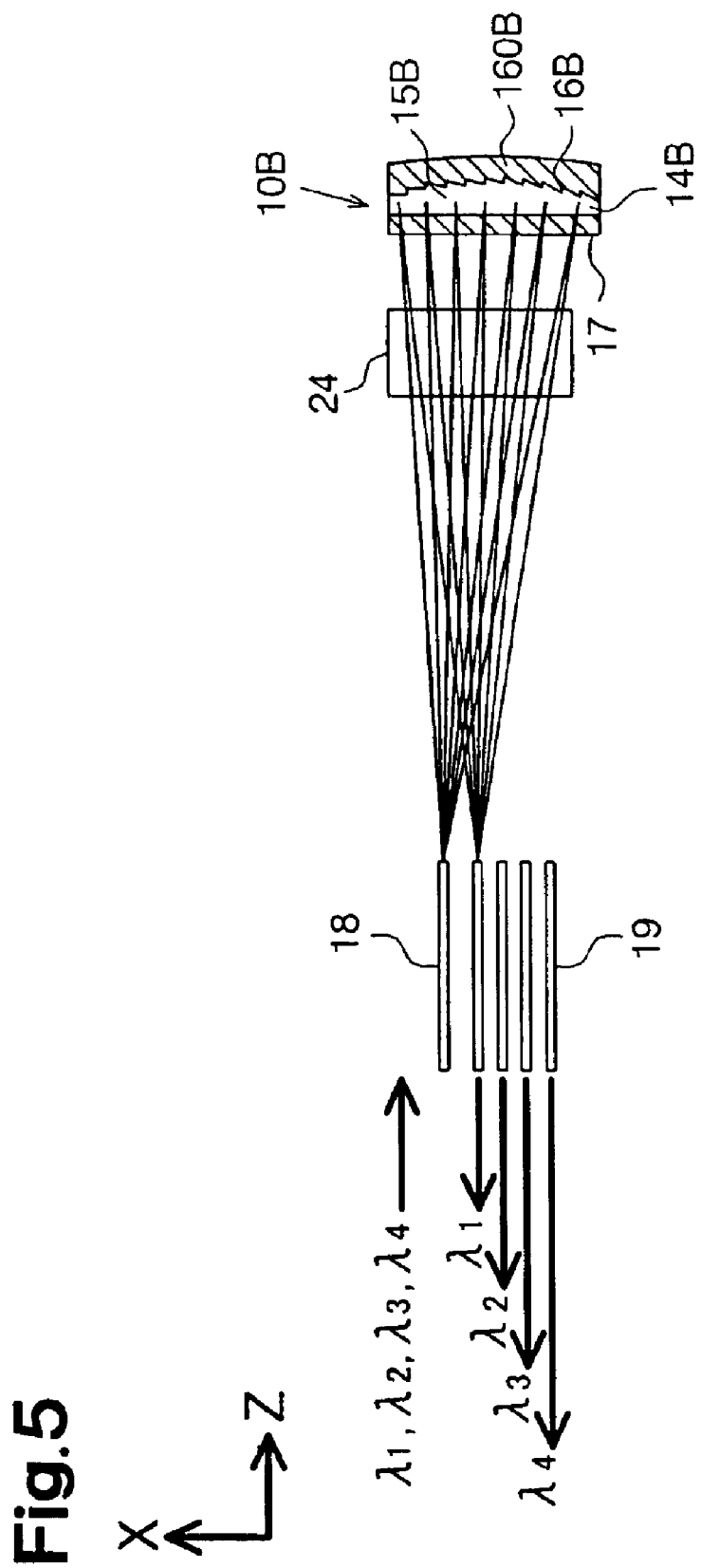
FIG. 5 is a plan view showing the structure of a diffraction device according to a third embodiment of the present invention.

A diffraction device 10 using the photonic crystal of FIGS. 5 and 6 is embodied in a multiplexer/demultiplexer having the first feature of the present invention and has a structure corresponding to example (d). In the description of the third embodiment, components that are the same as the corresponding components of the first embodiment are denoted with the same reference numeral and the alphabet "B" following the numeral. Such components will not be described.

The diffraction device 10B of the third embodiment differs from the second embodiment of FIG. 3 in that the diffraction grating surface of the reflective blazed grating 16B has the concave mirror shape of the first embodiment of FIG. 1 and in that the lens element for incident beam to an input surface of the slab waveguide 15A is only the cylindrical lens 23 since the blazed grating 16B is provided with the converging effect.

In the diffraction device 10B, the cylindrical lens 24 converts the incident beam transmitted by the input optical fiber 18 to a converted beam in the Y axis direction and inputs the beam to the slab waveguide 15B from the input surface 14a via the phase grating 17. The high degree band in the photonic crystal 14B that forms the slab waveguide 15B propagates the input wave. The high degree band propagation wave is reflected by the reflective blazed grating 16B. The diffraction splits the high degree band propagation wave in accordance with each frequency. The high degree band propagation wave divided in accordance with frequency is output from the input surface of the slab waveguide 15B and converted to a simple wave shape by the phase grating 17. The output beam, which is divided in accordance with each frequency, is guided to the corresponding output optical fiber 19 and coupled.

Like the first embodiment, the third embodiment is advantageous in that it achieves a multiplexer/demultiplexer having a simple structure. The second embodiment additionally has the advantages described below.

The lens element is only one cylindrical lens 24. This simplifies the structure and optical adjustment in comparison with the second embodiment.

[Fourth Embodiment]

A diffraction device using a photonic crystal according to a fourth embodiment of the present invention will now be discussed with reference to FIG. 7.

Figure 7:
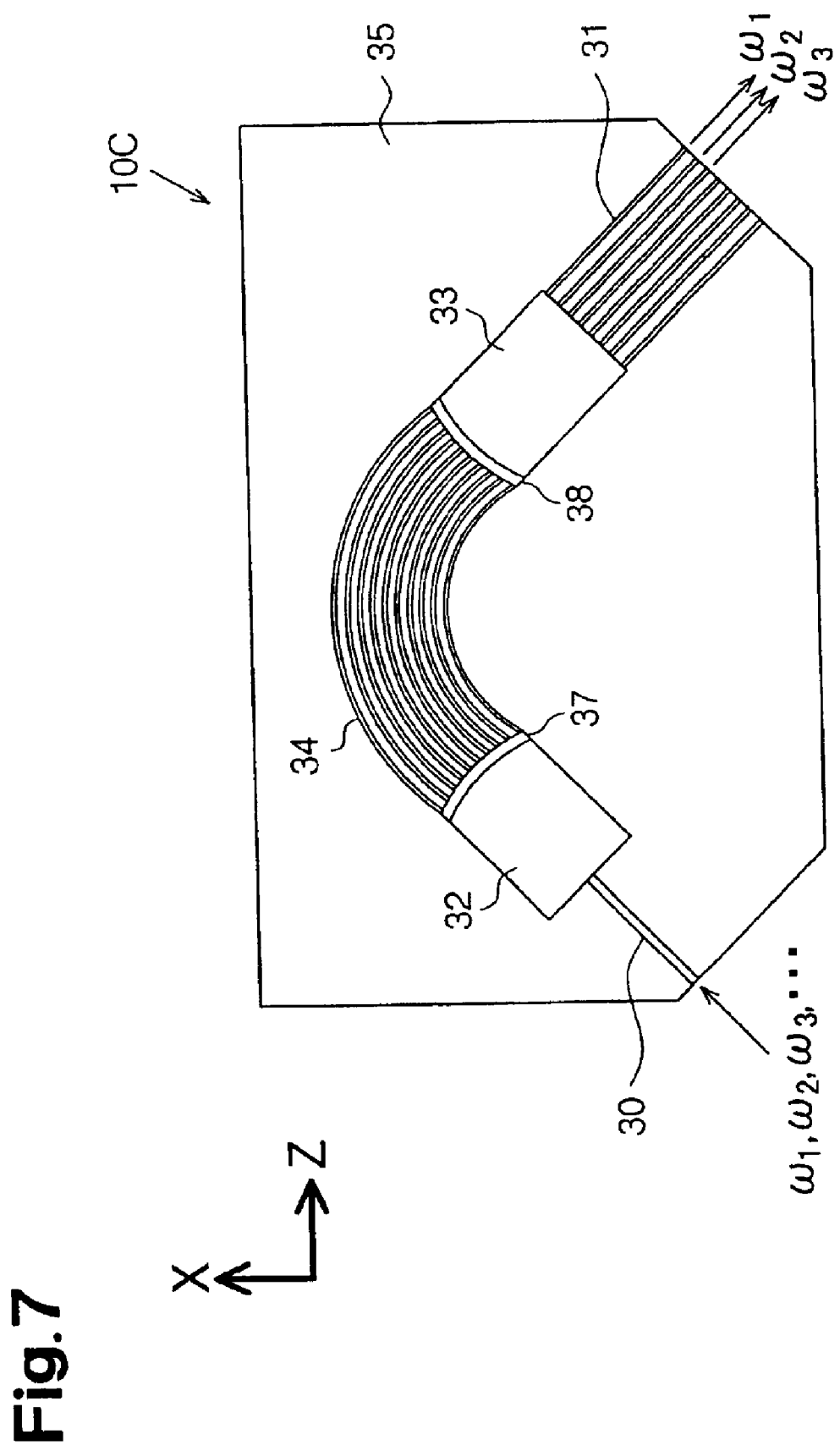
FIG. 7 is a plan view showing the structure of a diffraction device according to a fourth embodiment of the present invention.

FIG. 7 shows a diffraction device 10C using a photonic crystal that is embodied in an arrayed waveguide grating (AWG).

The diffraction device 10C, which serves as an arrayed waveguide grating, includes an input waveguide 30, a plurality of output waveguides 31, an input slab waveguide 32, which is connected to the input waveguide 30, an output slab waveguide 33, which is connected to the output waveguide 31, and an arrayed waveguide 34, which connects the two slab waveguides 32 and 33 and provides an optical path difference. The waveguides are formed on the same substrate 35.

The input waveguide 30, the input slab waveguide 32, the arrayed waveguide 34, the output slab waveguide 33, and the output waveguides 31 are connected in this order on the substrate 35 to form the diffraction device 10C.

The feature of the diffraction device 10C is in that the arrayed waveguide 34, which functions as a diffraction grating, is formed by a photonic crystal that provides a phase difference in the wave front of an electromagnetic wave, which is divided periodically. The arrayed waveguide 34 includes a plurality of arcuate bent waveguides 34, with each outer waveguide having a length that increases by a predetermined length from the adjacent waveguide. The waveguides of the arrayed waveguide 34 having different waveguide lengths is formed by a one dimensional photonic crystal having a periodic characteristic in a single direction (Y axis direction).

In other words, the photonic crystal, which significantly changes the wavelength of the wave propagated relative to the frequency of the electromagnetic wave, forms the arrayed waveguide 34, which periodically divides an electromagnetic wave and provides a phase difference in the wave front of the divided electromagnetic wave. The photonic crystal is, for example, a one-dimensional photonic crystal having a periodic characteristic in the Y axis direction in the same manner as the photonic crystal 14 of FIG. 2.

An input wave, in which optical signals ($\omega 1, \omega 2, \omega 3, \ldots$) having a plurality of frequencies are multiplexed, is transmitted to the input waveguide 30. The input wave entering the input slab waveguide 32 from the input waveguide 30 spreads by diffraction in the input slab waveguide 32 and periodically divided in the arrayed waveguide 34 at the same phase. As the periodically divided input wave propagates through each waveguide of the arrayed waveguide 34, the input wave is provided with a phase difference corresponding to the length of each waveguide. The light output from each waveguide of the arrayed waveguide 34 interferes with one another in the output waveguide 33 and converges at the output waveguide 31. The phase difference provided by the arrayed waveguide 34 produces angular dispersion. The dispersion converges each frequency of wave at a corresponding one of the output waveguides 31. This outputs light divided into different wavelengths from each waveguide of the output waveguide 31.

The diffraction grating 10C includes an input phase modulating unit, which produces a phase modulation wave having a frequency that is the same or two times the frequency of the photonic crystal forming the arrayed waveguide 34, and an output phase modulating unit, which converts the wave output from the arrayed waveguide 34 to a simple wave.

The input phase modulating unit is a phase grating 37, which has a frequency that is the same as or two times the frequency of the photonic crystal forming the arrayed waveguide 34. The output phase modulating unit is a phase grating 38, which has a frequency that is the same as or two times the frequency of the photonic crystal forming the arrayed waveguide 34. The phase grating 37 is formed integrally with the input surface of the arrayed waveguide 34. In the same manner, the phase grating 38 is formed integrally with the output surface of the arrayed waveguide 34.

The photonic crystal forming the arrayed waveguide 34 satisfies a condition in which the absolute value of a constant representing the dispersion is 2 or greater. In other words, the photonic crystal satisfies the following condition:

$$2 \leq |K| = |(\Delta\lambda/\lambda_0)/(\Delta\omega_0/\omega_0)|$$

The advantages of the fourth embodiment will now be discussed.

In the conventional arrayed waveguide grating (AWG), the arrayed waveguide is formed from a homogeneous medium and the frequency difference and wavelength difference are about the same. In comparison, in the preferred embodiment, the arrayed waveguide 34 is formed by the photonic crystal, which significantly changes the wavelength of the propagated wave of the electromagnetic frequency. That is, the photonic crystal has a wavelength difference that is K times the frequency difference. This increases the phase difference with the frequency difference in each waveguide of the arrayed waveguide 34 even if the optical path length difference of the adjacent waveguide is the same. Thus, the angular difference of each wave front formed at each terminal end of the arrayed waveguide 34 increases, and the frequency difference of the wave converted at each input port of the output waveguide 31 decreases. As a result, the resolution $\lambda_0/\Delta\lambda$ corresponding to the frequency difference is significantly reduced from the conventional AWG. Accordingly, the product mN of the diffraction order m and the number of waveguides N may be small, the size of the diffraction grating may be reduced, and the frequency resolution ($\omega_0/\Delta\omega$) may be improved.

The difference of the optical propagation distance required to produce a constant phase difference is significantly decreased in comparison to the conventional arrayed waveguide grating (AWG) in which the arrayed waveguide is formed by a homogeneous medium. Accordingly, the size of the arrayed waveguide 34 in the arrayed waveguide grating is reduced and the frequency resolution ($\omega_0/\Delta\omega$) is improved.

The absolute value of the constant K representing the level of dispersion of the photonic crystal forming the arrayed waveguide 34 is 2 or greater. This reduces the size of the arrayed waveguide 34 and further improves resolution. Especially, when propagating an electromagnetic wave having different frequencies in a photonic crystal satisfying this condition, the phase difference produced for a certain optical length difference is much greater than when forming the diffraction grating with a homogeneous medium. This significantly reduces the length of the arrayed waveguide 34 for obtaining the same phase difference. As a result, the size of the arrayed waveguide grating (AWG) is reduced and the frequency resolution ($\omega_0/\Delta\omega$) is improved.

The phase grating 37 is arranged at the input side of the arrayed waveguide 34. Thus, most of the propagation wave of the input slab waveguide 32 is efficiently converted to a high degree band propagation wave in the arrayed waveguide 34. Further, the phase grating 38 is arranged at the output side of the arrayed waveguide 34. Thus, the light output from the arrayed waveguide 34 to the output slab waveguide 33 is returned to a simple wave from the high degree band propagation wave.

When comparing the AWG (diffraction device 10C) of the fourth embodiment with the conventional AWG in which the frequency resolution ($\omega_0/\Delta\omega$) and the number of steps N are the same as, the optical length difference between adjacent waveguides in the arrayed waveguide 34 is decreased. This reduces the size of the entire AWG. Further, when the physical optical path length is the same, the angular difference of the diffracted wave increases. Thus, the required frequency resolution is obtained by decreasing the N value, or the number N of the waveguides.

In FIG. 7, the diffraction device 10C serving as an AWG is used as a demultiplexer. However, the input side and the output side may be switched with each other so that the diffraction device 10C may be used as a multiplexer in the same manner as the conventional AWG.

[Modification of Fourth Embodiment]

In the fourth embodiment of FIG. 7, the phase gratings 37 and 38 may each be arranged at positions differing from the positions of FIG. 7. For example, referring to FIG. 8, instead of arranging the phase grating 37 at position Al as in FIG. 8, the phase grating 37 may be arranged near or integrally with the input surface of the input slab waveguide 32 (position A2) or the input surface of the input waveguide 30 (position A3). Further, instead of arranging the phase grating 38 at position B1 as in FIG. 8, the phase grating 38 may be arranged near or integrally with the output surface of the output slab waveguide 33 (position B2) or the output surface of the output waveguide 31 (position B3).

[Fifth Embodiment]

A diffraction device using a photonic crystal according to a fifth embodiment of the present invention will now be discussed with reference to FIG. 9.

Figure 9:
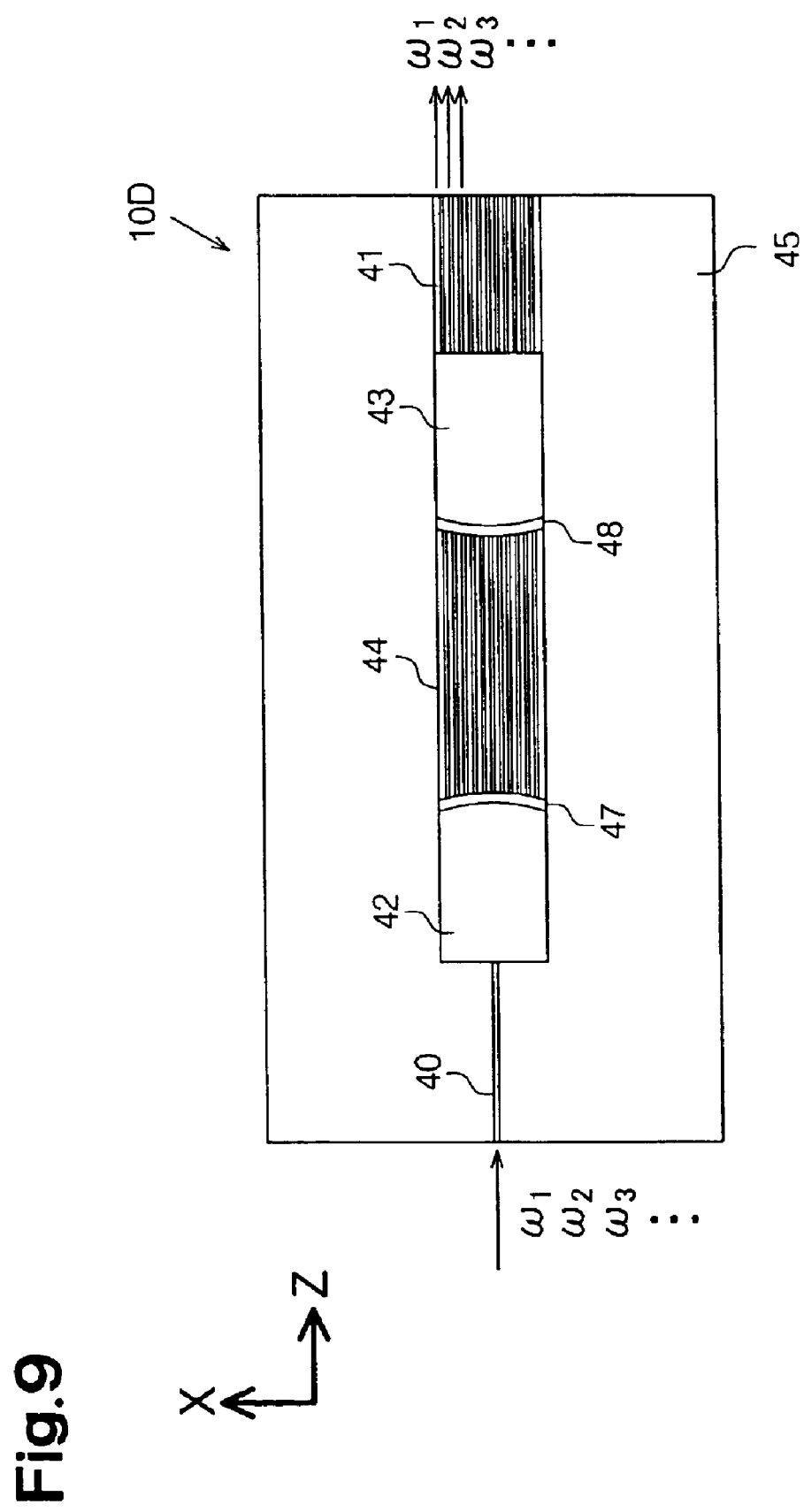
FIG. 9 is a plan view showing the structure of a diffraction device according to a fifth embodiment of the present invention.

FIG. 9 shows a diffraction device 10D using a photonic crystal that is embodied in an arrayed waveguide grating (AWG) having the second feature of the present invention to form a multiplexer/demultiplexer.

An input waveguide 40, an input slab waveguide 42, an arrayed waveguide 44, an output slab waveguide 43, and an output waveguide 41 are linearly connected in this order on a substrate 45 to form the diffraction device 10D, which functions as an arrayed waveguide diffraction grating.

In the fourth embodiment shown in FIG. 7, each of the waveguides of the arrayed waveguide 44 is arcuate to change the length of each waveguide in a stepped manner and provide a predetermined optical path length difference between adjacent waveguides. In comparison, in the diffraction device 10D of the fifth embodiment, each waveguide of the arrayed waveguide 44 is linear. Further, each waveguide is formed by a photonic crystal. The wavelength dispersion amount, or the absolute value of a constant K representing the level of dispersion of each waveguide, is changed in a stepped manner to provide a predetermined optical length difference between adjacent waveguides. In the same manner as in the fifth embodiment, the photonic crystal forming each waveguide of the arrayed waveguide 23 is a one-dimensional photonic crystal having a periodic characteristic in the Y axis direction.

Further, the period or material of the photonic crystal of each waveguide may be changed in a stepped manner to change the wavelength dispersion amount of each waveguide of the arrayed waveguide 34 in a stepped manner. In the conventional AWG in which each waveguide of the arrayed waveguide 34 is formed by a homogeneous medium, it is difficult to change the wavelength dispersion amount of each waveguide in a stepped manner.

Figure 8:
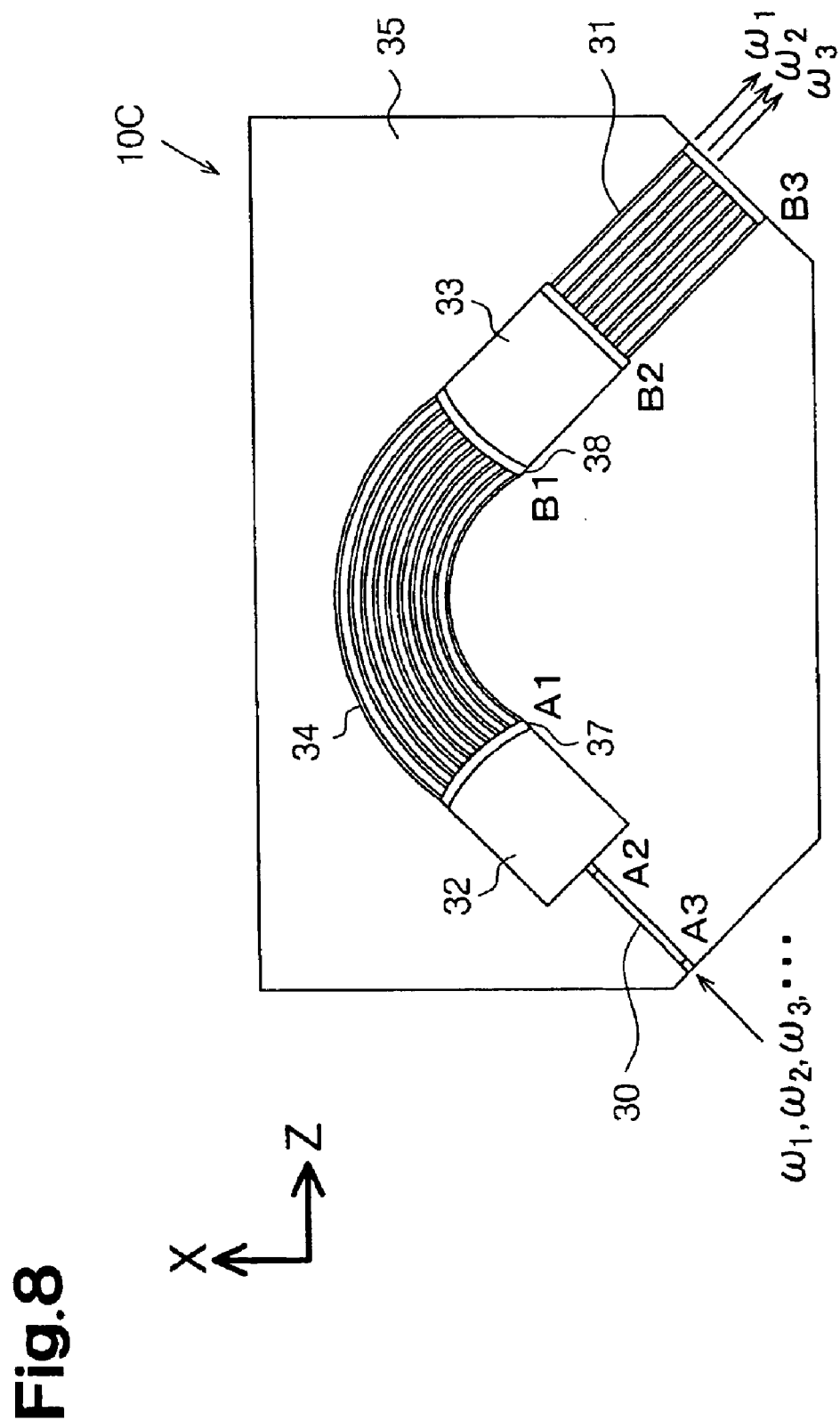
FIG. 8 is a plan view showing the layout example of a phase grating in the diffraction device of FIG. 7.

In the same manner as in the fourth embodiment, a phase grating 47 and a phase grating 48 are respectively arranged at the input side and output side of the arrayed waveguide 44. Instead of the positions shown in FIG. 9, the phase gratings 47 and 48 may be arranged like in the fourth embodiment as shown in FIG. 8.

In addition to the advantages of the fourth embodiment, the fifth embodiment has the advantages described below.

Each waveguide of the arrayed waveguide 34 is linear. Each waveguide is formed by a photonic crystal and the wavelength dispersion amount of the photonic crystal is changed in a stepped manner to provide the predetermined optical length difference between adjacent waveguides. Thus, the entire structure of the diffraction device 10D serving as an AWG is linear. This facilitates the manufacturing of a device with the AWG.

[Sixth Embodiment]

A diffraction device using a photonic crystal according to a sixth embodiment of the present invention will now be discussed with reference to FIGS. 10 and 11.

Figure 10:
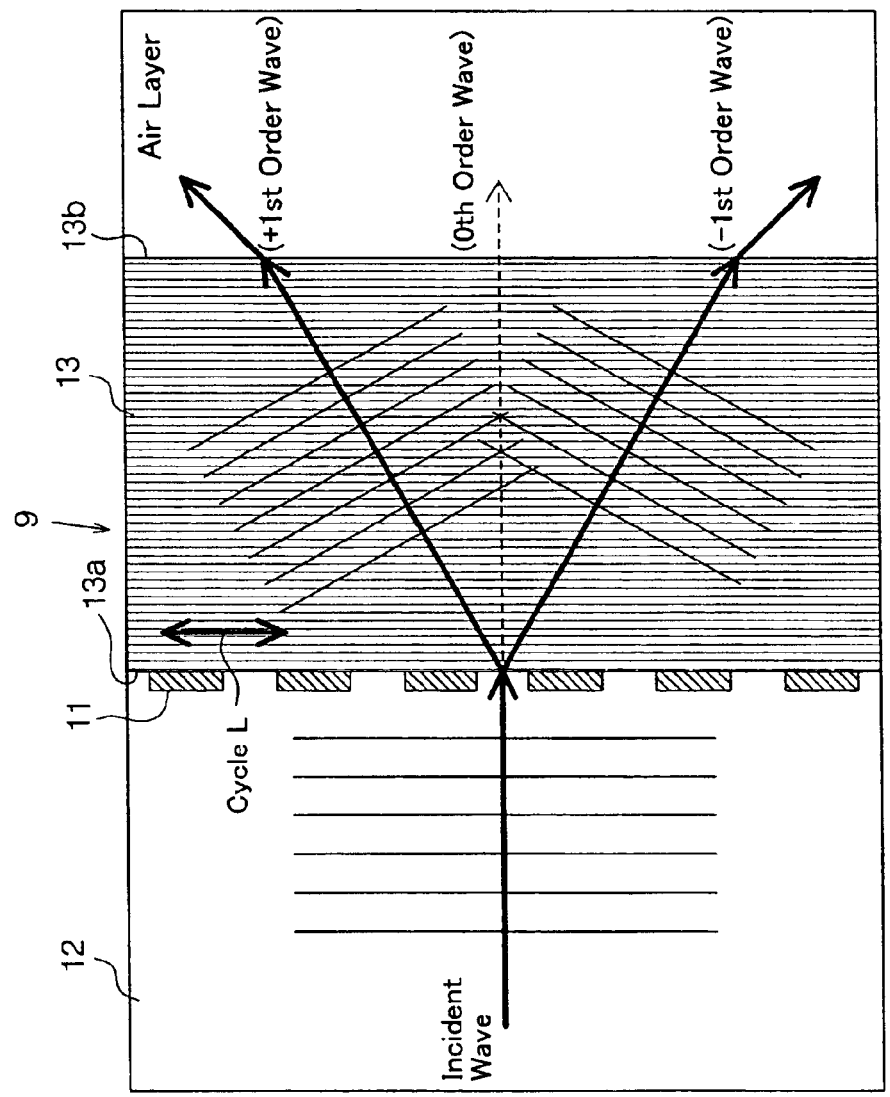
FIG. 10 is a plan view showing a diffraction device using a photonic crystal according to a sixth embodiment of the present invention.

A diffraction device 9 using a photonic crystal as shown in FIG. 10 is one example embodying the first feature of the present invention and corresponds to example (b). The diffraction device 9 includes a diffraction grating 11, which periodically divides an electromagnetic wave and has period L, and an input medium and output medium, which are in contact with the diffraction grating 11. The input medium is an air layer 12, and the output medium is a one-dimensional photonic crystal 13 having a periodic characteristic in one direction (Z axis direction).

The one-dimensional photonic crystal 13 is formed by a periodic multilayer film in which, for example, a substance D (refraction rte $n_D$) having a thickness of $t_D$ and a substance E (refractive index $n_E$) having a thickness $t_E$ are alternately superimposed in the Z axis direction to obtain a period a $(t_D+t_E)$.

In this manner, the diffraction device 9 of FIG. 10 has a diffraction grating 11 on one side surface 13a of the photonic crystal 13 having a periodic characteristic in the Z axis direction. An incident wave, which is an electromagnetic wave, vertically enters the diffraction grating 11. One side surface 13a, which corresponds to an end surface that is perpendicular to the periodic direction (Z axis direction) of the photonic crystal 13, serves as an input surface. The other side surface 13b of the photonic crystal 13, which corresponds to an end surface that is perpendicular to the periodic direction of the crystal 13, serves as an output surface.

Figure 11:
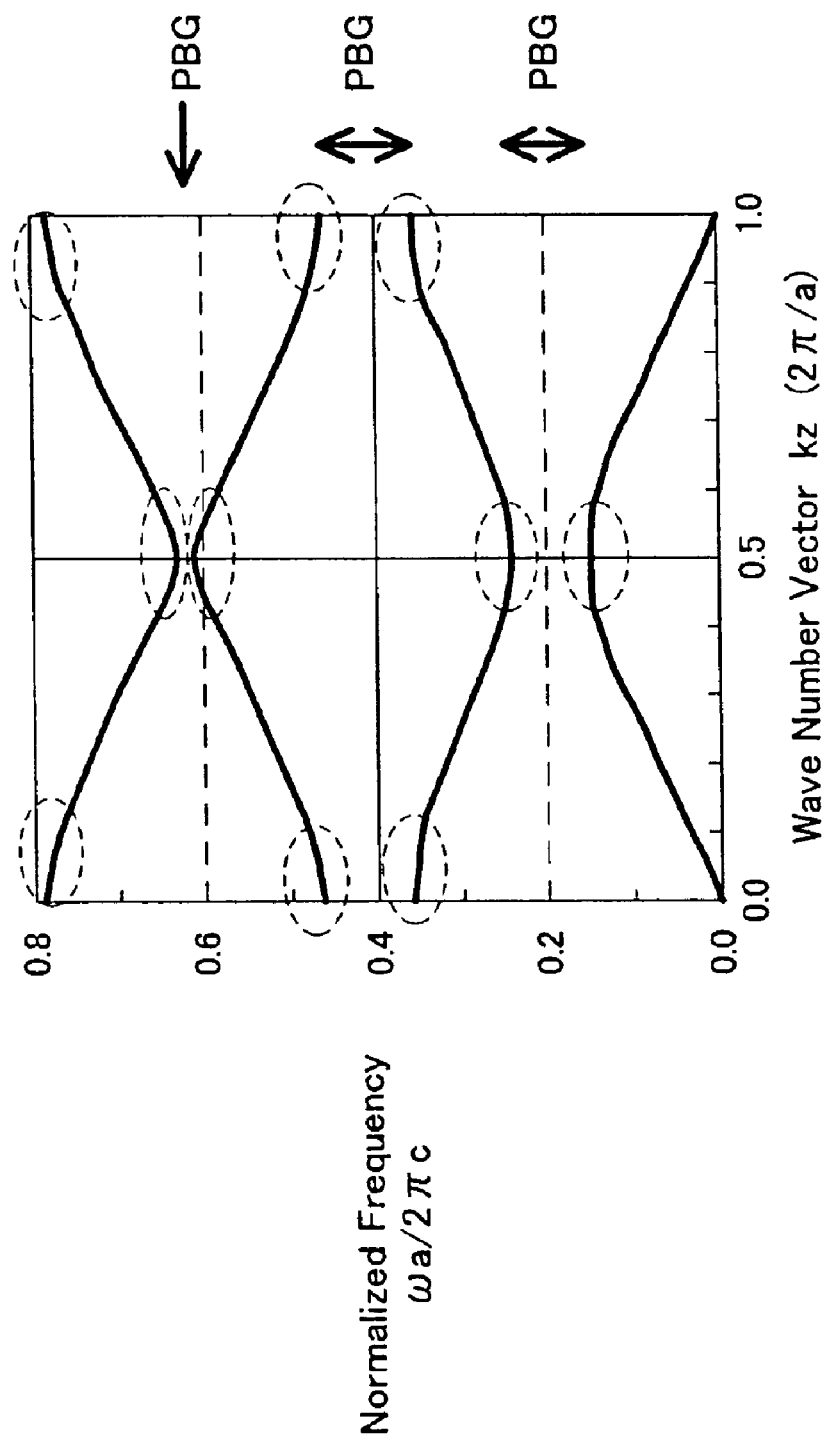
FIG. 11 is a band diagram of the photonic crystal of FIG. 10.

FIG. 11 shows part of the photonic band diagram in the Z axis direction of the photonic crystal 13 with periodic zones. In FIG. 11, the horizontal axis represents the wave number vector kz ($2\pi/a$) and the vertical axis represents the normalized frequency $\omega a/2\pi c$, wherein c represents the light velocity in a vacuum and $\omega$ represents the angular frequency of incident wave. As apparent from FIG. 11, in the photonic crystal 13, periodic frequency ranges in which there are no bands, that is, a plurality of photonic band gaps (PBG), exist in the Z axis direction.

As shown in FIG. 11, the absolute value of an inclination of a curve of the photonic band near the plural PBGs (the sections encompassed by broken lines) decreases. This indicates that the change in the wave length of the propagation wave relative to the change in the frequency increases. Accordingly, to increase the effect of the angular difference ($\Delta \sin \theta d$) resulting from equation 6, in the sixth embodiment, the diffraction device 9 using the photonic crystal employs the frequency range near the PBGs to propagate incident wave. In other words, the wave entering the side surface 13a of the photonic crystal 13 is propagated in the photonic crystal 13 by the photonic band existing near the PBGs.

The photonic crystal 13 satisfies the condition in which the absolute value of the constant K defined by equation 3 to represent the level of dispersion of the photonic crystal 13 is 2 or greater. In other words, the photonic crystal 13 satisfies the condition of:

$$2 \leq |K| = |(\Delta\lambda/\lambda_0)/(\Delta\omega/\omega_0)|$$

When the absolute value of K is 2 or less, in comparison with a diffraction grating of the normal homogeneous medium, the effect for reducing size and improving the frequency resolution ($\omega_0/\Delta\Delta\omega$) is too small. Thus, it is preferred that the absolute value of K be 2 or greater.

The sixth embodiment has the advantages described below.

One of the input medium and the output medium (the output medium in the sixth embodiment) contacting the diffraction grating 11 is formed by the one dimensional photonic crystal 13 having a periodic characteristic in one direction (Z axis direction) in which the wavelength of the wave that propagates relative to the frequency of the incident wave (electromagnetic wave) changes significantly. Thus, an angular difference greater than that of the normal diffraction device such as in example (a) is obtained. Further, the resolution ($\lambda_0/\Delta\lambda$) corresponding to the separated frequency difference is drastically decreased compared with the normal diffraction grating. Accordingly, the product mN of the order m of diffraction and the number of steps N is small. Further, the size of the diffraction device may be reduced and the frequency resolution ($\omega_0/\Delta\omega$) is improved.

Since the photonic crystal 13 satisfies the condition in which the absolute value of the constant K, which represents the level of dispersion of the photonic crystal 13, as described in example (b), the angular difference resulting from the diffraction term is greater than the normal diffraction device of example (a). Further, the positive and negative values may be selected for the diffraction order m so that the absolute value of the angular difference becomes greater than the normal diffraction grating. Accordingly, the size of the diffraction grating 11 may be decreased, and the frequency resolution ($\omega_0/\Delta\omega$) is sufficiently improved.

When an electromagnetic wave enters the input surface (side surface 13a) of the photonic crystal 13, which is perpendicular to the periodic direction (Z axis direction), PBGs in which there are no bands periodically exist in the propagation direction (Z axis direction) of the electromagnetic wave (Z axis direction). The change in the wavelength of the electromagnetic wave (wavelength of the propagation wave) relative to the frequency increases near the PBGs. Therefore, by using the frequency ranges near the PBGs for the propagation of electromagnetic waves, a compact spectroscope is obtained in which the value of the resolution corresponding to the difference of the separated frequencies is much smaller than a conventional diffraction grating.

[One-Dimensional Photonic Crystal]

A one-dimensional photonic crystal that may be used in the present invention will now be described in detail.

Figure 13:
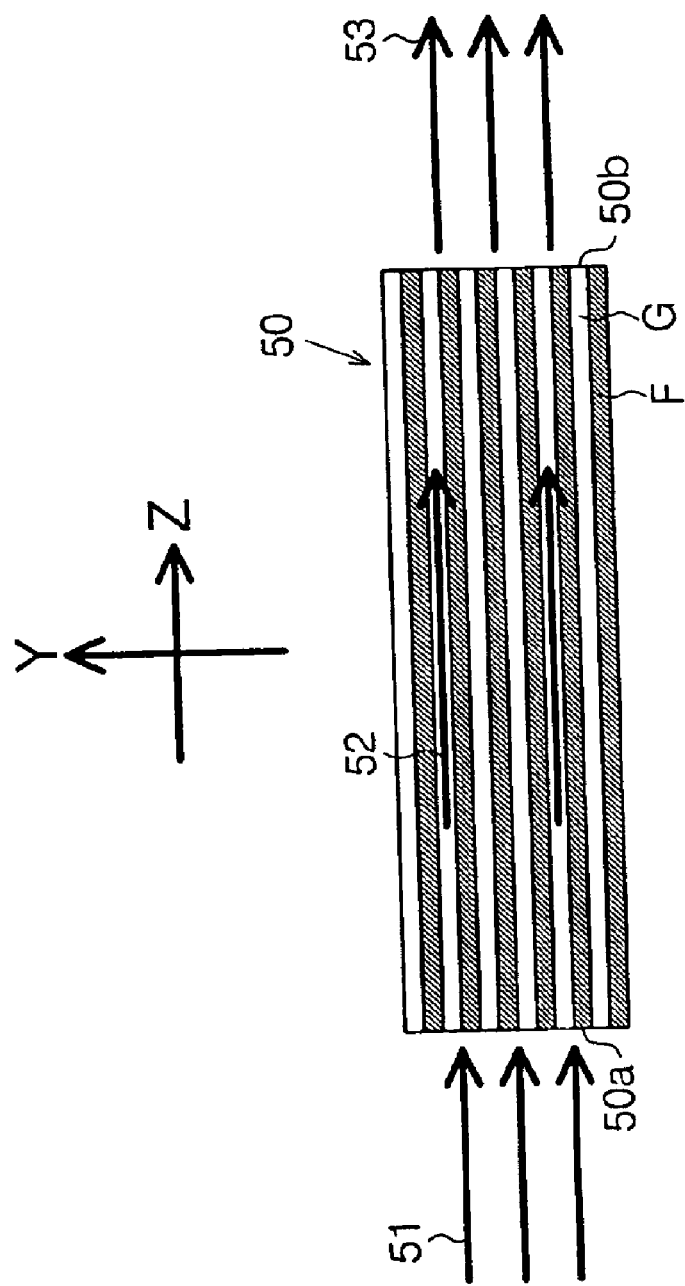
FIG. 13 is a schematic diagram illustrating the propagation of light in the photonic crystal.

FIG. 13 shows a one-dimensional photonic crystal 50, which has a periodic characteristic in only one direction like the photonic crystals used in the first to sixth embodiments. FIG. 13 further schematically shows the propagation of electromagnetic waves in a direction in which there is no periodic characteristic (Z axis direction). Only the photonic crystal 13 used in the sixth embodiment has a periodic characteristic in the Z axis direction. The photonic crystals 14, 14A, 14B, 34, and 44 used in the first to fifth embodiments have a periodic characteristic in only the Y axis direction.

In the same manner as the photonic crystal 14 of FIG. 2, the one-dimensional photonic crystal 50 has a periodic characteristic in only Y axis direction. The one-dimensional photonic crystal 50 is a periodic multilayer film in which, for example, a substance F (refractive index $n_F$) having thickness $t_F$ and a substance G (refractive index $n_G$) having a thickness $t_G$ are alternately superimposed to have period $a=(t_F+t_G)$.

In FIG. 13, when an incident wave having wavelength $\lambda_0$ in a vacuum, enters a first end surface 50a of the one-dimensional photonic crystal 50, the incident wave 51 propagates through the photonic crystal 50 as propagation wave 52. The propagation wave 52 than exits a second end surface 50b of the photonic crystal 50 as output wave 53. Photonic bands may be calculated to generate a band diagram and acknowledge the incident wave 51 propagates through the one-dimensional photonic crystal 50. In the one-dimensional photonic crystal 50, the first and second end surfaces 50a and 50b are end surfaces from which the periodic characteristic is exposed and are parallel to the periodic Y axis direction. Further, the first and second end surfaces 50a and 50b respectively function as an input surface and an output surface.

The calculation of bands is described specifically in, for example, "Photonic Crystals", Princeton University Press (1955) and Physical Review B Volume 44, No. 16, P 8565, 1991.

Figure 14:
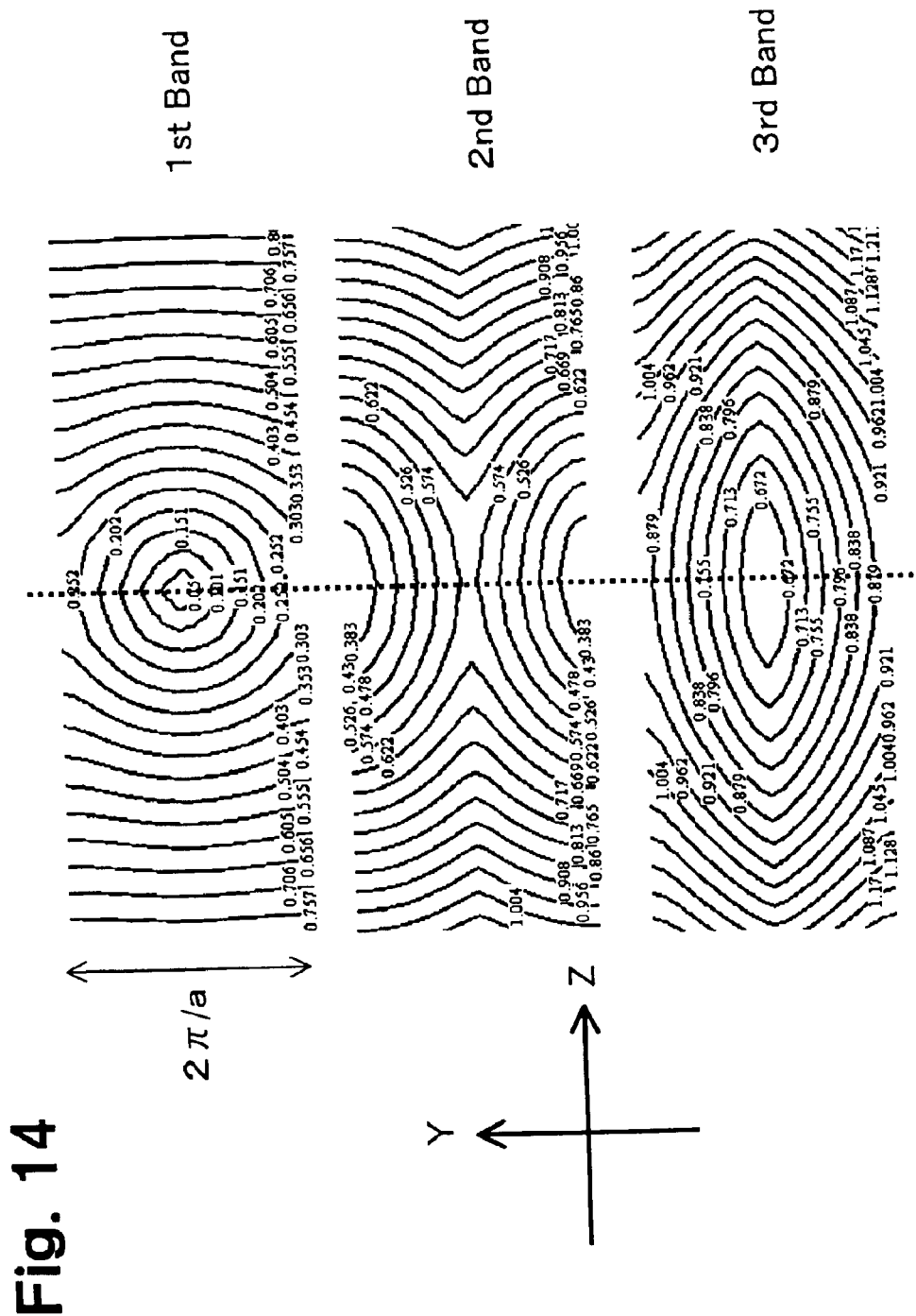
FIG. 14 is a diagram illustrating an example of a photonic band structure of the photonic crystal.

When calculating bands, it is assumed that the one-dimensional photonic crystal 50 of FIG. 13 has a periodic structure that continues infinitely in Y axis direction (superimposed direction) and extends infinitely in the Z axis and X axis directions, which is perpendicular to the plane of the drawing. FIG. 14 illustrates the band calculation result in the Y axis and Z axis directions with first band, second band, and third band of TE polarization included in a first Brillouin zone. The one-dimensional photonic crystal 50 used in the band calculation is a multilayer structure having period a in which layers having the following refractive indices are alternately superimposed:

refractive index $n_F$=2.1011($t_F$=0.3a); and refractive index $n_G$=1.4578($t_G$=0.7a)

In the band diagram of FIG. 14, points at which the value of the normalized frequency $\omega a/2\pi c$ are the same are connected to form contour lines. The numbers in FIG. 14 are the values of the normalized frequency $\omega a/2\pi c$. In this expression, $\omega$ represents the angular frequency of the incident wave 51, a represents the period of the multilayer structure (one-dimensional photonic crystal 50), and c represents the light velocity in a vacuum.

The wavelength $\lambda_0$ of the incident wave in a vacuum may be used to simply express the normalized frequency $\omega a/2\pi c$ as $a/\lambda_0$.

The width of the Brillouin zone, which is shown in FIG. 14, in the Y axis direction is $2\pi/a$. However, the photonic crystal 50 does not have a periodic characteristic in the Z axis direction. Thus, a boundary of the Brillouin zone does riot exist in the lateral direction, which includes the X axis and Z axis directions, and the Brillouin zone extends infinitely. Further, the TE polarization represents polarized light in which the electric field is directed in the X axis direction. The band diagram (not shown) of the TM polarization (light in which the electric field is directed in the X axis direction) is similar to that of the TE polarization but has a somewhat different shape.

With regard to the incident wave 51, which is a plane wave entering the first end surface 50a of the one-dimensional photonic crystal 50 shown in FIG. 13, the propagation wave 52 in the photonic crystal 50 will now be discussed.

Figure 15:
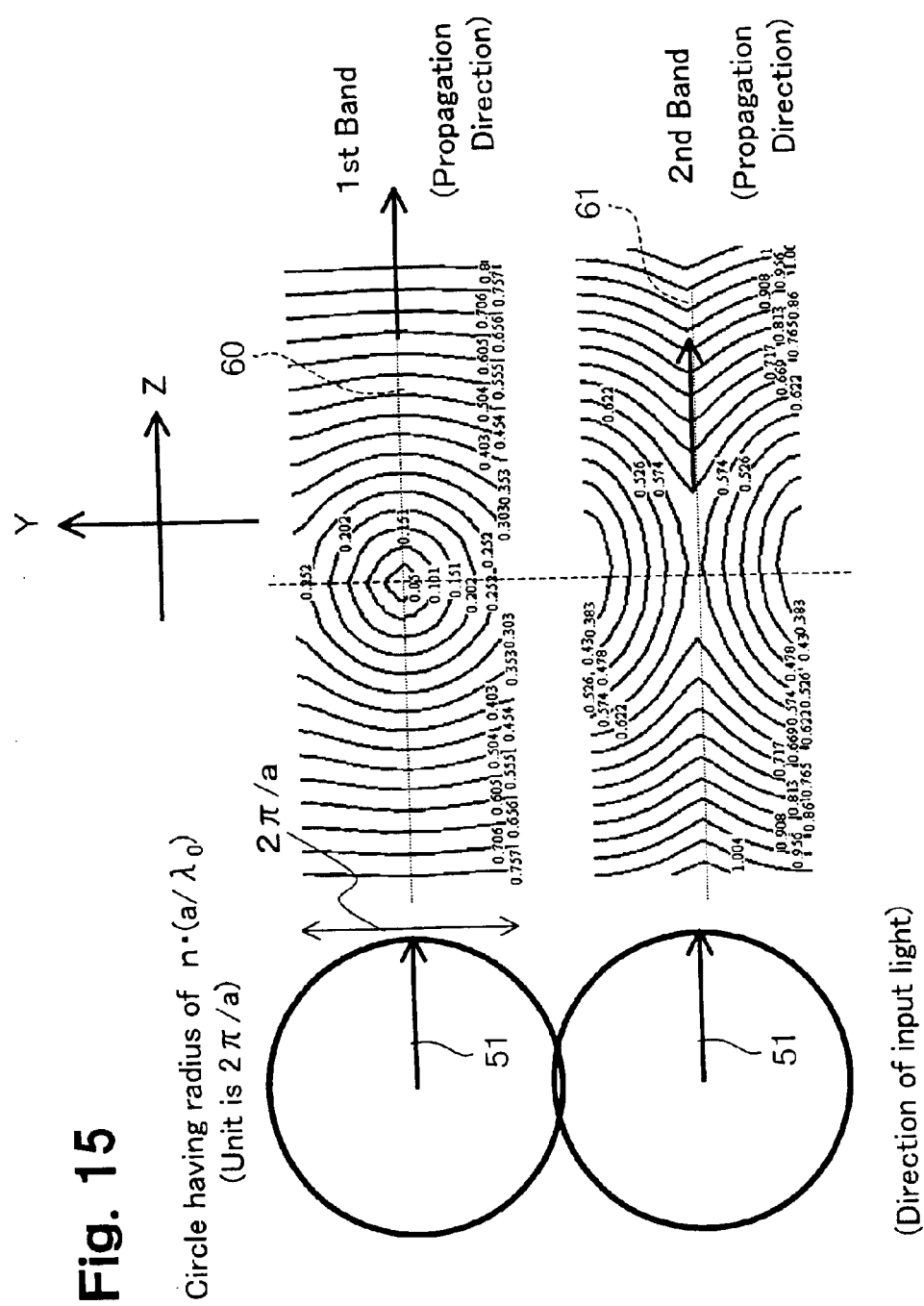
FIG. 15 is a diagram illustrating the coupling of light vertically entering an end surface of the photonic crystal with the photonic crystal using photonic bands.

FIG. 15 schematically shows the propagation of an incident wave (TE polarization) of a specific frequency $a/\lambda_0$ that vertically enters the first end surface 50a of the one-dimensional photonic crystal 50. In other words, the coupling of the incident wave 51, which vertically enters the end surface 50a of the one-dimensional photonic crystal 50, with the photonic crystal 50 is shown with photonic bands.

When the refractive index of the homogeneous media at the input side is n, the band diagram of the homogeneous media would be a circle having a radius of n·($a/\lambda_0$) (one unit is $2\pi/a$). Thus, the coupled band at the side of the photonic crystal 50 may be obtained by generating the diagram. In FIG. 15, since there are corresponding points of the wave number vector on the first band and the second band, this indicates that waves corresponding to the first and second bands propagate in the photonic crystal 50. The direction in which the wave energy advances in the photonic crystal 50 is the direction normal to the contour lines. Thus, the propagation wave of every band advances in the Z axis direction.

Figure 16:
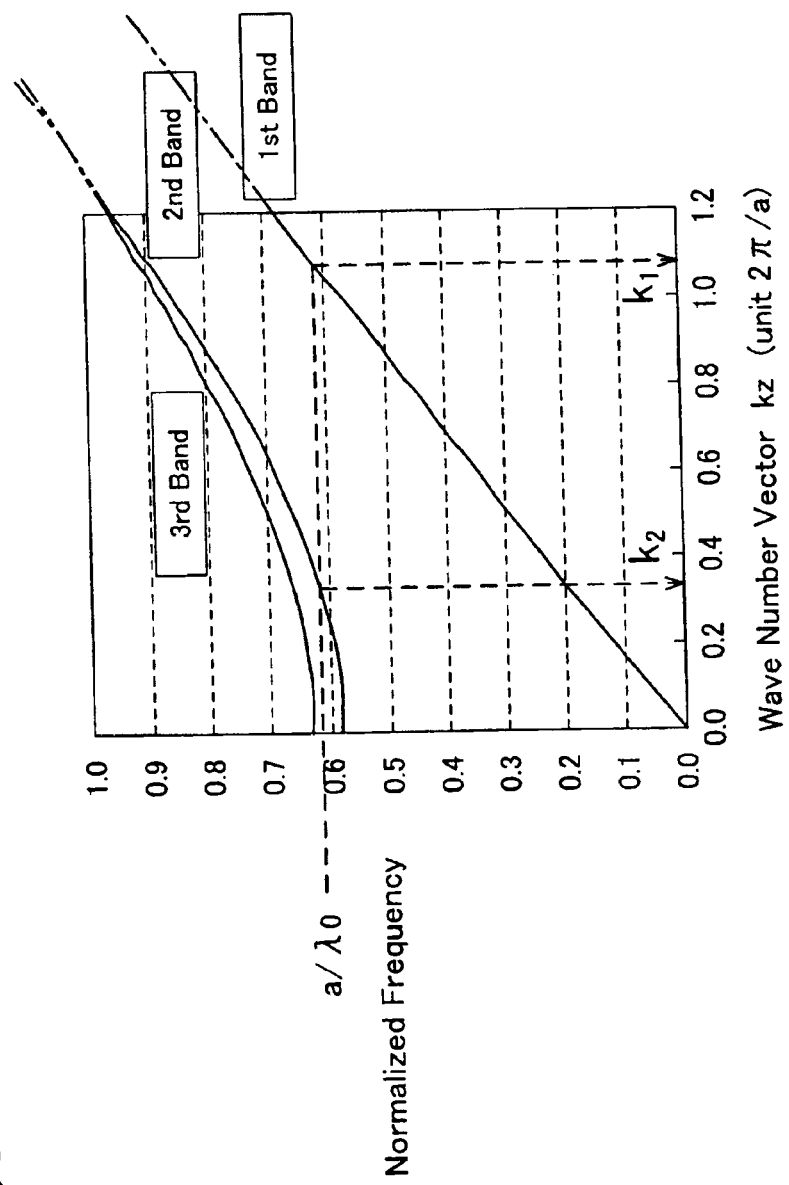
FIG. 16 is a diagram illustrating the coupling of light vertically entering the end surface of the photonic crystal with the photonic crystal in a Z axis direction of a Brillouin zone.

FIG. 16 is obtained from FIG. 15 by restricting the band diagram to the Z axis direction. As shown in FIG. 16, when the vacuum wavelength of the incident wave 51 shown in FIG. 13 is $\lambda_0$, vectors k1 and k2 respectively corresponding to the first and second bands exist in the photonic crystal 50. In other words, the incident wave 51 of the normalized frequency $a/\lambda_0$ propagates in the Z axis direction in the photonic crystal 50 as the two waves of:

$\lambda 1=2\pi/k1$; and $\lambda 2=2\pi/k2$.

The value obtained by dividing the vacuum wavelength $\lambda_0$ with the wavelength ($\lambda 1$ and $\lambda 2$) is defined as an "effective refractive index." As can be understood from FIG. 16, the normalized frequency $a/\lambda_0$ of the first band is substantially proportional to the wave number vector kz. Thus, in the first band, the effective refractive index is substantially fixed relative to a change in the wavelength $\lambda_0$ of the incident wave 51. However, in a high degree band that is greater than or equal to the second band, the change of $\lambda_0$ significantly changes the effective refractive index and becomes less than 1 as apparent from FIG. 16.

It is well known that a value obtained by differentiating the band curve with kz (inclination of tangent line) is the group velocity of the propagation wave. As shown in FIG. 16, in a high degree band that is greater than or equal to the second band, the inclination of the tangent line rapidly decreases as the value of kz decreases and becomes 0 when Kz=0 is satisfied. This is a group velocity abnormality that is unique to the photonic crystals. The group velocity abnormality of the photonic crystal is extremely large and reversed from the normal homogeneous media (the group velocity becoming slower as the wavelength of the incident wave increase). Thus, the group velocity abnormality of the high degree band propagation wave may be used to manufacture an optical device such as a light delaying device or a dispersion compensation device.

As described above, the optical device using propagation wave resulting from a high degree band (high degree band propagation wave) is extremely useful. However, for the normalized frequency $a/\lambda_0$ in which a high degree band propagation wave greater than or equal to the second band propagates, the first band propagation wave (propagation wave resulting from the first band) always propagates. This is apparent from FIG. 16 in which the straight lines and curved lines representing each band actually spread more to the right of the drawing.

The first band propagation wave does not have the effects described above, which are "the wavelength dispersion being extremely large" (the wavelength of the propagation wave relative to changes in the frequency ($2\pi$/kz) being large) and the "group velocity abnormality". Thus, when the high degree band propagation wave and the first band propagation wave exist, the first band propagation wave is only a loss when using a high degree band propagation wave. Further, the first band propagation wave not only drastically decreases the utilization efficiency of the incident wave energy but also decreases the S/N ratio of the optical device as stray light.

It has become apparent through research by the inventors of the present invention that phase modulation of the incident wave enables only the high degree band propagation wave to propagate in the one-dimensional photonic crystal, which is a periodic multilayer film. Further, it has become apparent that the high degree band propagation wave that advances in the Z axis direction in the photonic crystal even when using a band in the Brillouin zone boundary.

Figure 17:
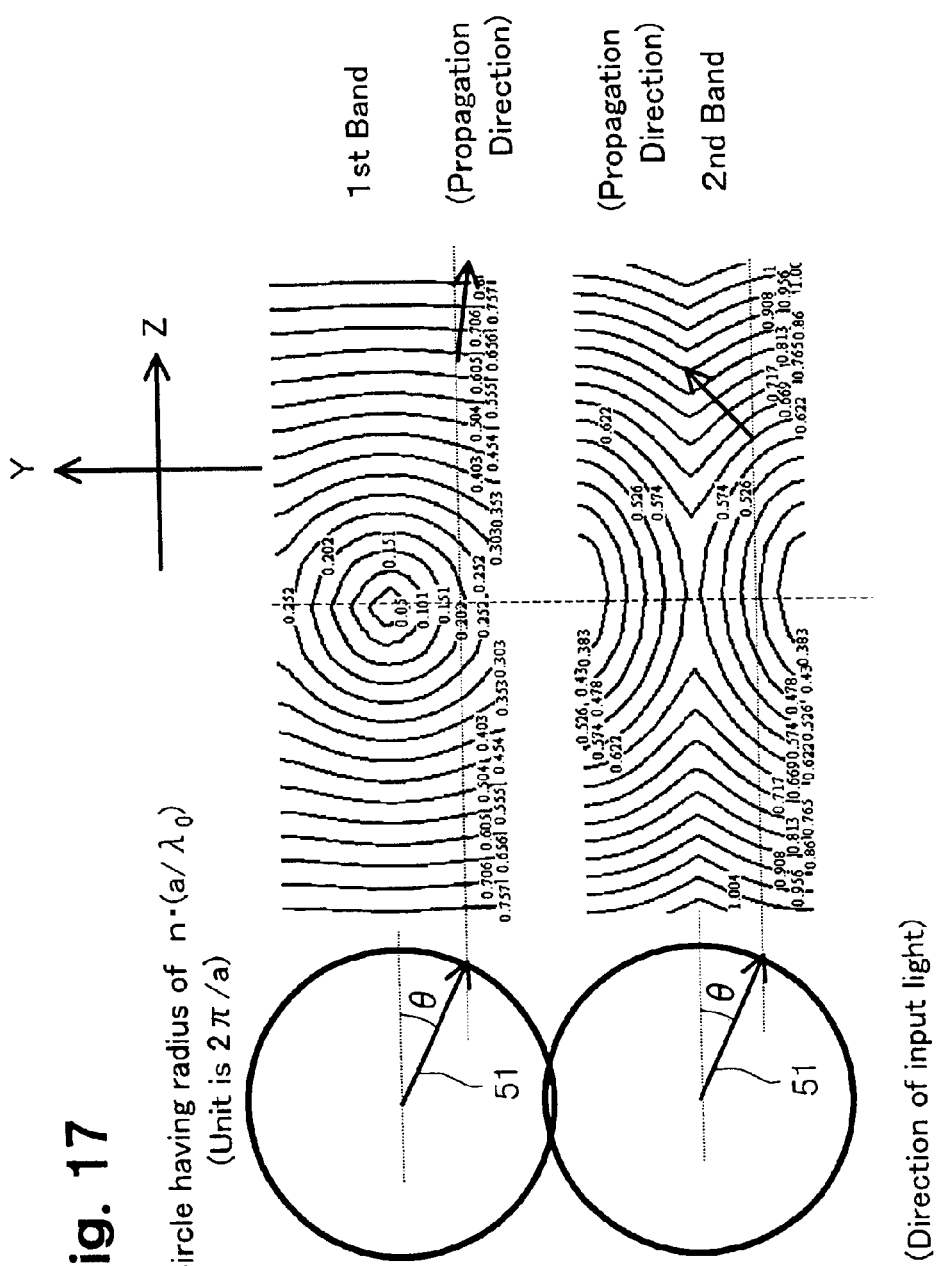
FIG. 17 is a diagram illustrating the coupling of light diagonally entering the end surface of the photonic crystal with the photonic crystal using photonic bands.

FIG. 17 shows the coupled band (photonic band) of the photonic crystal 50 when the incident wave 51 diagonally enters the first end surface 50a of the photonic crystal shown in FIG. 13 at angle $\theta$. For such diagonal wave input, there are two advancing directions of the waves that propagate through the photonic crystal 50 that are normal in direction to the contour lines. Thus, each advancing direction is not the Z axis direction.

A first band propagation wave $52_1$ and a second band propagation wave (high degree band propagation wave) $52_2$ exist on Brillouin zone boundaries 100a and 100b (FIG. 18) when the input angle $\theta$ is set to satisfy n·sin $\theta \cdot (a/\lambda_0)$=0.5. Due to the symmetry of photonic bands of the Brillouin zone boundaries 100a and 100b, the advancing direction of the wave energy of the two propagation waves $52_1$ and $52_2$ are the same as the Z axis direction. Thus, the propagation waves $52_1$ and $52_2$ each advance in the Z axis direction.

Due to the periodic characteristic of the Brillouin zone in the Y axis direction, the following condition may be satisfied for propagation in the Z axis direction:

$n \cdot \sin \theta \cdot (a/\lambda_0) = 1.0, 1.5, 2.0, \ldots$

However, this is difficult since the values of n and $\theta$ must be increased as the value increases.

Figure 18:
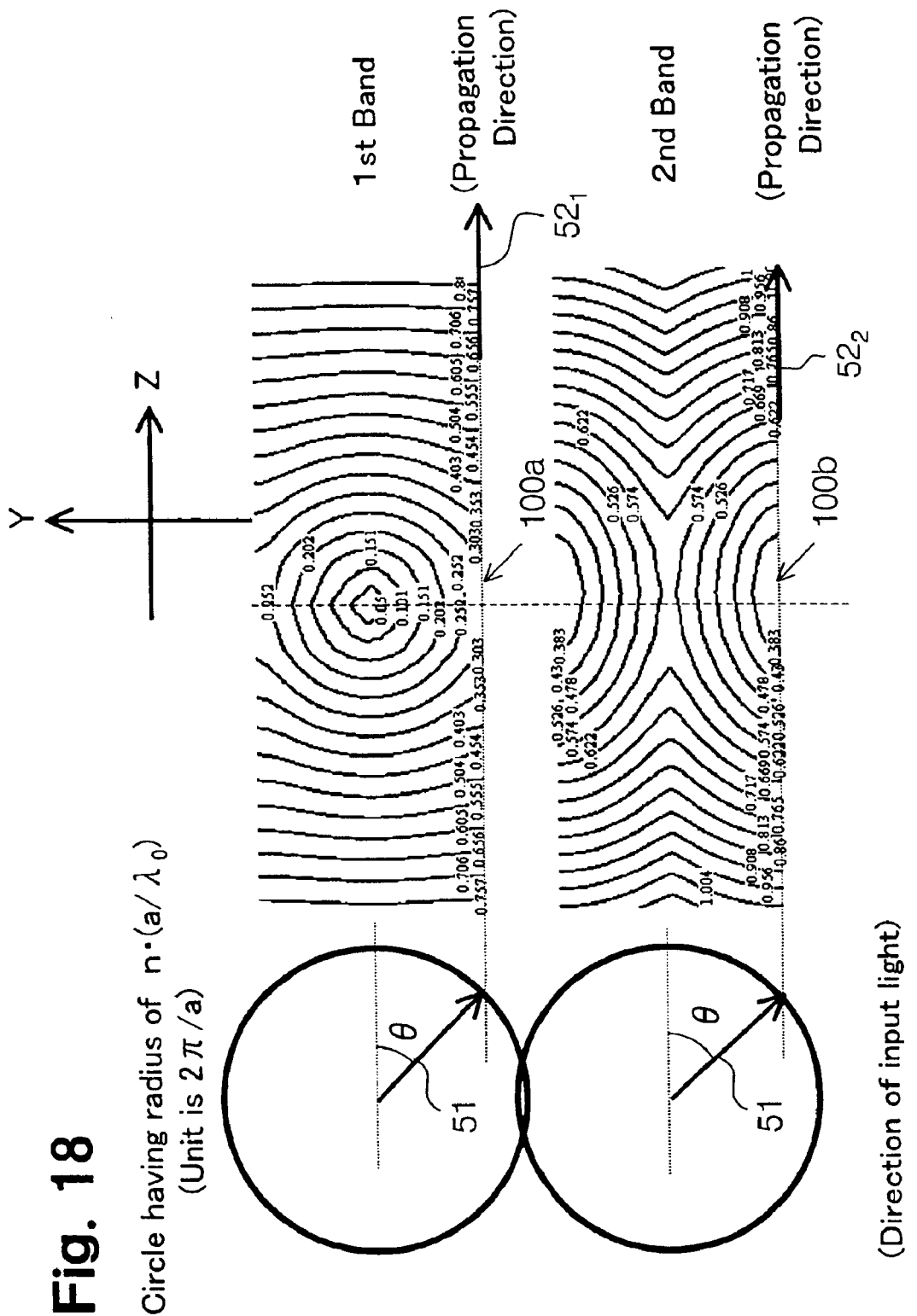
FIG. 18 is a diagram illustrating the coupling of diagonally entering light with the photonic crystal so that propagation occurs at a Brillouin zone boundary using photonic bands.
Figure 19:
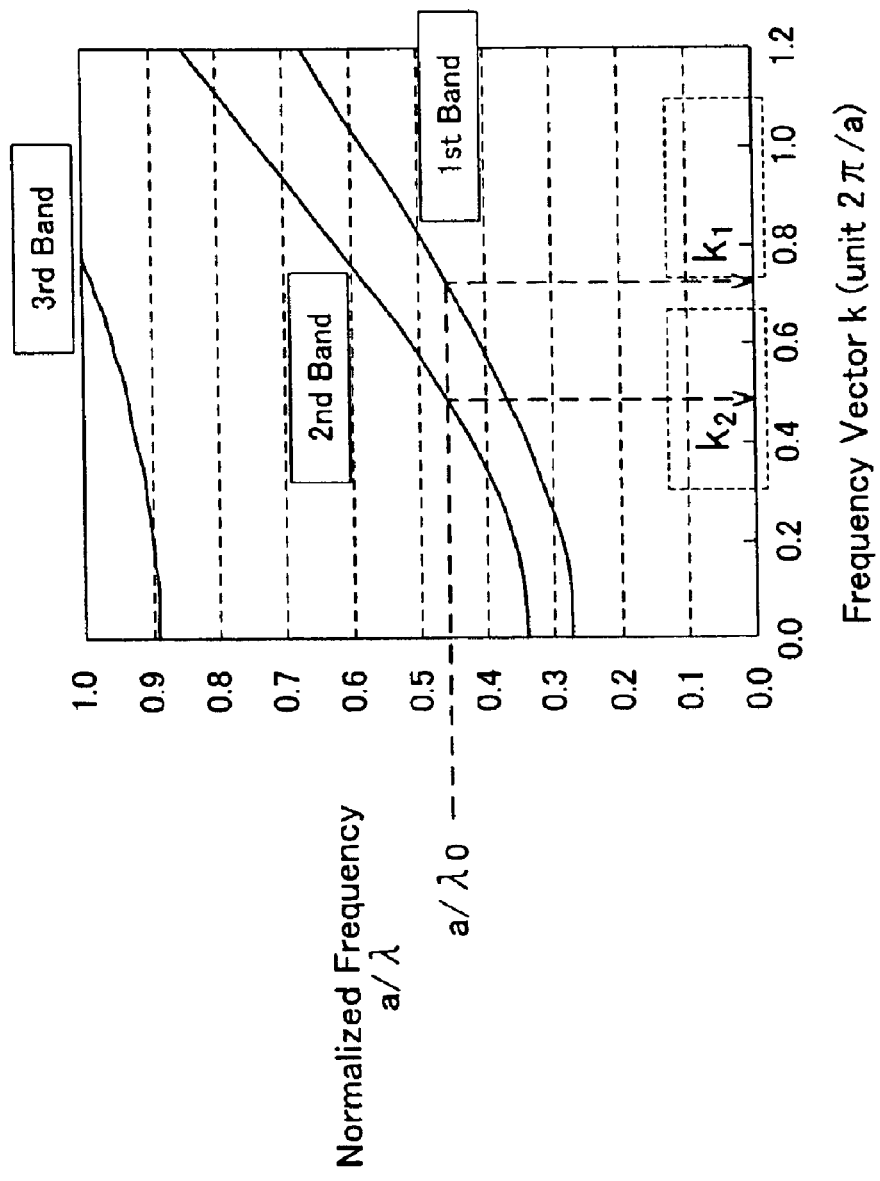
FIG. 19 is a diagram illustrating the coupling of diagonally entering light with the photonic crystal so that propagation occurs at the Brillouin zone boundary.

FIG. 19 is obtained from FIG. 18 by restricting the band diagram on the Brillouin zone boundary to the Z axis direction. As shown in FIG. 19, every band including the first band changes in the same manner as the high degree band shown in FIG. 16 on the Brillouin zone boundaries of FIG. 16. Accordingly, the effects of "the wavelength dispersion being extremely large" and the "group velocity abnormality" are obtained in every band. Thus, these characteristics may be used to manufacture an optical device, such as a light delaying device or a dispersion compensation device, without decreasing the utilizing efficiency of the incident wave energy or the S/N ratio.

The inventors of the present invention have conducted researches to couple a wave from outside a photonic crystal, such as a wave front (incident wave 51) entering the photonic crystal 50 (refer to FIG. 13) with high degree propagation wave that advances through the photonic crystal 50 in the Z axis direction. Such coupling will be discussed below.

(1) <Example in Which a Band on the Central Line of the Brillouin Zone is Used>

The term "band on the central line of the Brillouin zone" refers to the photonic band existing on the central line of the Brillouin zone in a photonic band structure. For example, the first band on a central line 60 of the Brillouin zone in the photonic band structure of FIG. 15 or the second band on a central line of the Brillouin zone corresponds to the photonic band existing on the central line.

When a phase modulating wave having a period a in the same direction enters the photonic crystal having period a (e.g., the photonic crystal 50 of FIG. 13), only propagation wave belonging to a certain high degree band results. Further, when observing the optical path in a reverse manner, a phase modulating unit is arranged after high degree band propagation wave is output from the second end surface 50b of the photonic crystal 50 to return the propagation wave to a plane wave.

Figure 20:
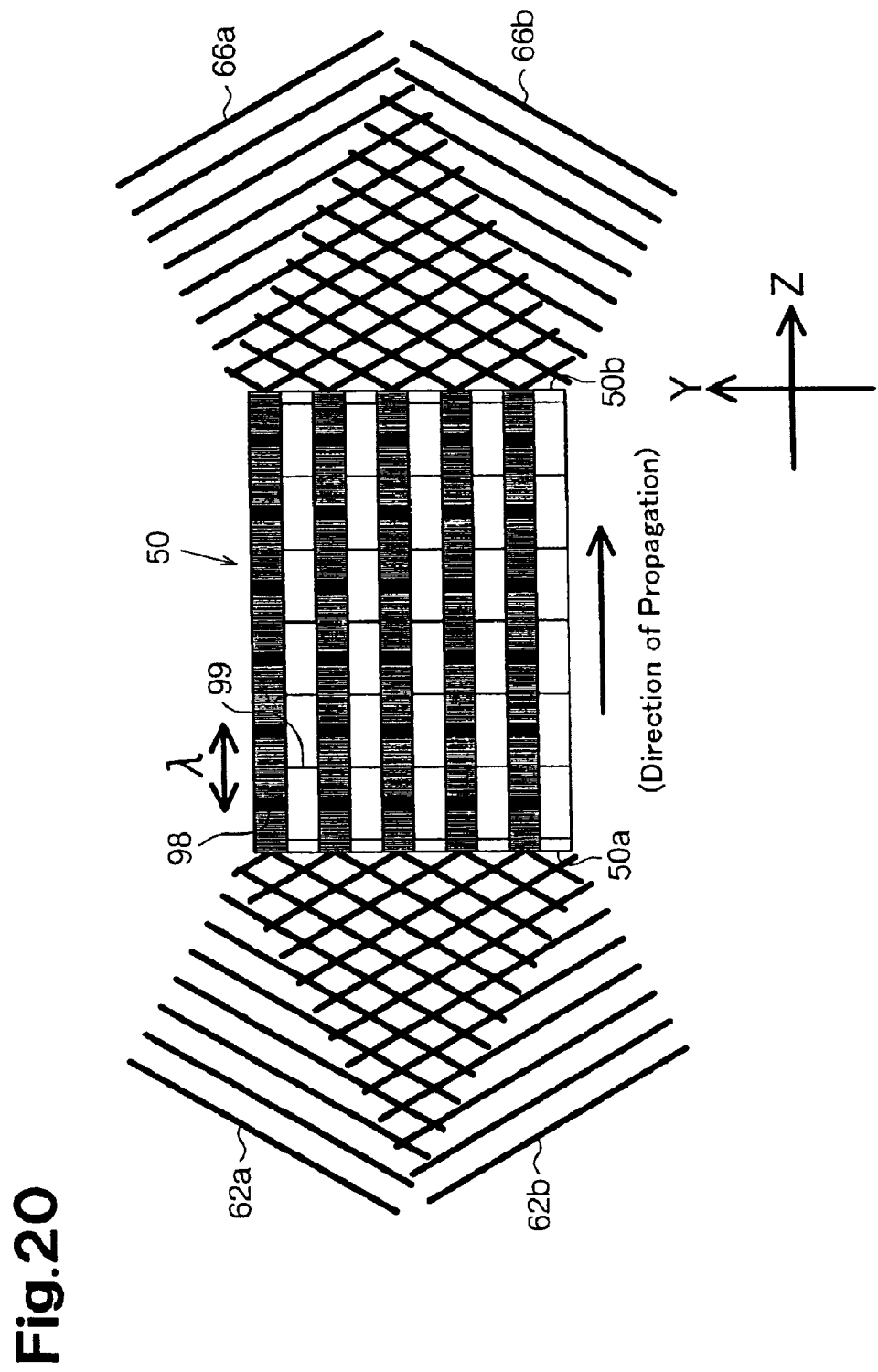
FIG. 20 is a diagram illustrating incident wave of which phase is modulated by a wave front intersection in two directions.

For example, as shown in FIG. 20, plane waves 62a and 62b of two directions intersect to produce an interference wave having period a in the Y axis direction. At this position, the first end surface 50a of the photonic crystal 50 is arranged to couple high degree band propagation wave from most of the incident energy. As shown in FIG. 20, in the cross section of Y-Z plane of the waveguide defined in the photonic crystal 50 of FIG. 13, an "electric field pattern" is illustrated. FIG. 20 shows that ridges 98 of electric fields indicated by thick lines have larger amplitudes than ridges 99 indicated by thin lines 99. Further, FIG. 20 shows that in the periodic multilayer film forming the photonic crystal 50, phase shift of half wave appears between the electric field ridges 98 in high refractive index layers and ridges 99 in low refractive index layers.

Figure 21:
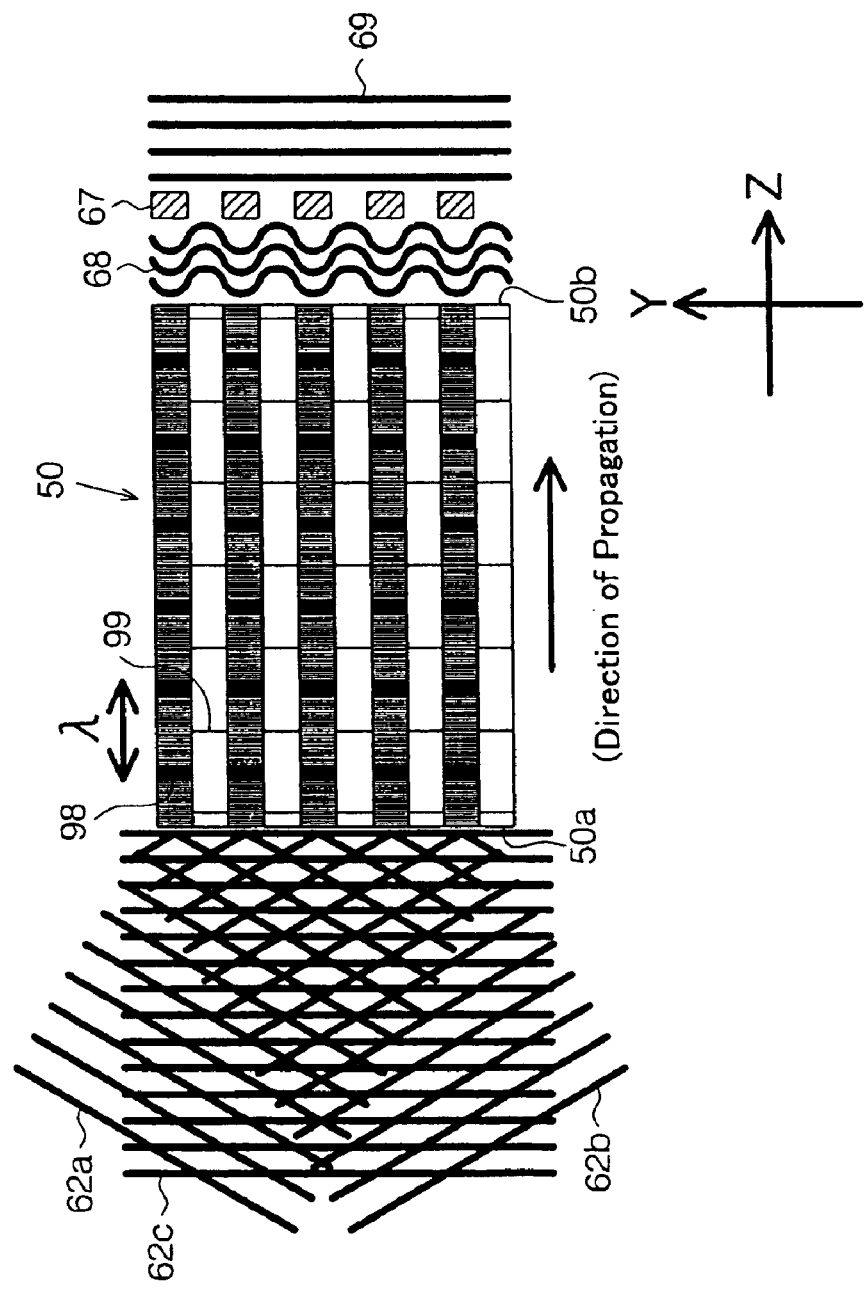
FIG. 21 is a diagram illustrating light of which phase is modulated by a wave front intersection in three directions.
Figure 22:
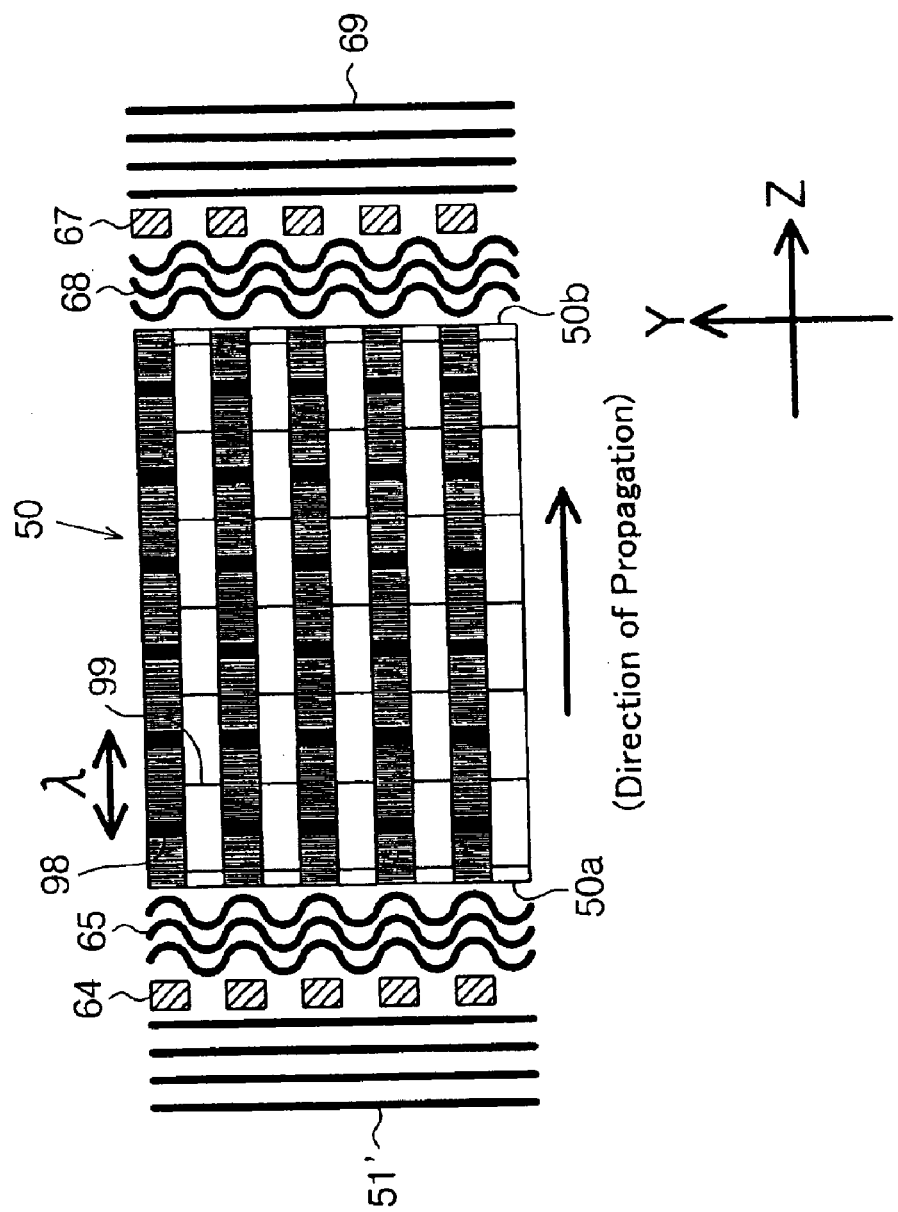
FIG. 22 is a schematic diagram showing phase modulation with a phase grating having period a and arranged at an input side and an output side of the photonic crystal.

To further increase the ratio of the high degree band propagation wave from that of FIG. 20, the number of input plane waves may be increased compared to FIG. 20 as shown in FIG. 21. For example, plane waves 62a, 62b, and 62c of three directions enter the first end surface 50a of the photonic crystal 50. Further, as shown in FIG. 22, a phase grating 64 having cycle a is arranged near the first end surface 50a of the photonic crystal 50. A phase grating 64 phase-modulates incident wave 51' to generate and input a phase-modulated wave 65 having period a. In the same manner as in FIG. 20, this converts most of the incident wave energy to high degree propagation wave. In this case, the phase grating 64 may easily be obtained by, for example, forming grooves near the first end surface 50a of the photonic crystal 50.

When wave is directly output from the second end surface 50b of the photonic crystal 50, the period structure of the second end surface 50b causes diffraction. For example, as shown in FIG. 20, the periodic structure of the second end surface 50b changes the output wave to diffraction waves 66a and 66b. However, as shown in FIG. 22, a phase grating 67, which is similar to the phase grating 64 having period a and arranged near the first end surface 50a of the photonic crystal 50, is arranged behind the second end surface 50b of the photonic crystal 50, which is shown in FIGS. 21 and 22, to return the output wave 68 to a plane wave 69 with the phase grating 67.

(2) <Example in Which a Band on a Boundary of the Brillouin Zone is Used>

Methods for achieving "propagation on boundaries 100a and 100b of the Brillouin zone" will now be discussed as shown in FIGS. 18 and 19.

(2a) Plural Band Propagation for Diagonal Input:

As shown in FIGS. 18 and 19, in a frequency range in which a first band and a second band both exist, the incident angle θ of incident wave 51 diagonally entering the first end surface 50a of the photonic crystal 50 shown in FIG. 13 is set to satisfy the following condition:

$$n \cdot \sin\theta \cdot (a/\lambda_0) = 0.5$$

This results in a wave in which the propagation of the first and second band overlap with each other. The propagation obtained in such a case is described below.

Figure 23:
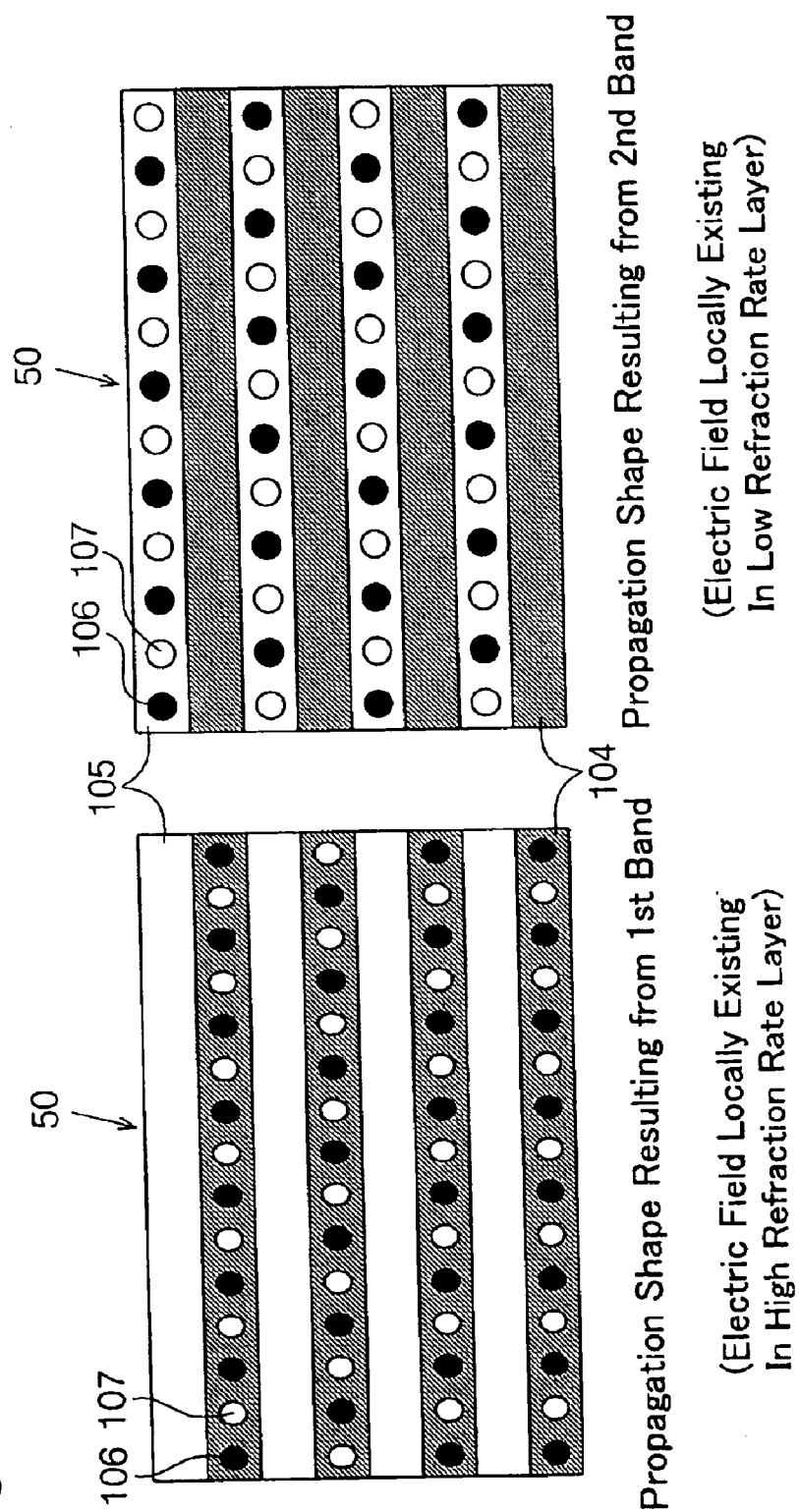
FIG. 23 is a diagram schematically showing propagation wave with first and second bands in the Brillouin zone boundary.

As shown in the left side of FIG. 23, first band propagation wave loops exist in high refractive index layers and nodes exist in low refractive index layers. In other words, electric field ridges 106 and electric field valleys 107 exist in the high refractive index layers 104 of the photonic crystal 50, and nodes exist in the low refractive index layers 105 of the photonic crystal 50.

As shown in the right side of FIG. 23, second band propagation wave loops exist in the low refractive index layers and nodes exist in high refraction layers. The wavelength is longer than the propagation wave of the first band. In other words, the electric field ridges 106 and the electric field valleys 107 exist in low refractive index layers. Nodes of the electric field exist in high refractive index layers 104. The wavelength of the electric field ridges 106 and valleys 107 is longer than the propagation wave of the first band.

Figure 24:
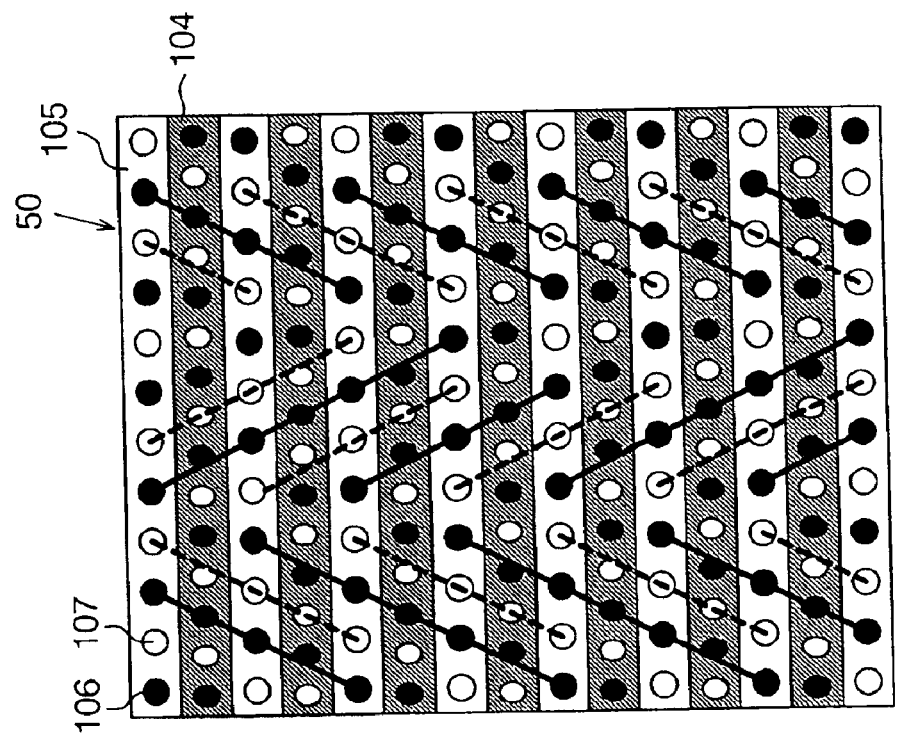
FIG. 24 is a diagram schematically showing an electric field pattern synthesized by propagation wave with first and second bands in the Brillouin zone boundary.

When the first band propagation wave and the second band propagation wave are overlapped as shown in FIG. 24, an electric field pattern in which the electric field ridges 106 and valleys 107 are alternately repeated are formed in the high refractive index layers 104 and low refractive index layers 105 as shown in FIG. 24.

The method for obtaining a wave by overlapping the propagation of the first band and the second band is very easy. Incident wave is just inclined. Further, the value of $a/\lambda_0$ may be increased to add a propagation wave of a higher degree band, which is the third band or greater.

However, in this method, the propagation waves of two or more bands are mixed. Since the wavelength or group velocity differs in the photonic crystal, the propagation waves become a large obstacle when forming an optical device required to have the same characteristics. Accordingly, this method is especially advantageous for applications in which it is required only that the group velocity of the propagation wave becomes slower and the non-linear effect becomes large.

Figure 25:
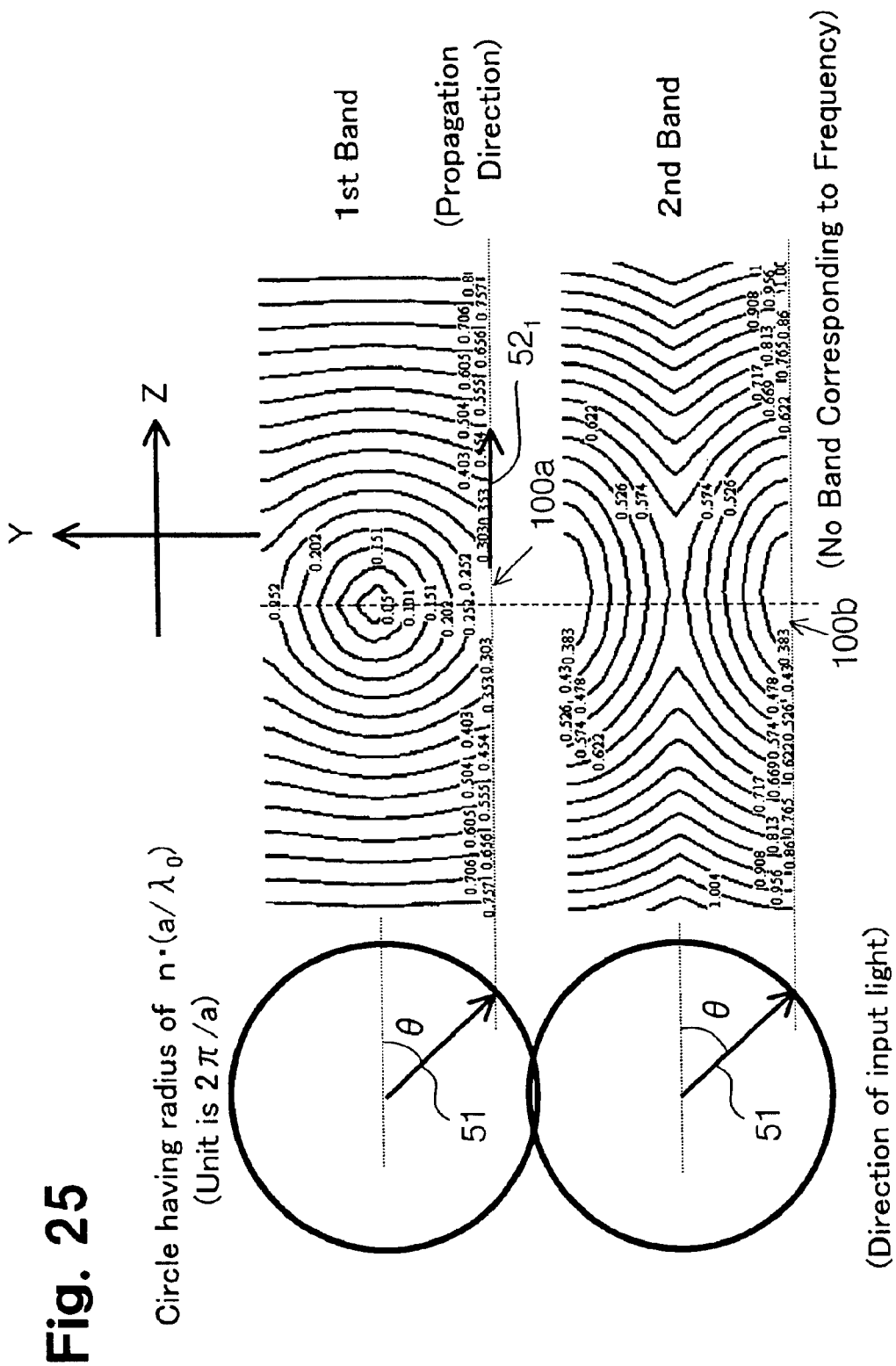
FIG. 25 is a diagram illustrating the coupling of light diagonally entering the end surface of the photonic crystal with the photonic crystal in the Brillouin zone boundary.

(2b) Propagation of First Band Resulting from Diagonal Input:

As shown in FIG. 25, in a frequency range in which only the first band exists (there is no second band corresponding to the frequency), the incident angle θ of incident wave diagonally entering an end surface of a photonic crystal, for example, the end surface 50a of the photonic crystal 50 shown in FIG. 13, is set to satisfy the following condition:

$$n \cdot \sin\theta \cdot (a/\lambda_0) = 0.5.$$

This results in propagation of only one band (first band propagation wave $52_1$).

In this method, the incident wave is simply inclined. Thus, this method is simple like method (2a). However, the value of $a/\lambda_0$ for "the frequency range in which only the first band exits" is small. Thus, the input angle θ and the refractive index n must both be increased. As a result, the refractive index at the first end surface 50a of the photonic crystal 50 is relatively large and loss increases.

Figure 26:
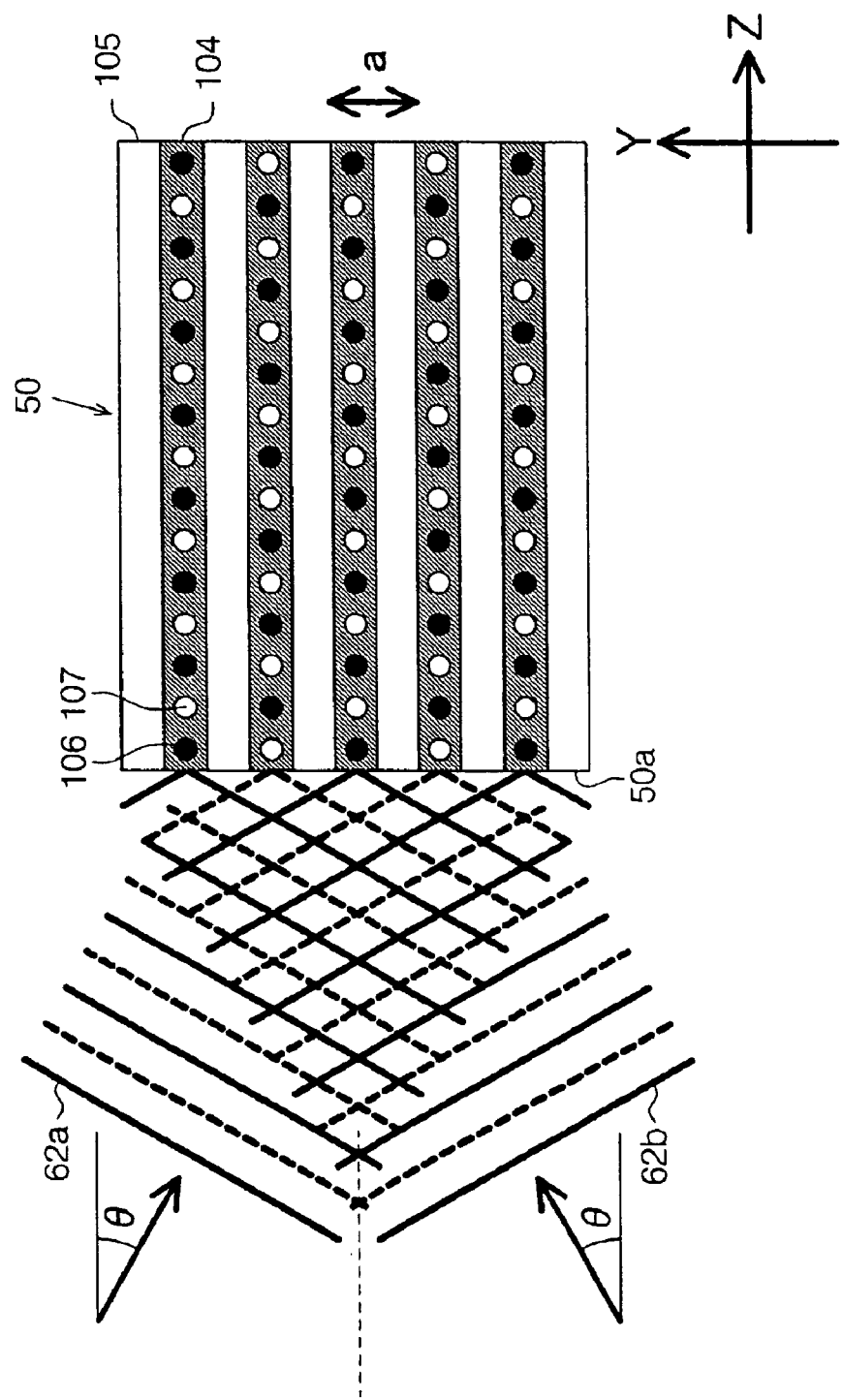
FIG. 26 is a diagram illustrating phase modulation of the entering light with interference of wave fronts that intersect in two directions.

(2c) Phase Modulation of Incident Wave Resulting from Interference of Wave Front As shown in FIG. 26, when plane waves 62a and 62b having the same wavelength enter an end surface of a photonic crystal intersecting each other at an incident angle ±θ, interference forms an electric field pattern having nodes and loops. Accordingly, when arranging the photonic crystal 50 so that the electric field ridges 106 and the electric field valleys 107 exist in the high refractive index layers 104 and the nodes exist in the low refractive index layers 105, in the same manner as the propagation of the first band in FIG. 23, only propagation wave of the first band is generated. When arranging the photonic crystal 50 so that the electric field ridges 106 and the electric field valleys 107 exist in the low refractive index layers 105 and the nodes exist in the high refractive index layers 104, in the same manner as the propagation of the second band in FIG. 23, only propagation wave of the second band is generated.

It is apparent from FIG. 26 that the following relationship must be satisfied:

$$n \cdot \sin\theta \cdot (a/\lambda_0) = 0.5$$

In the equation, n represents the refractive index of the media where incident waves exist.

Figure 27:
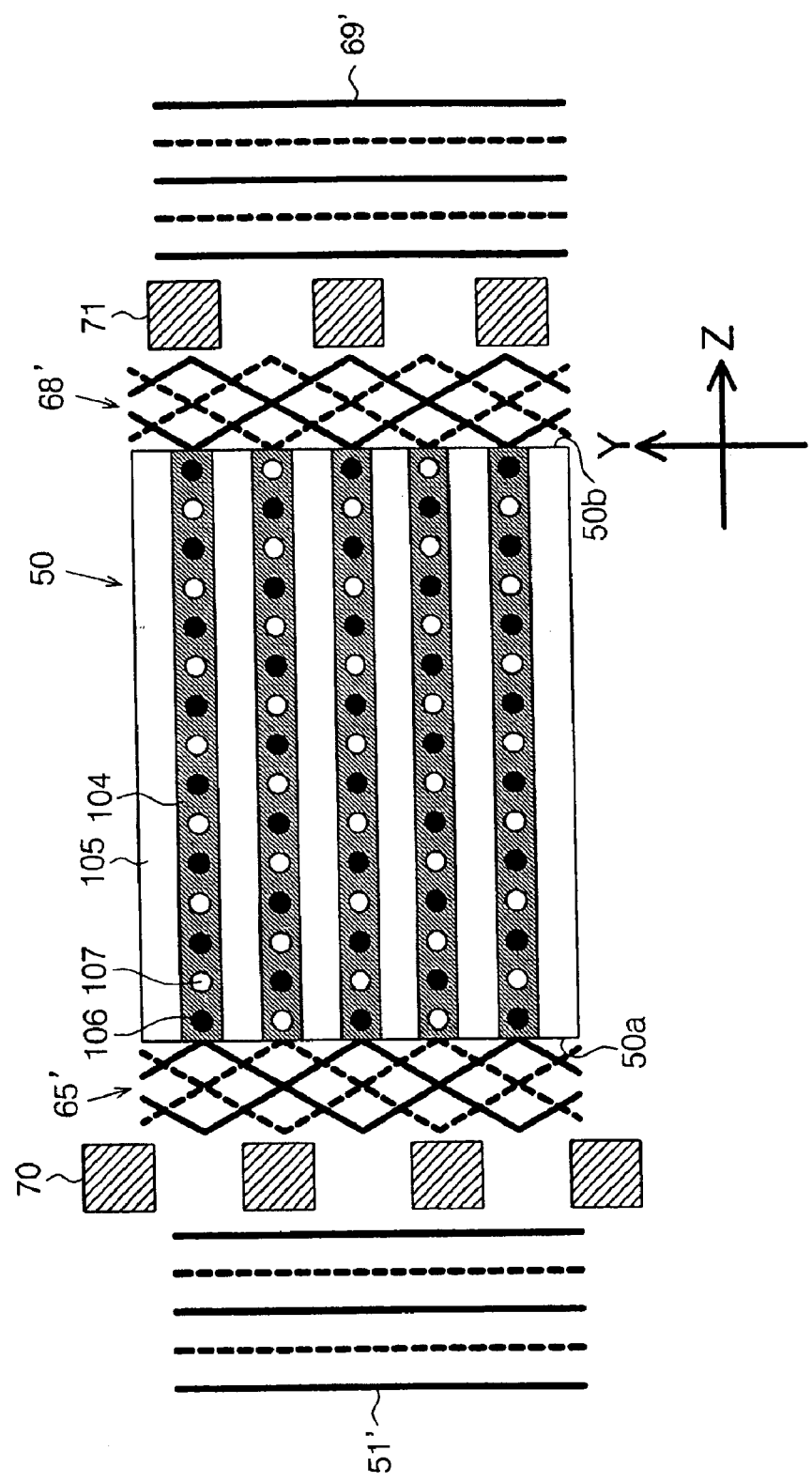
FIG. 27 is a schematic diagram showing phase modulation with a phase grating having a period 2a and arranged at an input side and an output side of the photonic crystal.

(2d) Phase Modulation of Incident Wave with the Arrangement of a Phase Grating:

As shown in FIG. 27, when an incident wave 51' vertically enters a phase grating 70 having period 2a, which is two times the period a of the photonic crystal 50, the interference of +1st order diffracted wave and −1st order diffracted wave generates an electric field pattern having loops (ridges and valleys of electric fields) and nodes similar to when performing method (2c) of FIG. 26, which uses "the interference of two waves". When arranging the photonic crystal 50 so that the electric field ridges 106 and the electric field valleys 107 exist in the high refractive index layers 104 and the nodes exist in the low refractive index layers 105, only propagation wave of the first band is generated. When arranging the photonic crystal 50 so that the electric field ridges 106 and the electric field valleys 107 exist in the low refractive index layers 105 and the nodes exist in the high refractive index layers 104, only propagation wave of the second band is generated.

When diffracted wave, which is 0th order or ±2nd order or greater, is mixed by the phase grating 70, specific band of the photonic crystal 50 is not preferably coupled. It is thus preferable that the ±1st order diffracted waves have a diffraction efficiency of 50%, respectively. Accordingly, it is preferred that the phase grating have an optimal shape to intensify the ±1st order diffracted wave as much as possible.

Further, when optimizing the phase grating 70 with a specific wavelength, the efficiency of the ±1st order diffraction does not decrease suddenly even if the wavelength changes and remains at a high level. Thus, the frequency range used with this method is broader than that of other methods.

In FIG. 27, 65' denotes a phase-modulated wave by the phase grating 70. Further, by arranging a phase grating having period 2a like the phase grating 70 behind the second end surface 50b, output wave 68' may be returned to a plane wave 69'.

Figure 28:
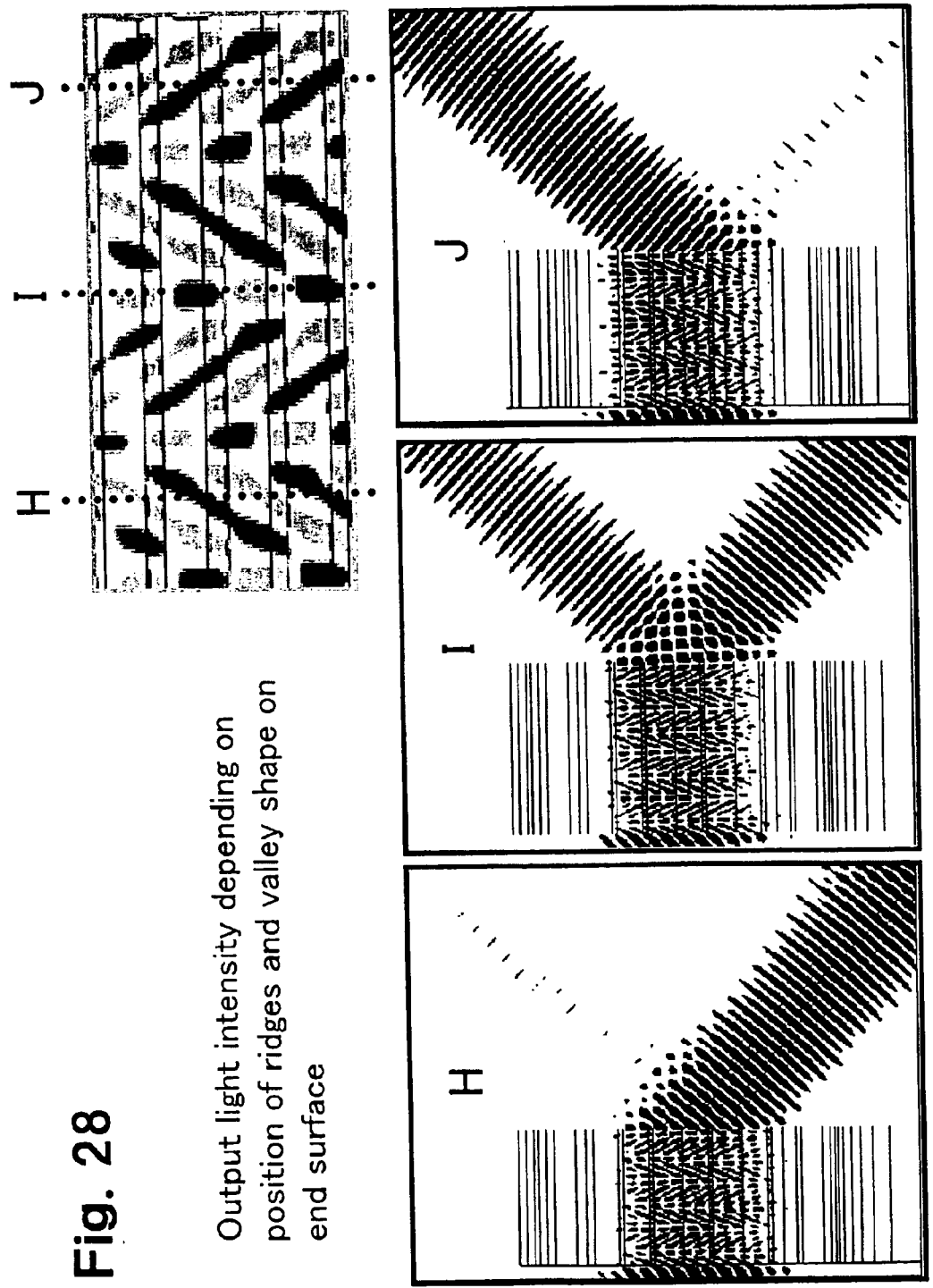
FIG. 28 is a diagram illustrating a diffraction wave of a phase grating in a calculation example when using an interfering wave produced by the phase grating having the period 2a and diagonal light.

(2e) Employment of Interference Wave Resulting from Phase Grating Having Period a and Diagonal Incident Wave The propagation wave in the photonic crystal 50, in which the first band propagation wave and the second band propagation wave co-exist due to method (2a), changes the intensity of the output diffracted wave in accordance with the position of the output end surface (second end surface 50b) of a phase grating. More specifically, as shown in positions H and J of FIG. 28, when the output end surface of the phase grating lies along an inclined surface of a ridge-valley pattern, the diffracted wave in one direction is intensified. Further, as shown by position I of FIG. 28, when the output end surface of the phase grating lies along an apex or bottom of a ridge-valley pattern, the diffracted wave of the two directions become substantially the same. An interference pattern of the output wave that causes the intensity of the diffracted wave of the two directions to become substantially the same is similar to the interference wave generated by the phase grating through method (2d). Thus, by arranging photonic crystal, which has the same period a as the phase grating, immediately after the output end surface of the phase grating, a high degree propagation wave of a specific high degree band is obtained.

In this method, as the phase grating and the photonic crystal, periodic multilayer films having the same structure (and the same period a), the adjustment for aligning the positions of the nodes and loops (ridges and valleys) of the electric field generated by an interference wave with the photonic crystal is not necessary. The following condition must of course be satisfied:

$n \cdot \sin \theta \cdot (a/\lambda_0) = 0.5$ (2f) Employment of Interference Wave Resulting from Phase Grating Having Period 2a and Diagonal Incident Wave In method (2d), when the value of $a/\lambda_0$ is 0.5 or less, it becomes difficult to increase the intensity of ±1 order diffraction waves in a phase grating formed by a low refractive index substance, such as quartz and air. By forming the phase grating with a high refractive index material, such as silicon, the intensity of the ±1st order diffraction waves may be increased. However, this increases Fresnel reflection or causes the manufacturing of the phase grating to be difficult.

Figure 29:
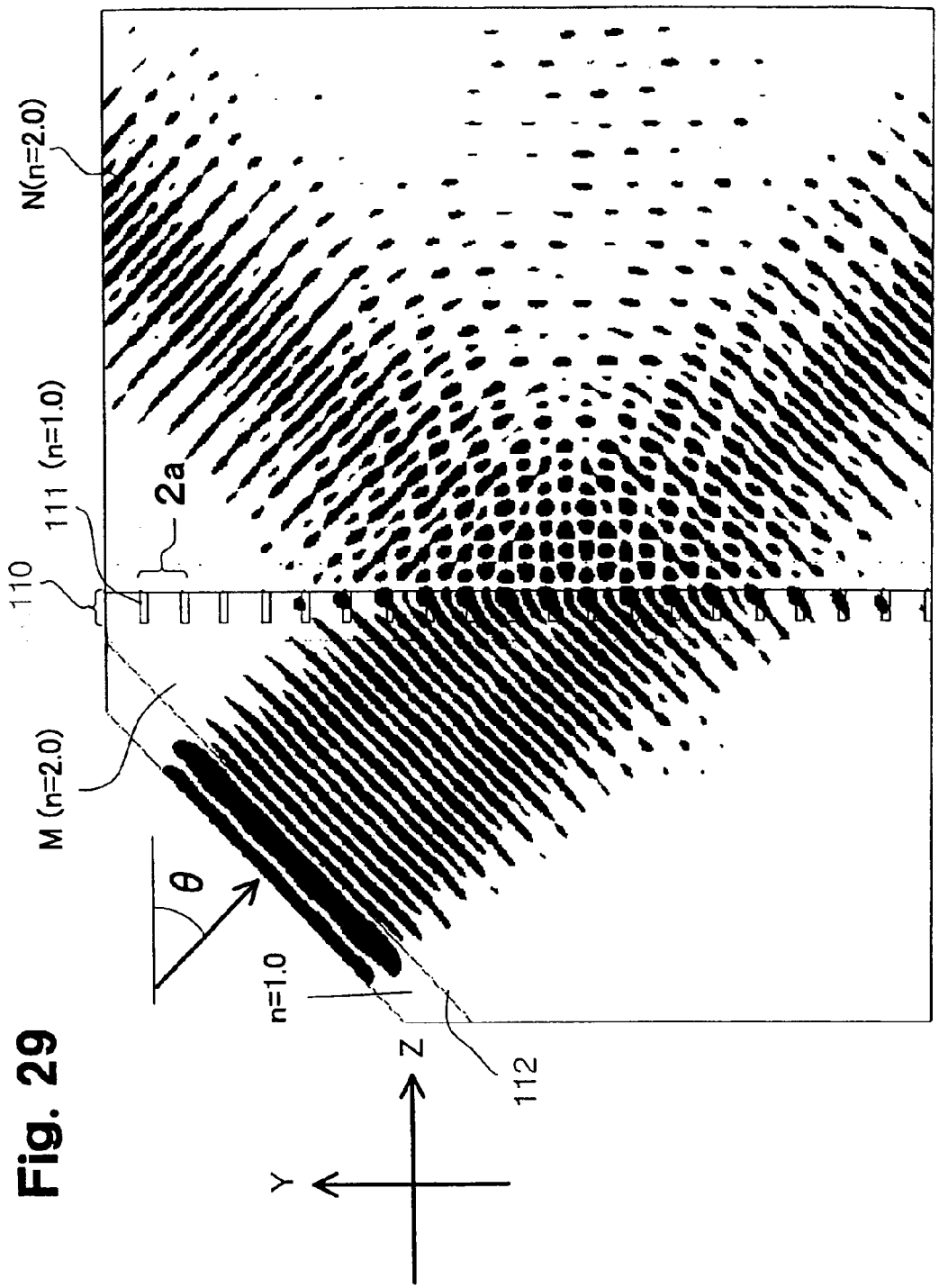
FIG. 29 is a diagram illustrating an electric field pattern in a calculation example when using the interfering wave produced by the phase grating having the period 2a and diagonal light.

However, when the period of the phase grating is 2a, which is two times greater than that of the photonic crystal, and the incident wave substantially satisfies the condition of $n \cdot \sin \theta \cdot (a/\lambda_0) = 0.5$, the pair of diffracted waves that generate the interference pattern of FIG. 29 may be intensified even if the value of $a/\lambda_0$ is small.

Thus, when arranging the photonic crystal having period a immediately after the phase grating, a high degree propagation wave of a specific band may be obtained. This method is similar to method (2e) but differs greatly from method (2e) in that the period of the phase grating is 2a (two times the period of the photonic crystal).

The result of electromagnetic wave simulation using the finite element method when employing an interference wave produced by a phase grating having period 2a and a diagonal incident wave is shown below.

(Structure of Periodic Multilayer Film Forming Photonic Crystal)

Example in which substance K and L are alternately superimposed.

(Substance K) thickness $t_K = 0.30a$, refractive index $n_K = 2.1011$ (Substance L) thickness $t_L = 0.70a$, refractive index $n_L = 1.4578$ The band diagram (TE polarization) of the photonic crystal is the same as that of FIG. 14.

(Structure of Phase Grating)

FIG. 29 shows a phase grating 110 including rectangular grooves 111 having period 2a formed in a surface made of substance M, the refractive index n of which is 2.00. The grooves are filled with air (refractive index: 1.00). Substance M has an inclined surface 112 in correspondence with, for example, the input angle θ of 47.332°. The end surface 112 serves as an inclined input surface. The surface of substance N, the refractive index is 2.00, contacts the end surface of the phase grating 110.

(Substance M) Y-direction thickness $t_m = 1.6a$, refractive index $n_m = 2.00$ (Substance L) Y-direction thickness $t_k = 0.4a$, refractive index $n_L = 2.00$ Y-direction period of phase grating 110 = 2a Z-direction length of phase grating 110 = 1.5642a The shape of the phase grating was optimized to intensify two diffracted waves.

(Incident Wave)

(Wavelength in Vacuum) $\lambda_0$ = TE polarization (direction of electric field in X axis direction) of 2.941a ($a/\lambda_0 = 0.340$)

(Input Light θ) θ = 47.332°

The condition of $n \cdot \sin \theta \cdot (a/\lambda_0) = 0.5$ is satisfied.

(Arrangement of Phase Grating)

FIG. 29 shows the interference wave of the phase grating 110 in homogeneous medium N (refractive index of N is 2.00). The interference waves extending toward the two sides are intense, and the interference waves advancing perpendicular to the phase grating 110 are weak. This forms an alternating interference pattern.

Figure 30:
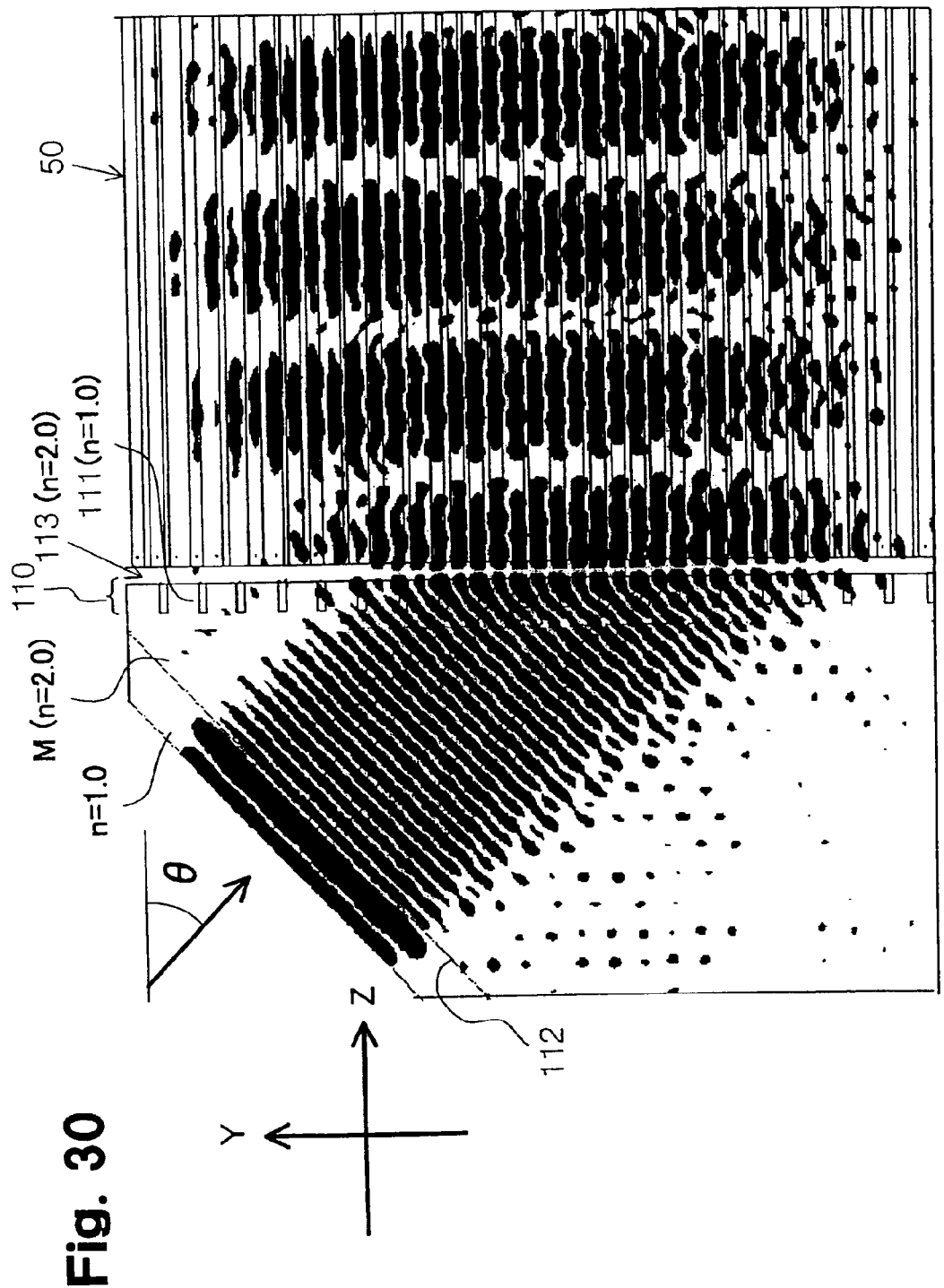
FIG. 30 is a diagram illustrating an electric field pattern in a calculation example when arranging the phase grating under certain conditions using the interfering wave produced by the phase grating having the period 2a and diagonal light.

In the example of FIG. 30, the photonic crystal 50 is set in lieu of N in the structure of FIG. 29, the phase grating 110 and the photonic crystal 50 are separated by an interval of 0.90909a, and the gap is filled with a medium 113 having a refractive index n of 2.0. The phase grating 110 is positioned in the Y axis direction at the loops of an interference wave (ridge and valley of an electromagnetic wave) in the center of a high refractive index layer of the photonic crystal 50. The width of the input portion on an end surface of the photonic crystal 50 is about 24 periods. Thus simulation result of such example is shown in FIG. 30.

In this simulation, the value of $a/\lambda_0$ is small. Therefore, the wavelength of the electromagnetic wave that propagates through the photonic crystal is extremely long.

(2g) Employment of Inclined Surface

The light that propagates on the boundary of the Brillouin zone is obtained by using an inclined end surface as the input side end surface of a photonic crystal and having an incident wave enter the inclined end surface.

Figure 31A:
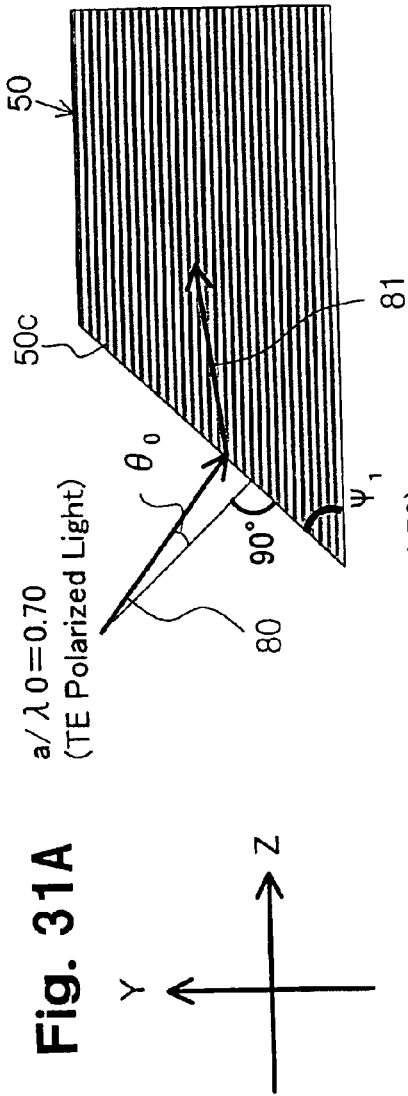
FIG. 31A is a diagram illustrating a wave front entering a sloped end surface to obtain propagation wave in the Brillouin zone boundary.
Figure 31B:
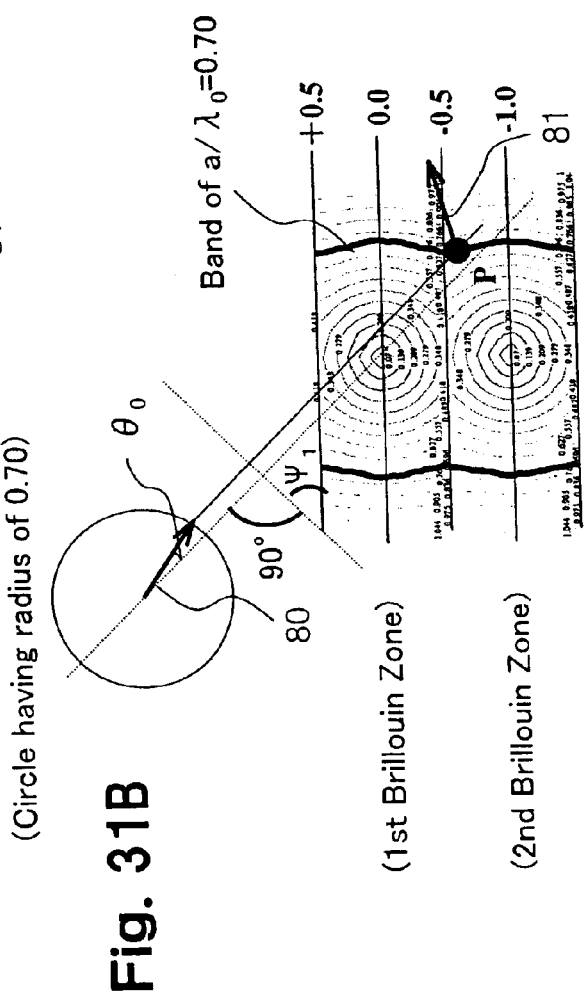
FIG. 31B is a diagram illustrating the coupling of light entering the sloped end surface at an angle $\theta_0$ with the photonic crystal.

As shown in FIG. 31A, when an incident plane wave 80 enters an inclined surface 50c (angle ψ1) of the photonic crystal 50 at incident angle $\theta_0$, the position P of the coupled band is obtained by generating a diagram. The angle ψ1 and input angle $\theta_0$ are adjusted so that the position P is located on the Brillouin zone boundary. This results in a high degree propagation wave 81 that advances in the Z axis direction.

Methods (2a) to (2g) efficiently form high degree band propagation wave, which uses a band on the Brillouin zone boundary, in the one-dimensional photonic crystal. Further, when propagation wave enters a homogeneous medium from a vertical end surface of the photonic crystal, several diffracted waves appear making handling difficult. However, when reversing and arranging the input side phase grating at the output side end surface using methods (2d) to (2g) or by using an inclined end surface that is reversed from the input side inclined end surface as the output side end surface, the output wave is reversed to a plane wave. This facilitates coupling with optical fibers.

Figure 32:
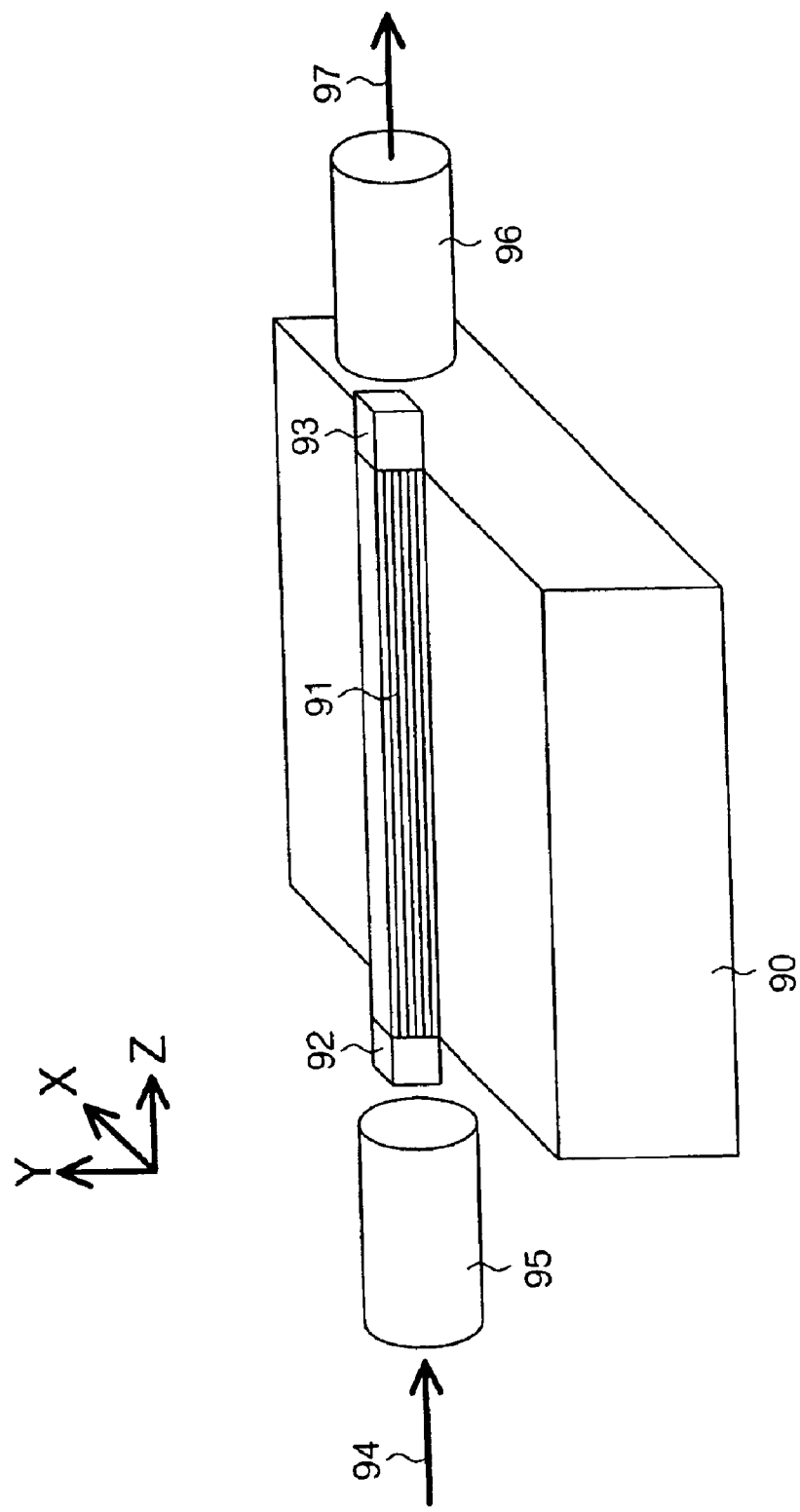
FIG. 32 is a perspective view showing the structure of an optical device that forms a waveguide with the photonic crystal.

When actually manufacturing an optical device that efficiently forms high degree band propagation wave in a one-dimensional photonic crystal using a band on the Brillouin zone boundary, the optical device has the shape of a waveguide, as shown in FIG. 32. This facilitates connection to optical fibers and, for example, the arrangement of electrodes for controlling the above characteristics ("extremely large wavelength dispersion" and "group velocity abnormality").

The optical device of FIG. 32 has a waveguide formed in a one-dimensional photonic crystal 91 on a substrate 90. Phase gratings 82 and 93 are arranged at the two ends of the waveguide. A lens element such as a rod lens 95 converts input beam 94 to a focus at the end surface of a phase grating 92. The phase grating 92 couples the beam to the photonic crystal 91. The wave propagates through the waveguide of the photonic crystal 91 and is converted to an output plane wave 97 as it passes through the phase grating 93 and a lens element, such as a rod lens 96.

When forming a waveguide with the photonic crystal 91, it is preferred that wave be confined in the vertical direction (Y axis direction) and the lateral direction (X axis direction).

(Enclosure in Vertical Direction)

When manufacturing an optical device including a one-dimensional photonic crystal 50 having a periodic characteristic in, for example, only the Y axis direction, with the periodic multilayer film structure of FIGS. 13 and 32, the thickness of the multilayer film is restricted. Thus, there are cases in which it is preferable that the waveguide structure confines wave in the vertical direction (Y axis direction) and the lateral direction (X axis direction).

When the effective refractive index in the Z axis direction of the high degree band propagation wave in the photonic crystal 50 is greater than the refractive index of a surrounding medium contacting the photonic crystal 50, the refractive index difference directly results in confinement. However, when the effective refractive index is smaller than the refractive index of the surrounding medium, the high band propagation wave 52 leaks toward the surrounding medium. Especially, when the effective refractive index of the high degree band propagation wave 52 is less than 1, the leakage of the high degree band propagation wave 52 cannot be prevented even if the surrounding medium is air.

Figure 33:
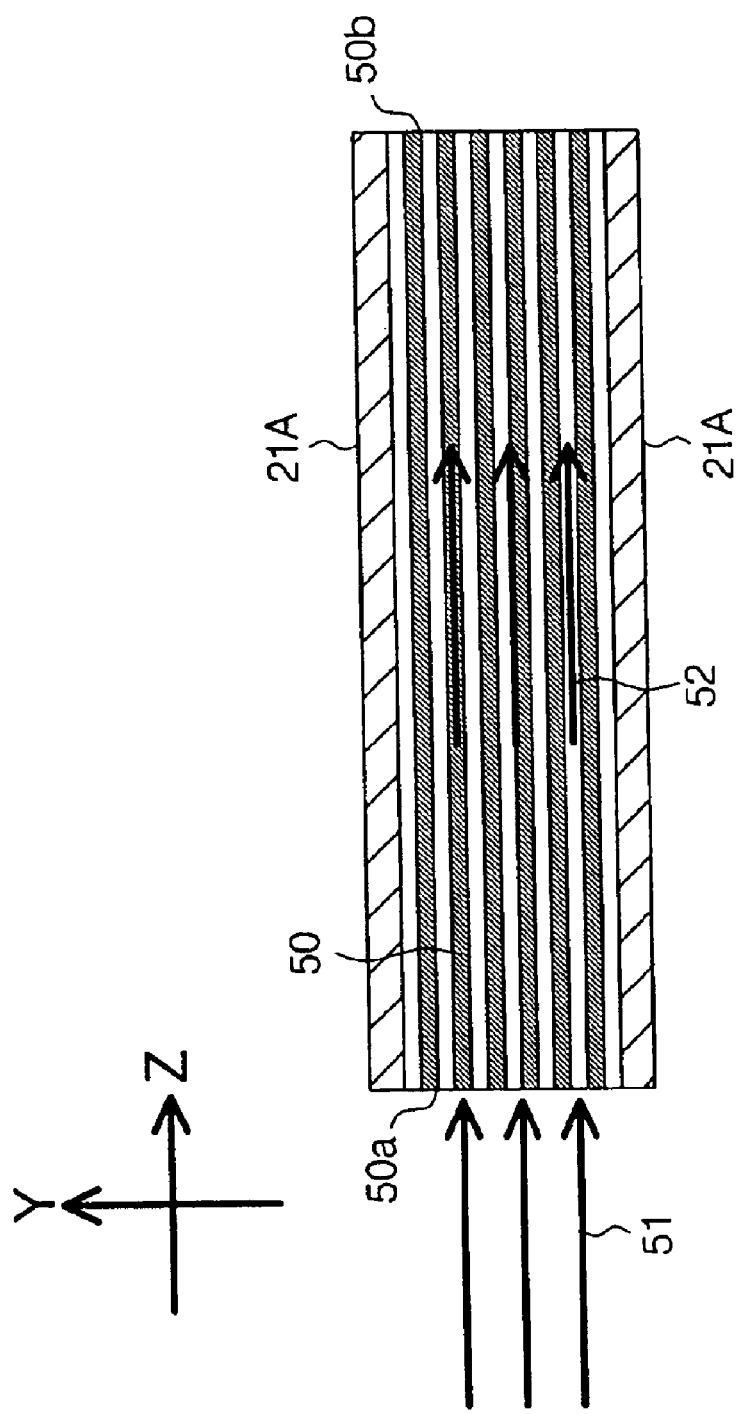
FIG. 33 is a side view showing an example of a structure having reflective layers in a Y axis direction of the photonic crystal.

To prevent leakage of the high degree band propagation wave 52, metal films, such as reflective layers 21A, may be arranged on the side surfaces in the Y axis direction of the photonic crystal 50 shown in FIG. 33.

In the structure of FIG. 33, metal films, such as reflective layers 21A may cause attenuation due to a decrease in the multilayer film intensity because of lack of reflection rate. In such a case, as shown in FIG. 34, photonic crystals 101 having a period or structure differing from those of the photonic crystal 50 are arranged on and beneath the photonic crystal 50 for confinement in the vertical direction.

Figure 35:
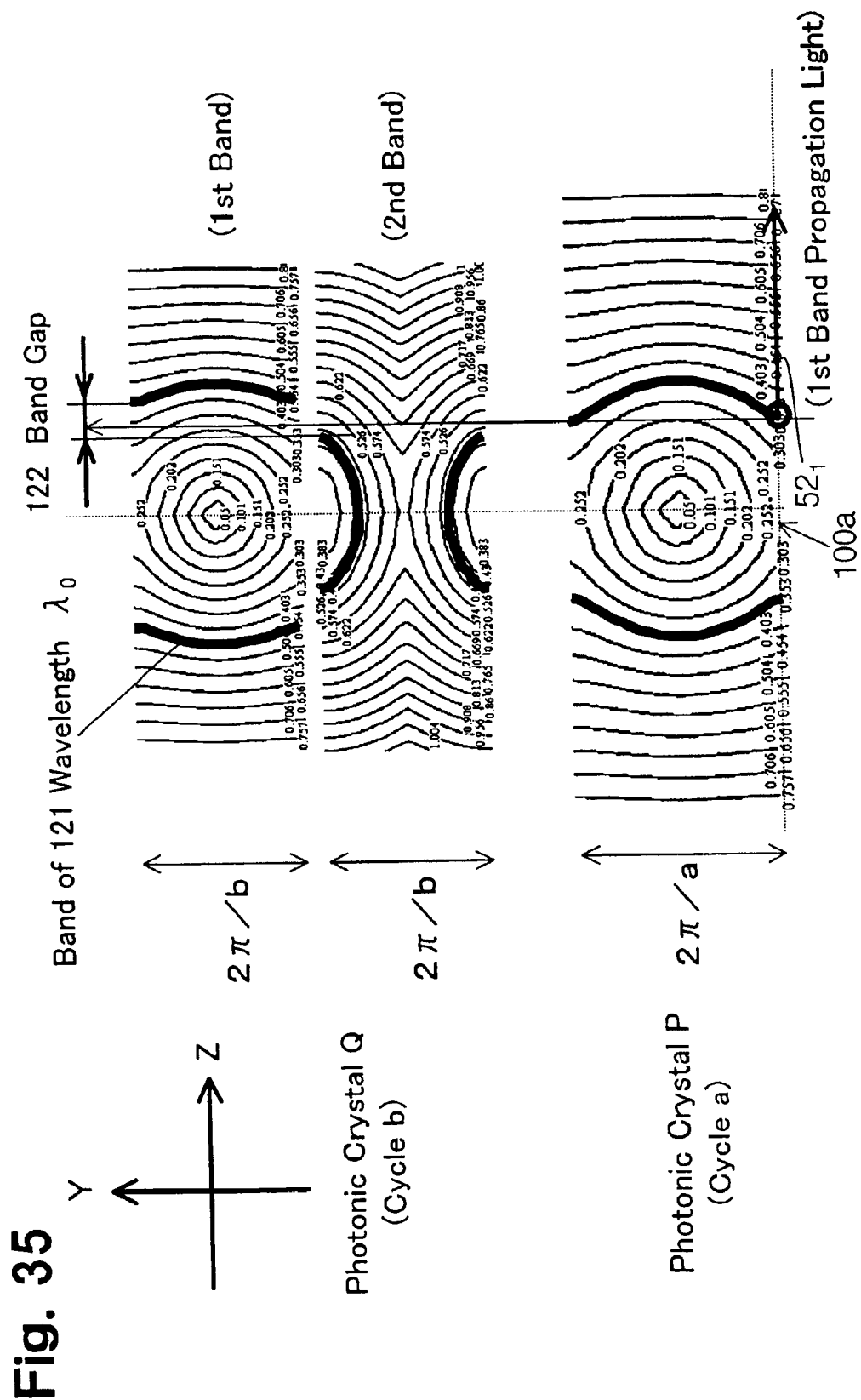
FIG. 35 is a diagram illustrating confinement in the Y axis direction due to photonic crystals having different periods and structures.

FIG. 35 schematically shows the band diagram of a one-dimensional photonic crystal P having period a and an adjacent one-dimensional photonic crystal Q having period b (b>a) relative to an incident wave of a certain $\lambda_0$.

Figure 34:
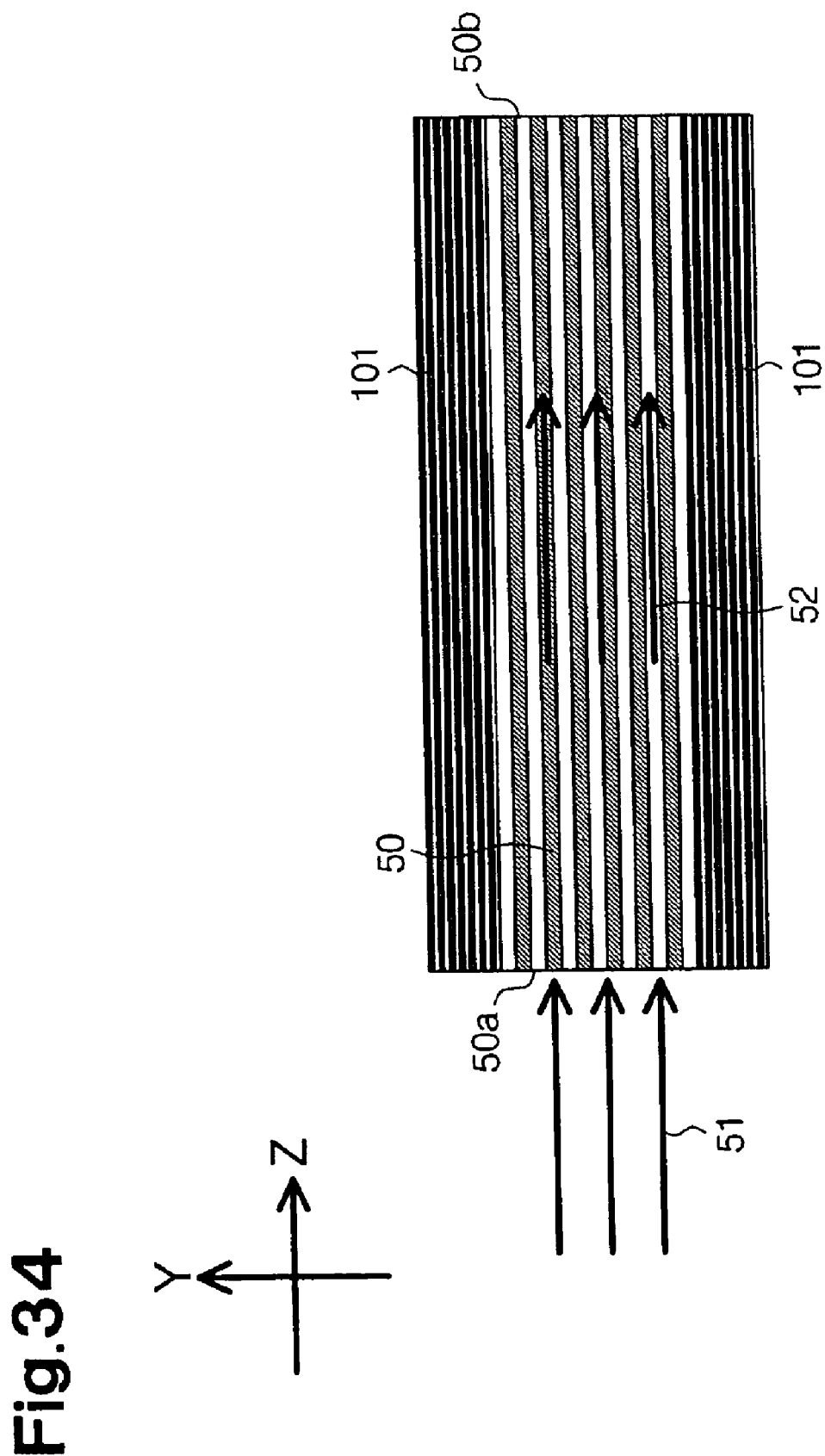
FIG. 34 is a side view showing a structure including photonic crystals having different periods and structures on each side of the photonic crystal in the Y axis direction.

Propagation wave (first band propagation wave $52_1$) in the Z axis direction propagates on the boundary 100a of the Brillouin zone in the photonic crystal P (corresponding to the photonic crystal 50 of FIG. 34). In the photonic crystal Q (corresponding to the photonic crystal 101 of FIG. 34), a region (photonic band gap, PBG) 122 in which there is no bands in the Z axis direction is produced, and there is no band corresponding to the propagation in the photonic crystal P. Accordingly, the propagation wave (first band propagation wave $52_1$) of the photonic crystal P cannot couple to the photonic crystal Q, and the one-dimensional photonic crystal Q having period b performs confinement. In FIG. 35, reference numeral 121 shows a band relative to wavelength $\lambda_0$.

The material and structure of the confinement photonic crystal Q (e.g., photonic crystal 101 of FIG. 34) may differ from the propagation photonic crystal Q. However, to facilitate the manufacturing of the periodic multilayer film, it is preferred that the same materials be used for the photonic crystals P and Q. The period b or the film thickness ratio between the high refractive index layer and the low refractive index layer of the photonic crystal Q may differ from those of the photonic crystal P. Of course, the photonic crystal Q must be designed by confirming through band calculation that in a wavelength range used in the photonic crystal P and a band in which the wave of that wavelength propagates, a band corresponding to the wave number vector of the propagation wave does not exist in the photonic crystal Q.

The determination of the band diagram is performed in accordance with an infinite periodic structure. However, if the number of layers of the confinement photonic crystal Q is, for example, 3, confinement is insufficient, and the propagation wave leaks out. It is of course not preferable from the viewpoint of costs and the durability and accuracy of the multilayer film that the number of layers be increased unnecessarily. It is preferred that the actually required minimum number of layers be determined through experiments and electromagnetic wave simulations.

(Confinement in Lateral Direction)

The side surfaces (left and right surfaces) in the lateral direction (X axis direction) of the waveguide formed by the one-dimensional photonic crystal 91 of FIG. 32 has a core exposed to air. The left and right surfaces of the waveguide formed by the photonic crystal 91 in which the high degree band propagation wave propagates is exposed as an "alternating electric field pattern" as shown in FIGS. 20, 21, 22, 23, 26, and 27. Accordingly, the diffraction waves from the left and right surfaces of the waveguide cancel each other making it difficult to leak into the air. In other words, a certain degree of propagation wave is confined in the left and right surfaces of the waveguide. Especially, when using a band on the Brillouin zone boundary, the amplitudes of adjacent electric fields are equal to each other. This further increases the confinement effect.

Figure 36:
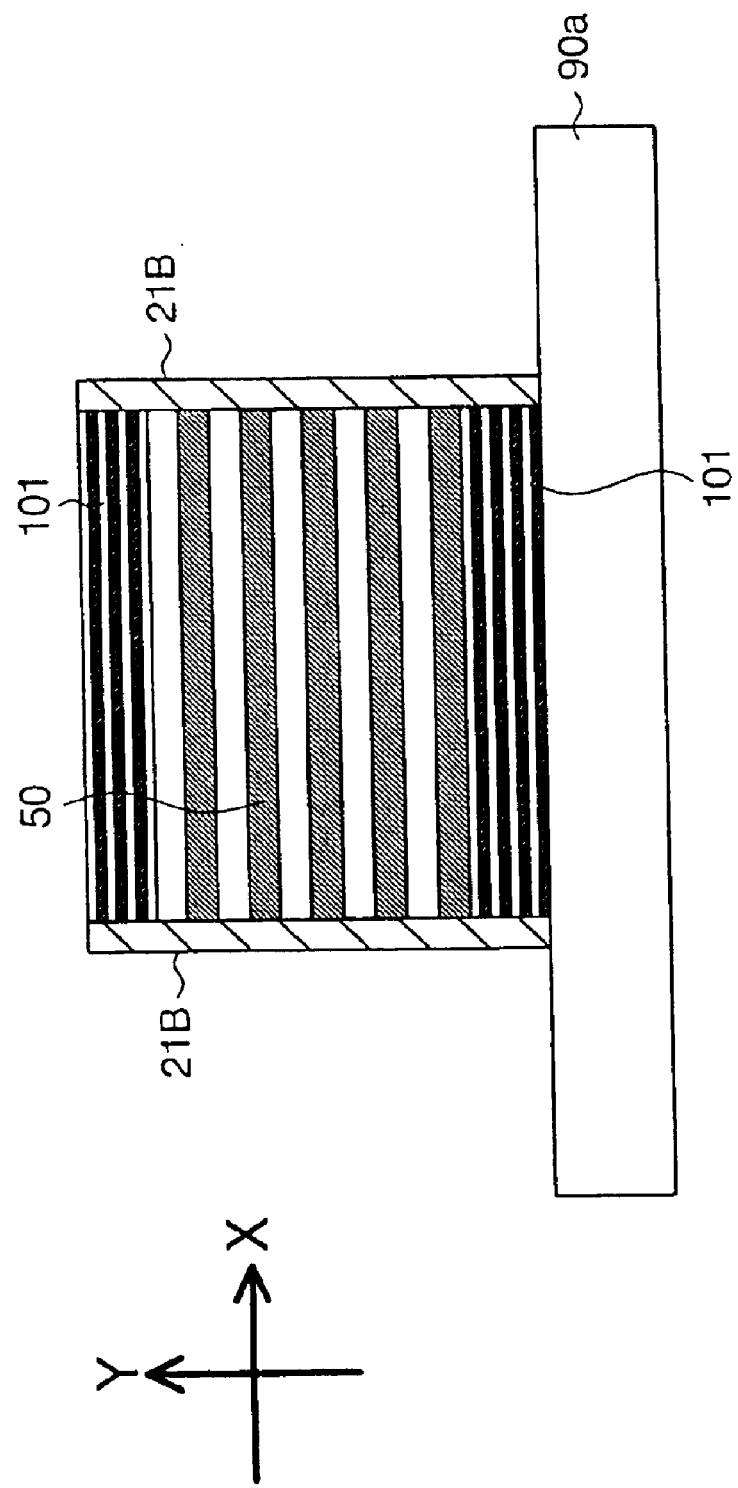
FIG. 36 is a front view showing an example of a structure including reflective layers on sides of the photonic crystal in the X axis directions.
Figure 37:
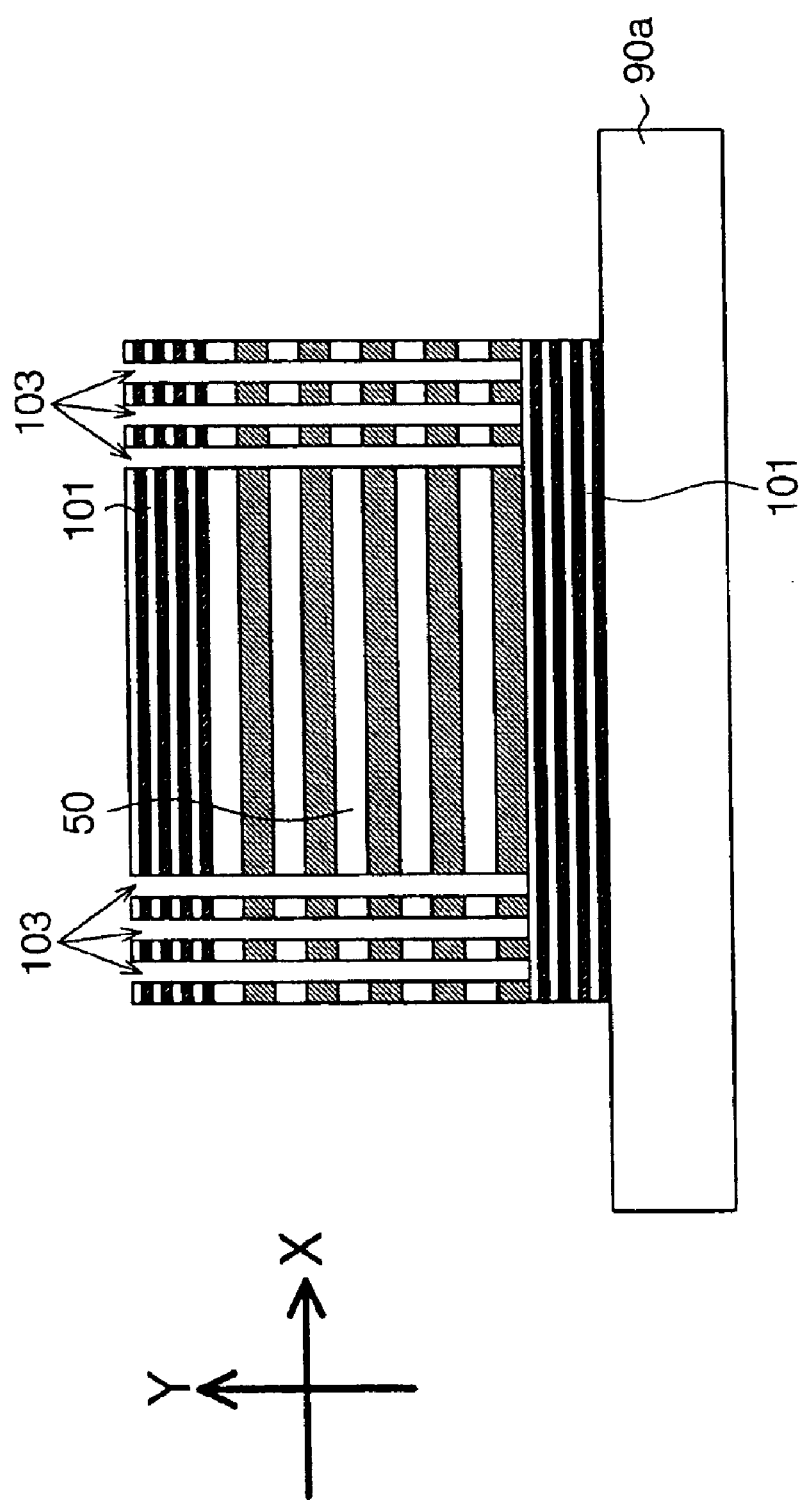
FIG. 37 is a front view showing an example of a structure having deep grooves, which are periodically formed, on each side of the phonic crystal in the X axis direction.

FIGS. 36 and 37 show the cross-section of the waveguide. As shown in FIG. 36, by the reflective layers 21B on the left and right surfaces (the two side surfaces in the X axis direction) of the photonic crystal 50 formed on the substrate 90a, confinement is performed in the lateral direction (X axis direction) of the waveguide of the photonic crystal 50. In addition to the confinement by the reflective layers 21B, photonic crystals 101 having different period and structure from those of the photonic crystal 50 are arranged on the two side surfaces of the photonic crystal 50 in the same manner as in FIG. 34 to perform confinement in the vertical direction.

Further, as shown in FIG. 37, deep grooves 103 are periodically formed in the left and right ends of the photonic crystal 50 to perform lateral confinement of the waveguide with the photonic band gap.

(Other Conditions)

The material of the photonic crystal used in the present invention is not limited as long as transparency in the used wavelength range is obtained. Such material is normally used as the material for a multilayer film. The appropriate materials, which are superior from the viewpoint of durability and film formation cost, are silica, silicon, titanium oxide, tantalum oxide, niobium oxide, magnesium fluoride, and silicon nitride. By using these materials, a photonic crystal having a periodic multilayer structure may easily be manufactured through well know methods, such as sputtering, vacuum vapor deposition, ion assist vapor deposition, and plasma CVD.

As the refractive index ratio between the materials forming the photonic crystal increases, the wavelength dispersion tends to increase. Thus, it is preferred that a high refractive index material be combined with a low refractive index material for applications requiring such characteristics. A practical refractive index ratio is 4 or greater obtained by using, for example, air (refractive index being 1) as the low refractive index material and INSb (refractive index being 4.21) as the high refractive index material ("Microscopic Optics Handbook" p. 224, Asakura Shoten, 1995).

When the refractive index ratio forming the photonic crystal decreases, the difference in characteristics resulting from the polarization direction tends to decrease. Thus, a combination for a small refractive index ratio is useful for achieving polarization independent devices.

The photonic crystal may have the so-called air bridge structure formed from only a periodic multilayer film.

By selecting the appropriate materials, the effects of each embodiment of the present invention are obtained in a wavelength range of 200 nm to 20 μm.

A calculation example specifically showing that the effect in which the size of the diffraction grating is reduced and the frequency resolution ($\omega_0/\Delta\omega$) is improved in each of the above embodiments will now be discussed.

[Calculation Example of Diffraction Grating]

As described above, the photonic crystals 14, 14A, and 14B used in the first to third embodiments and the photonic crystal used in the fifth embodiment are each one-dimensional photonic crystals having a periodic characteristic in the Y axis direction. Further, the photonic crystal 13 used in the sixth embodiment is a one-dimensional photonic crystal having a periodic characteristic only in the Z axis direction.

Figure 38:
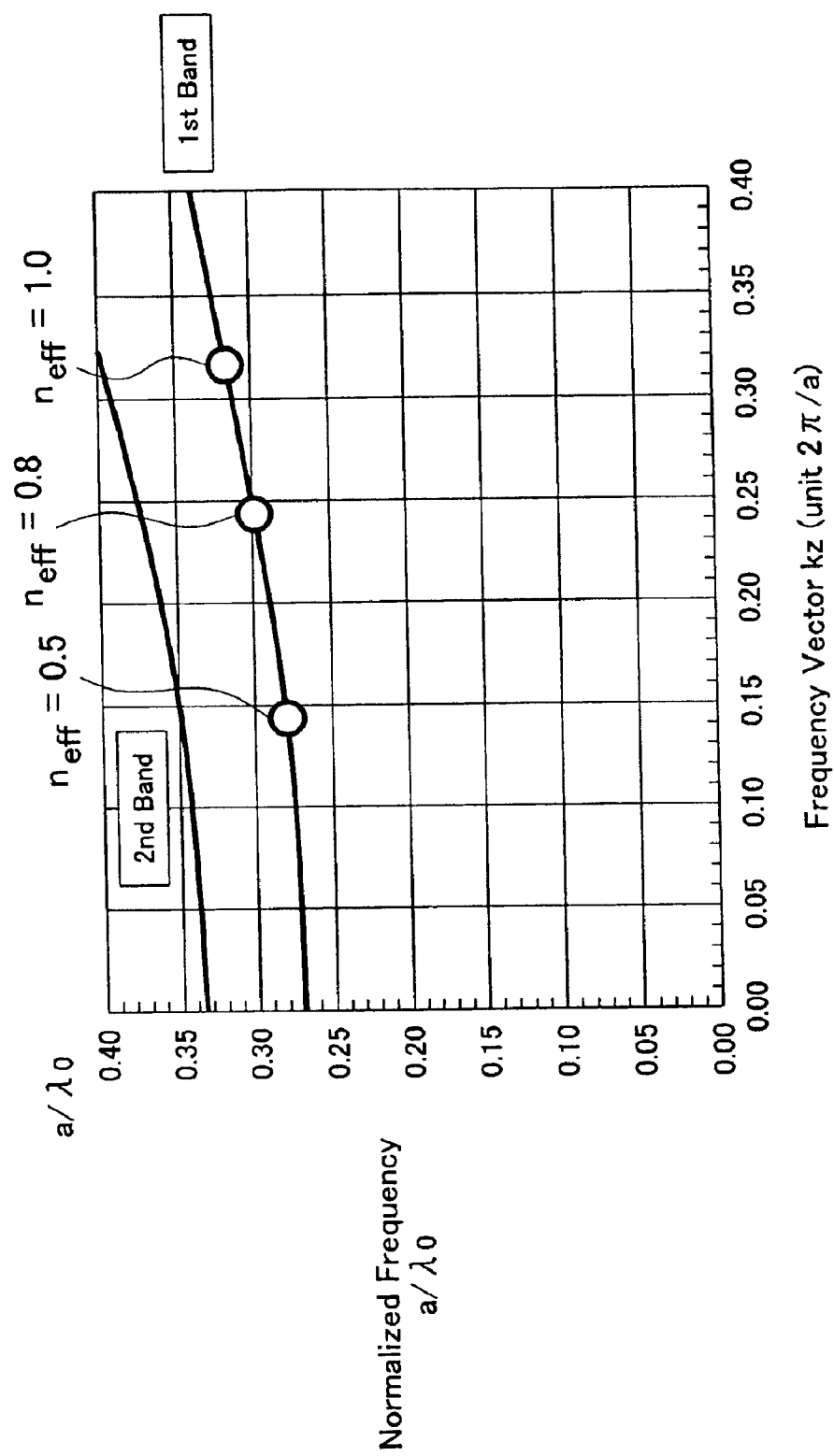
FIG. 38 is a diagram showing a photonic band of a one-dimensional photonic crystal used in a calculation example of a diffraction grating.

A calculation example of such a one-dimensional photonic crystal will now be described with reference to FIG. 38. FIG. 38 shows a photonic band (photonic band on Brillouin zone boundary) of the TE polarization of a one-dimensional photonic crystal having a period only in one direction (Y axis direction) in the same manner as the one-dimensional photonic crystal 50 illustrated in FIG. 13. In the one-dimensional photonic crystal having the photonic band of FIG. 38, the first substance having refractive index 2.10 and a second substance having refractive index 1.45 are alternately superimposed in period a (the thickness of the first substance being 0.3a and the second substance being 0.7a). With regard to the first band shown in FIG. 38, the K value (the value of constant K defined in equation 3) is calculated by obtaining the specific values of:

two points near the effective refractive index $n_{\textit{eff}}$=1;

two points near the effective refractive index $n_{\textit{eff}}$=0.8; and two points near the effective refractive index $n_{\textit{eff}}$=0.5.

The calculation result is shown in table 1.

TABLE 1

| Effective Refractive Index (Approximate Value) | Standardized Frequency ω | Z Axis Direction Wave Number Vector kz (unit 2 π/a) | Z Axis Direction Wavelength λ = 2 π/kz | Δω/ω0 (Upper Row is ω0) | Δλ/λ0 (Upper Row is λ0) | K Value |
| --- | --- | --- | --- | --- | --- | --- |
| 1.0 | 0.319 | 0.3175 | 3.1496a | 0.0031348 | −0.010903 | 3.474 |
|  | 0.320 | 0.3210 | 3.1153a |  |  |  |
| 0.8 | 0.298 | 0.2360 | 4.2373a | 0.0033557 | −0.017894 | 5.333 |
|  | 0.299 | 0.2403 | 4.1615a |  |  |  |
| 0.5 | 0.2800 | 0.1393 | 7.1788a | 0.0017857 | −0.024510 | 13.73 |
|  | 0.2805 | 0.1428 | 7.0028a |  |  |  |

It is apparent from table 1 that the absolute value of K greatly exceeds 2 due to the one-dimensional photonic crystal having the photonic band of FIG. 38.

One side of the one-dimensional photonic crystal having the photonic band of FIG. 38 is processed to a reflective blazed grating in the same manner as the reflective blazed grating 16A of FIGS. 3 and 4, and a phase grating was arranged on the other side to form a model of a diffraction device. The model is shown in FIG. 39.

Figure 39:
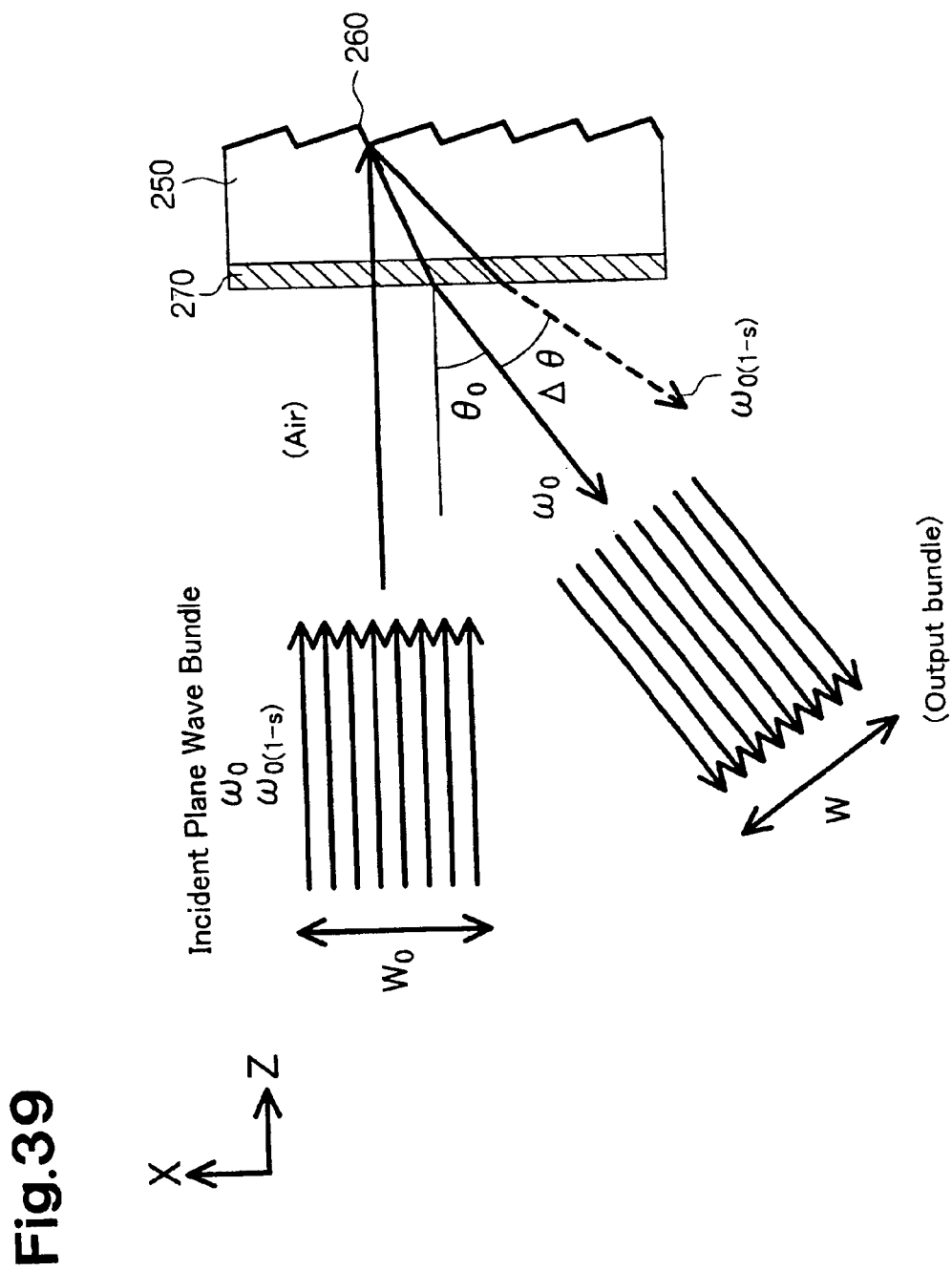
FIG. 39 is an explanatory diagram used in a calculation example of a reflective blazed grating.
Figure 40:
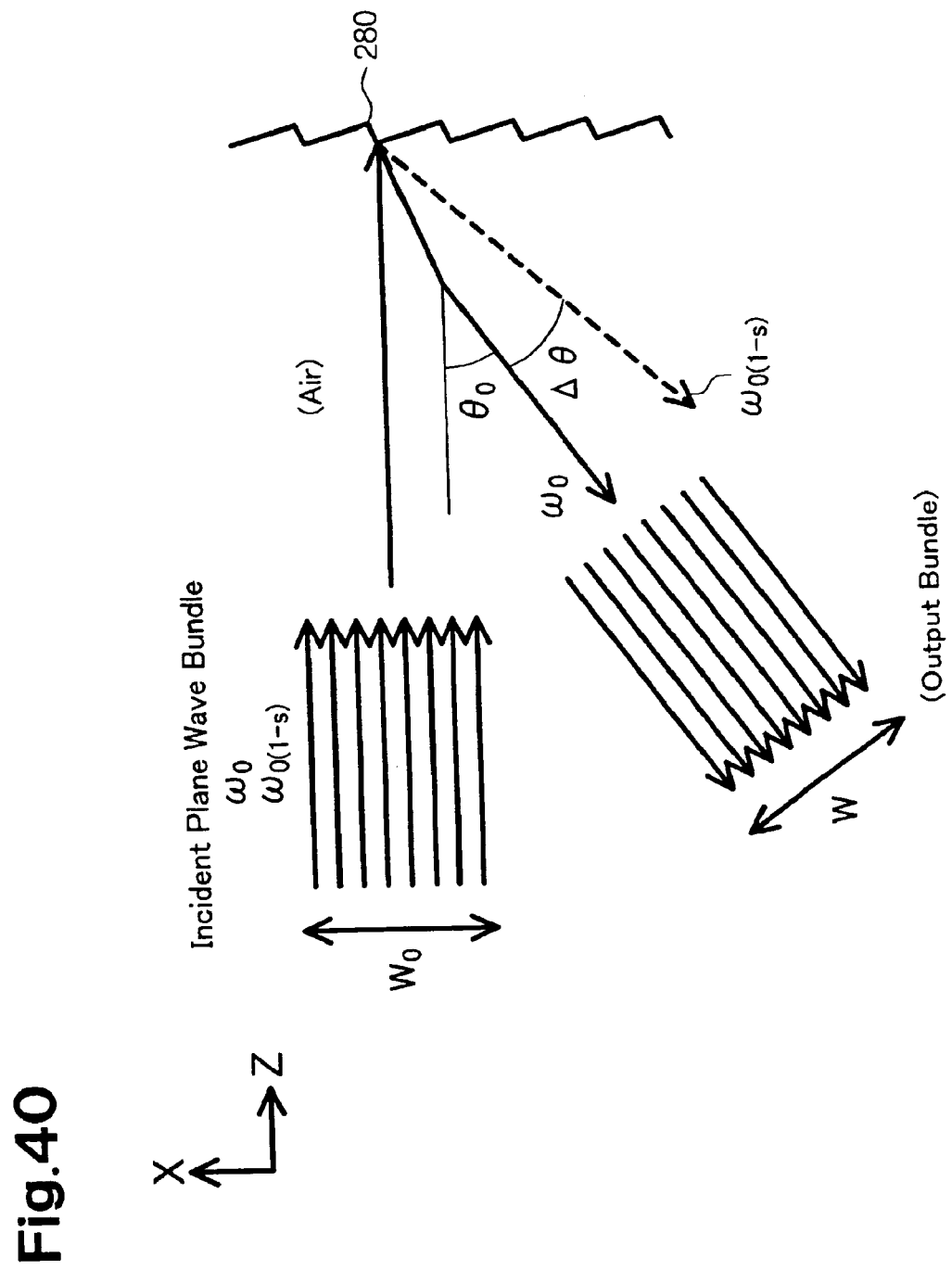
FIG. 40 is an explanatory diagram used in a calculation example of a normal reflective blazed grating.

In the diffraction device of FIG. 39, a slab waveguide 250 is formed by a one-dimensional photonic crystal in the same manner as the slab waveguide 15A of FIG. 3. A reflective blazed grating 260 and a phase grating 270 respectively correspond to the reflective blazed grating 16A and phase grating 17 of FIG. 3. FIG. 40 shows a reflective blazed grating 280 in air compared with the diffraction device of FIG. 39.

The following are determined in the model of FIGS. 39 and 40:

reference wavelength in vacuum $\lambda_0$ (reference normalized frequency $\omega_0$=2πc/$\lambda_0$);

frequency fluctuation ratio s (ratio of frequency fluctuation amount relative to reference frequency $W_0$);
width of incident plane wave bundle $W_0$;
period of the reflective blazed grating 260 L;
diffraction order m;
refractive index of photonic crystal at reference wavelength (effective refractive index) $n_p$; and
K value.

By using the above equations and law of refraction, the following are obtained:
angle of output bundle of reference wavelength $\theta_0$;
angle fluctuation of output bundle $\Delta\theta$; and
width of output bundle $W=W_0 \cdot \cos\theta_0$.

The following are basic equations described above:

$$\sin\theta d = (m/L)\lambda B + (\lambda B/\lambda A)\sin\theta i; \text{ and}$$

$$\sin\theta d' = (m/L)\lambda B(1+sKB) + (\lambda B/\lambda A)\{(1+sKB)/(1+sKA)\}\sin\theta i.$$

The following are assigned in the equations:

reference wavelength in photonic crystal $\lambda A = \lambda B = \lambda_0$;

incident angle $\theta i = 0$; and

K value $KA = Kb = K$.

As a result, the output angle $\theta d$ and $\theta d'$ in the photonic crystal are as follows:

$$\sin\theta d = (m/L)\lambda; \text{ and}$$

$$\sin\theta d' = (m/L)\lambda(1+sK).$$

The output angle $\theta_0$ and $\theta_0'$ in air are easily obtained from the law of refraction, which are:

$$\sin\theta_0 = n_p \cdot \sin\theta d; \text{ and}$$

$$\sin\theta_0' = n_p \cdot \sin\theta d'.$$

The angle fluctuation in air is $\Delta\theta = \theta_0' - \theta_0$, and the width of the output bundle is $W = W_0 \cdot \cos\theta_0$.

The calculation results of the models of FIGS. 39 and 40 are shown in table 2. In both models, the reference wavelength is 1550 nm, the wavelength interval is 0.8 nm (100 GHz), and the diffraction order is 1.

COMPARISON EXAMPLE 1

Comparison example 1 shown in table 2 corresponds to the model shown in FIG. 40, satisfies the conditions of $n_p=1$ and K=1, and corresponds to a structure in which the reflective blazed grating 280 is arranged in air.

CALCULATION EXAMPLE 1

In calculation example 1 of table 2 using the model of FIG. 39, the effective refractive index of the photonic crystal is 1.0 (K=3.474) and the period of the reflective blazed grating 260 is the same as that of comparative example 1. The values of the output angle $\theta_0$ and the output bundle width W are the same. However, the angle fluctuation $\Delta\theta$ is about 6.2 times greater. Therefore, when converging the output light with a lens, the frequency difference that may be resolved is 1/6.2, and the frequency resolution ($\omega_0/\Delta\omega$) is improved.

In calculation example 2 of table 2 using the model of FIG. 39, the effective refractive index of the photonic crystal is 0.8 (K=5.333) and the period of the reflective blazed grating 260 is the same as that of comparative example 1 and calculation example 1. Since the output angle $\theta_0$ increases, the output bundle width W is slightly decreased. However, the angle fluctuation $\Delta\theta$ is about 18 times greater than that of comparative example 1. Therefore, the frequency resolution ($\omega_0/\Delta\omega$) is drastically improved from calculation example 1.

CALCULATION EXAMPLE 3

In calculation example 3 of table 2 using the model of FIG. 39, the effective refractive index of the photonic crystal is 0.5 (K=13.73) and the period of the reflective blazed grating 260 is 4 times greater than that of. Comparative example 1. The values of the output angle $\theta_0$ and the output bundle width W are the same as comparative example 1. However, the angle fluctuation amount $\Delta\theta$ is about 28 times greater. Therefore, the frequency resolution ($\omega_0/\Delta\omega$) is drastically improved.

In this calculation example, the mN value is decreased to ¼ of that of comparative example 1. However, the frequency resolution is increased. Further, the value of L is relatively large. Thus, the processing of the reflective blazed grating 260 is facilitated.

CALCULATION EXAMPLE 4

In calculation example 4 of table 2 using the model of FIG. 39, the effective refractive index of the photonic crystal is 0.8 (K=5.333), the grating period L is 4 μm (the same as comparative example 1), and the incident bundle width $W_0$ is decreased. In contrast to comparison example 1, the output bundle width W is decreased. However, since the angle fluctuation $\Delta\theta$ is large, the same frequency resolution ($\omega_0/\Delta\omega$) may be expected. Even if the frequency resolution ($\omega_0/\Delta\omega$) is the same, the incident bundle width is about ⅛ of that of comparison example 1. Thus, the size of the entire diffraction device may be drastically reduced.

TABLE 2

| | Value In Vacuum | | | Diffraction Grating | | | | |
| --- | --- | --- | --- | --- | --- | --- | --- | --- |
| | Frequency Fluctuation Rate s | Reference Wavelength (nm) $\lambda 0$ | Fluctuation Wavelength (nm) $\lambda 0(1+s)$ | Light Bundle Width (nm) WO | Grating Period (μm) L | Number of Steps N | Diffraction Order m | mN mN |
| Comparative Example 1 | 0.000516 | 1550.00 | 1550.80 | 10 | 4 | 2500 | 1 | 2500 |
| Calculation Example 1 | 0.000516 | 1550.00 | 1550.80 | 10 | 4 | 2500 | 1 | 2500 |
| Calculation Example 2 | 0.000516 | 1550.00 | 1550.80 | 10 | 4 | 2500 | 1 | 2500 |
| Calculation Example 3 | 0.000516 | 1550.00 | 1550.80 | 10 | 16 | 625 | 1 | 625 |
| Calculation Example 4 | 0.000516 | 1550.00 | 1550.80 | 1.2 | 4 | 300 | 1 | 300 |

TABLE 2-continued

| | Photonic Crystal | | | | Output Side Free Space (n = 1) | | | |
|---|---|---|---|---|---|---|---|---|
| | Reference Refractive Index np | Reference Wavelength (nm) λ | K Value K | Fluctuated Wavelength λ(1 + sk) | Fluctuated Refractive Index np' | Reference Output Angle (°) θ0 | Fluctuated Output Angle (°) θ0' | Flucutation (°) θΔ | Output Bundle Width (mm) W |
| Comparative Example 1 | 1 | 1550.00 | 1 | 1550.80 | 1.0000 | 22.799 | 22.811 | 0.012 | 9.219 |
| Calculation Example 1 | 1 | 1550.00 | 3.474 | 1552.78 | 0.9987 | 22.799 | 22.873 | 0.074 | 9.219 |
| Calculation Example 2 | 0.8 | 1937.50 | 5.333 | 1942.83 | 0.7982 | 37.263 | 37.481 | 0.218 | 7.959 |
| Calculation Example 3 | 0.5 | 3100.00 | 13.73 | 3121.96 | 0.4967 | 22.799 | 23.129 | 0.330 | 9.219 |
| Calculation Example 4 | 0.8 | 1937.50 | 5.333 | 1942.83 | 0.7982 | 37.263 | 37.481 | 0.218 | 0.955 |

[Calculation Example of AWG]

Figure 41:
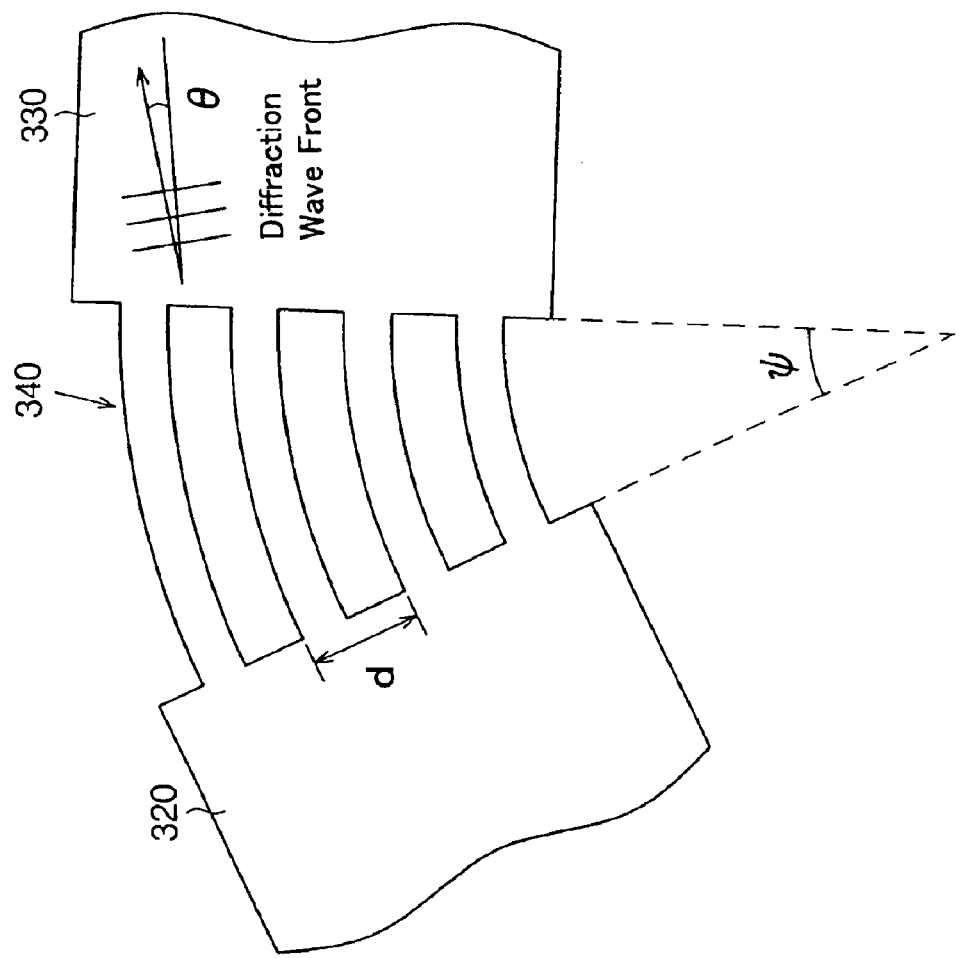
FIG. 41 is an explanatory diagram used in a calculation example of an arrayed waveguide diffraction grating.

In the same manner as the fourth embodiment shown in FIG. 7, an arrayed waveguide grating (AWG) functioning as a diffraction device is schematically shown in FIG. 41. In FIG. 41, a slab waveguide 320, a slab waveguide 330, and an arrayed waveguide 340 respectively correspond to the input slab waveguide 32, the output slab waveguide 33, and the arrayed waveguide 34 of FIG. 7.

A plurality of waveguides forming the arrayed waveguide 340 are arranged concentrically at intervals d with a center angle of ψ. Each waveguide is formed by a one-dimensional photonic crystal having refractive index np (reference refractive index) at the reference wavelength. The output side is free space having refractive index ns. The phase gratings 37 and 38 of the fourth embodiment are abbreviated in FIG. 41. In the arrayed waveguide 340, the difference between the lengths of adjacent waveguides is ψd, and the phase difference is $(2\pi n_p/\lambda_0)\psi d$. When the direction of a diffracted wave front in the free space is θ, the following is obtained from the diffraction equation:

$(2\pi n_p/\lambda_0)\psi d - (2\pi n_s/\lambda_0)d \sin \theta = 2\pi m$ (m is diffraction order).

From the above equation, the following equation may be obtained:

$\sin \theta = (n_p \psi d - m\lambda_0)/dn_s$

The directional angle of the diffraction wave front when the input frequency fluctuates by s may be calculated as follows:

$\lambda_0 \to \lambda_0(1+s)$; and $n_p \to n_p' = n_p(1+s)/(1+sK)$.

Under the conditions of d=10 μm and $n_s$=1.45, the output side angle fluctuation amount Δθ=θ'−θ was calculated.

These calculation results are shown in table 3. An integer in which θ is closest to 0 was selected as the diffraction order m.

COMPARATIVE EXAMPLE 1

Under the conditions of ψ=π/2, $n_p$=1.45, and K=1, in comparative example 1 of table 3 uses homogeneous quartz as the material of each waveguide of the arrayed waveguide 40. The refractive index fluctuation of quartz resulting from frequency is ignored.

CALCULATION EXAMPLES 1, 2, AND 3

The photonic crystal forming each waveguide of the arrayed waveguide 340 in each of calculation examples 1, 2, and 3 of table 3 has an effective refractive index $n_p$ of 1.0 (K=3.474), 0.8 (K=5.333), and 0.5 (K=13.73), respectively. The other conditions are the same as comparative example 1. If $n_p$ decreases, the diffraction order m decreases. However, due to the effect that increases the K value, the angle fluctuation Δθ is greater than that of comparison example 1. Accordingly, the frequency resolution ($\omega_0/\Delta\omega$) is further increased.

CALCULATION EXAMPLE 4

The photonic crystal forming each waveguide of the arrayed waveguide 340 in calculation example of table 3 has an effective refractive index of 0.8 (K=5.333) and a center angle ψ that is adjusted so that the angle fluctuation Δθ is substantially the same as that of comparison example 1. The center angle is 0.53 and decreased to about ⅓. The size of the entire diffraction device serving as an arrayed waveguide diffraction grating may be reduced by the same frequency resolution ($\omega_0/\Delta\omega$).

TABLE 3

| | Value In Vacuum | | | Structure of AWG | | |
|---|---|---|---|---|---|---|
| | Frequency Fluctuation Rate s | Reference Wavelength (nm) λ0 | Fluctuation Wavelength (nm) λ0(1 + s) | Waveguide Interval (nm) d | Center Angle (rad) ψ | Free Space Refractive Index ns |
| Comparative Example 1 | 0.000516 | 1550.00 | 1550.80 | 10000 | 1.5708 | 1.45 |
| Calculation Example 1 | 0.000516 | 1550.00 | 1550.80 | 10000 | 1.5708 | 1.45 |
| Calculation Example 2 | 0.000516 | 1550.00 | 1550.80 | 10000 | 1.5708 | 1.45 |
| Calculation Example 3 | 0.000516 | 1550.00 | 1550.80 | 10000 | 1.5708 | 1.45 |
| Calculation Example 4 | 0.000516 | 1550.00 | 1550.80 | 10000 | 0.53 | 1.45 |

TABLE 3-continued

| | Propogation of Reference Wavelength | | | | Propogation of Fluctuated Wavelength | | | |
|---|---|---|---|---|---|---|---|---|
| | Waveguide Reference Refractive Index np | Reference Wavelength (nm) λ | Diffraction Order m | Reference Wavelength Output Angle (°) θ | K Value K | Flucutated Wavelength (nm) λ(1 + sk) | Refractive Index λ0(1 + s)/ λ(1 + sk) | Fluctuated Output Angle (°) θ0' | Angle Flucutation (°) θΔ |
| Comparative Example 1 | 1.45 | 1068.97 | 15 | −1.871 | 1 | 1069.52 | 1.4500 | −1.919 | −0.0047 |
| Calculation Example 1 | 1 | 1550.00 | 10 | 0.822 | 3.474 | 1552.78 | 0.9987 | 0.711 | −0.111 |
| Calculation Example 2 | 0.8 | 1937.50 | 8 | 0.658 | 5.333 | 1942.83 | 0.7982 | 0.522 | −0.136 |
| Calculation Example 3 | 0.5 | 3100.00 | 5 | 0.411 | 13.73 | 3121.96 | 0.4967 | 0.193 | −0.218 |
| Calculation Example 4 | 0.8 | 1937.50 | 3 | −1.620 | 5.333 | 1942.83 | 0.7982 | −1.667 | −0.047 |

[Modifications]

It should be apparent to those skilled in the art that the present invention may be embodied in many other specific forms without departing from the spirit or scope of the invention. Particularly, it should be understood that the present invention may be embodied in the following forms.

In the first to third embodiments, reflective layers 21, such as metal films, are used to perform confinement in the vertical direction (Y axis direction). However, the photonic crystal 101, which has a periodic multilayer film structure, of FIG. 34 may be used in lieu of the reflective layers 21.

In the first to third embodiments, the surfaces of the reflective blazed gratings 16, 16A, and 16B are respectively covered by the reflective layers 160, 160A, and 160B, which are metal layers or the like. However, the present invention may be applied to a structure that does not have reflective layers.

In the first to third embodiments, there are four output optical fibers. However, the present invention may be modified to includes any number of output optical fibers.

In the second and third embodiments, the input surfaces of the slab waveguide 15A and 15B may have input surfaces with a positive lens effect in lieu of the lens element with the convex lens effect, such as the collimator lens 23 and the cylindrical lens 24, or together with such a lens element.

Although the waveguides in the arrayed waveguide 34 of FIGS. 7 and 8 and the waveguides in the arrayed waveguide 44 are each formed by a one-dimensional photonic crystal having a periodic characteristic in one direction (the Y axis direction), the present invention is not restricted to such structure. In the present invention, these waveguides may be formed by a diffraction device using a photonic crystal having a structure that differs from that of the one-dimensional photonic crystal.

In addition to the one-dimensional photonic crystal, which is a periodic multilayer film as described in each of the above embodiments, linear photonic crystal waveguides include the photonic crystals shown in FIGS. 42A, 42B, 42C, and 42D and photonic crystals having a structure in which the K value is large in the propagation direction.

Figure 42A:
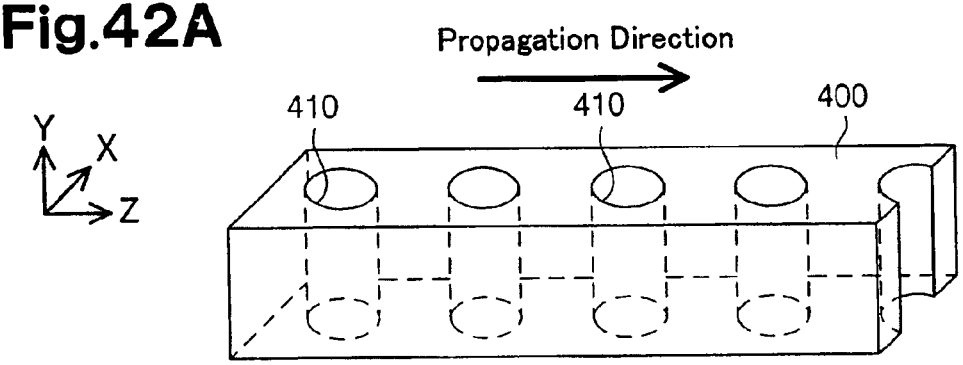
FIG. 42A is a perspective view showing a modification of a photonic crystal.

In the photonic crystal of FIG. 42A, a plurality of holes 410 are formed in a periodic manner in the propagation direction (Z axis direction) in a rectangular waveguide 400, which is formed from a homogeneous medium.

Figure 42B:
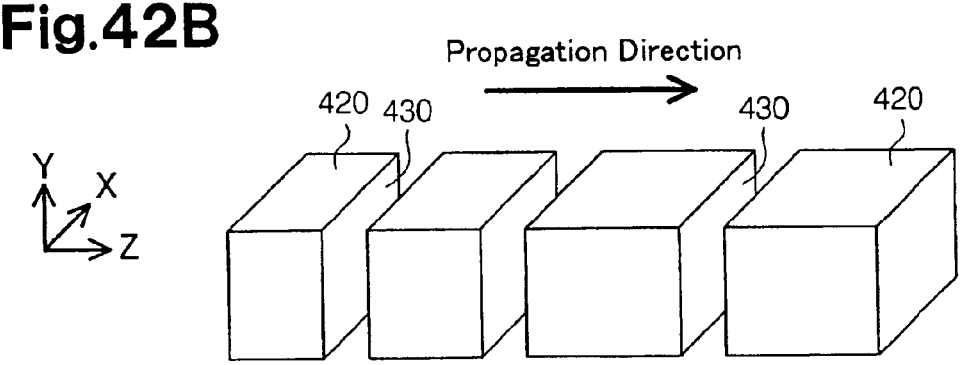
FIG. 42B is a perspective view showing a further modification of a photonic crystal.

In the photonic crystal of FIG. 42B, a plurality of grooves 430 are formed in a periodic manner in the propagation direction (Z axis direction) in the waveguide 420, which is formed from a homogeneous medium.

Figure 42C:
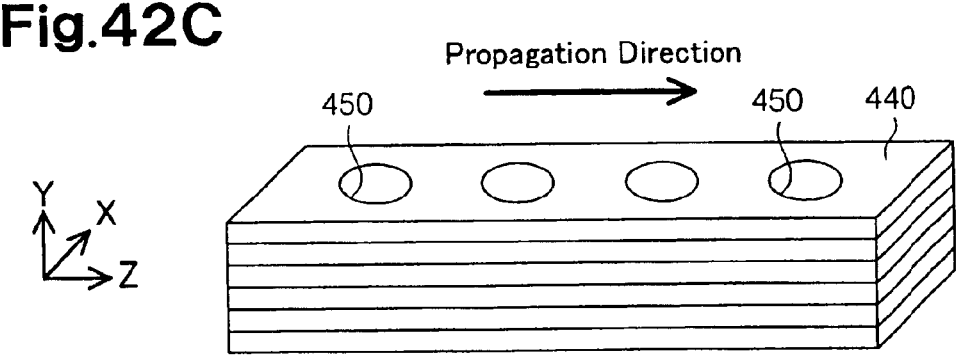
FIG. 42C is a perspective view showing a further modification of a photonic crystal.

In FIG. 42C, a plurality of holes 450 are formed in a periodic manner in the propagation direction (Z axis direction) in a one-dimensional photonic crystal 440 having a periodic characteristic in one direction (Y axis direction).

Figure 42D:
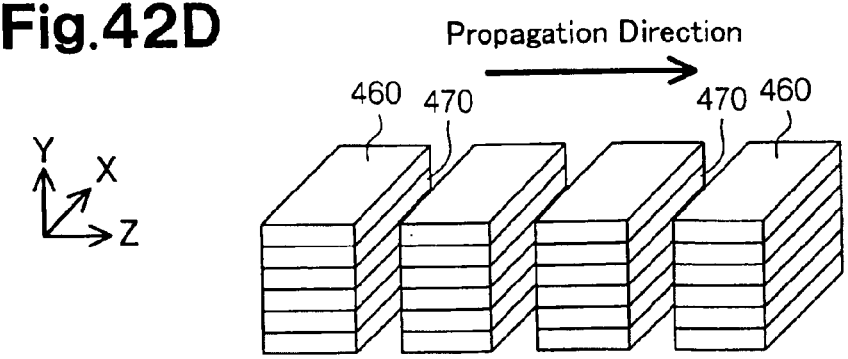
FIG. 42D is a perspective view showing a further modification of a photonic crystal.

In FIG. 42D, a plurality of grooves 470 are formed in a periodic manner in the propagation direction (Z axis direction) in a one-dimensional photonic crystal 460 having a periodic characteristic in one direction (Y axis direction).

In the sixth embodiment, among the input medium and the output medium contacting the diffraction device 11, the output medium is described as being formed by the one-dimensional photonic crystal 13. However, the present invention is not restricted to such structure. The present invention may be modified such that the input medium with the one-dimensional photonic crystal 13 is formed in the same manner as example (c), both mediums with the one-dimensional photonic crystal 13 are formed in the same manner as example (d), or both mediums with the same one-dimensional photonic crystal are formed in the same manner as example (e). In each case, the advantages of the sixth embodiment are obtained.

The present examples and embodiments are to be considered as illustrative and not restrictive, and the invention is not to be limited to the details given herein, but may be modified within the scope and equivalence of the appended claims.

What is claimed is:

1. A diffraction device for periodically dividing an electromagnetic wave, the diffraction device comprising:

a diffraction grating;

an input medium contacting the diffraction grating; and an output medium contacting the diffraction grating, with at least either one of the input medium and output medium comprising a photonic crystal having a periodic characteristic in single direction, or the diffraction grating comprising a photonic crystal, which periodically divides electromagnetic waves to produce a phase difference in a wave front with differences in optical propagation distances between the divided electromagnetic waves, wherein the photonic crystal satisfies the condition of $$2 \leq |(\Delta\lambda/\lambda_0)/(\Delta\omega/\omega_0)|,$$

whereas $\lambda_0$ represents the wavelength of a propagating wave when an electromagnetic wave having frequency $\omega_0$ propagates in a specific direction in the photonic crystal, and $\Delta\lambda$ represents the change of wavelength relative to an electromagnetic wave having frequency $\Delta\omega+\omega_0$ when the frequency $\omega_0$ is changed by a slight amount.

2. A diffraction device for periodically dividing an electromagnetic wave, the diffraction device comprising:

a diffraction grating;

an input medium contacting the diffraction grating; and an output medium contacting the diffraction grating, with at least either one of the input medium and output medium comprising a photonic crystal having a periodic characteristic in single direction, or the diffraction grating comprising a photonic crystal, which periodically divides electromagnetic waves to produce a phase difference in a wave front with differences in optical propagation distances between the divided electromagnetic waves, wherein the photonic crystal includes a periodic direction and said at least either one of the input medium and the output medium comprising the photonic crystal, includes end surfaces perpendicular to the periodic direction of the photonic crystal as an input surface and an output surface, the photonic crystal includes a photonic band gap and a photonic band in the vicinity of the photonic band gap, and the electromagnetic waves entering the input surface are propagated by the photonic band.

3. A diffraction device for periodically dividing an electromagnetic wave, the diffraction device comprising:

a diffraction grating;

an input medium contacting the diffraction grating; and an output medium contacting the diffraction grating, with at least either one of the input medium and output medium comprising a photonic crystal having a periodic characteristic in single direction, or the diffraction grating comprising a photonic crystal, which periodically divides electromagnetic waves to produce a phase difference in a wave front with differences in optical propagation distances between the divided electromagnetic waves, wherein the photonic crystal includes end surfaces from which the periodic characteristic is exposed as an input surface and an output surface, a photonic band structure having a line, which is ether a Brillouin zone boundary line or a central line, and a photonic band, and electromagnetic waves entering the input surface are propagated by one of:

the photonic band, which exists on the Brillouin zone boundary line of the photonic band structure or in the vicinity of the Brillouin zone boundary line; and the photonic band, which exists on the central line of the photonic band structure or in the vicinity of the central line.

4. The diffraction device according to claim 3, wherein the photonic crystal includes an end surface parallel in the periodic direction of the photonic crystal as an input surface and an output surface, the photonic crystal including a period, the diffraction device further comprising:

an input phase modulating unit for generating a phase modulation wave having period that is the same as or two times the period of the photonic crystal, wherein the input phase modulating unit is arranged contacting, near, or integrally with the input surface.

5. The diffraction device according to claim 4, wherein the phase modulating unit is a phase grating having a period that is the same as or two times the period of the photonic crystal.

6. The diffraction device according to claim 3, wherein the photonic crystal outputs wave, the diffraction device further comprising:

an output phase modulating unit for converting the light output from the photonic crystal to a plane wave, with the output phase modulating unit arranged contacting, near, or integrally with the output surface.

7. The diffraction device according to claim 3, wherein the photonic crystal has a periodic direction and an inclined input surface or inclined output surface that is inclined relative to the periodic direction of the photonic crystal, and inputs a plane wave to the inclined input surface or outputs a plane wave from the inclined output surface.

8. A diffraction device for periodically dividing an electromagnetic wave, the diffraction device comprising:

a diffraction grating;

an input medium contacting the diffraction grating; and an output medium contacting the diffraction grating, with at least either one of the input medium and output medium comprising a photonic crystal having a periodic characteristic in single direction, or the diffraction grating comprising a photonic crystal, which periodically divides electromagnetic waves to produce a phase difference in a wave front with differences in optical propagation distances between the divided electromagnetic waves, wherein the photonic crystal has an end surface, which includes a reflective diffraction grating that comprises said diffraction grating, and when electromagnetic waves including plural frequency components are input to the photonic crystal, the reflective diffraction grating produces diffracted wave for each of the plural frequency components of the electromagnetic wave in different directions.

9. The diffraction device according to claim 8, the diffraction device may be used with an electromagnetic wave detector and the photonic crystal includes a periodic direction and the input medium and the output medium both comprise the photonic crystal and form a waveguide having an input surface and end surface parallel to the periodic direction of the photonic crystal, with the reflective diffraction grating comprising a blazed reflective diffraction grating arranged in the end surface of the waveguide, and the diffraction device forming a demultiplexer for outputting electromagnetic waves, which include plural frequency components input from the input surface of the waveguide, with the blazed reflective diffraction grating from the input surface as diffraction waves in different directions for each frequency component to couple the electromagnetic waves with the electromagnetic wave detector or the waveguide.

10. The diffraction device according to claim 9, further comprising:

a lens element having a convex lens effect to input the electromagnetic waves including plural frequency components to the input surface of the waveguide as parallel light bundle, wherein electromagnetic waves output from the waveguide are collected by the lens element and coupled with the electromagnetic wave detector when used therewith or the waveguide.

11. The diffraction device according to claim 9, wherein the input surface of the waveguide comprises a convex lens-like input surface, with the electromagnetic waves including plural frequency components being input to the waveguide as a parallel light bundle produced by the convex lens-like input surface, and collected light bundle produced by the input surface of the convex lens-like surface from the electromagnetic wave output from the photonic crystal in different directions for each frequency component coupled with the electromagnetic wave detector when used therewith or the waveguide.

12. The diffraction device according to claim 9, wherein the blazed reflective diffraction grating has a concave mirror-like diffraction grating surface and collects electromagnetic waves separated into frequency components with the concave mirror-like diffraction grating surface and outputs the collected electromagnetic waves from the waveguide.

13. The diffraction device according to claim 9, wherein the waveguide is a slab waveguide.

14. The diffraction device according to claim 9, wherein the photonic crystal includes a period, the diffraction device further comprising:
   an input phase modulating unit for generating a phase modulation wave having a period that is the same as or two times the period of the photonic crystal, wherein the input phase modulating unit is arranged contacting, near, or integrally with the input surface of the waveguide.

15. The diffraction device according to claim 14, wherein the input phase modulating unit is a phase grating having a period that is the same as or two times the period of the photonic crystal.

16. A diffraction device for periodically dividing an electromagnetic wave, the diffraction device comprising:
   a diffraction grating;
   an input medium contacting the diffraction grating; and
   an output medium contacting the diffraction grating, with at least either one of the input medium and output medium comprising a photonic crystal having a periodic characteristic in single direction, or the diffraction grating comprising a photonic crystal, which periodically divides electromagnetic waves to produce a phase difference in a wave front with differences in optical propagation distances between the divided electromagnetic waves, and
   an array waveguide diffraction grating including an input slab waveguide connected to the input waveguide, an output slab waveguide connected to output waveguide, and an arrayed waveguide connected between the two slab waveguides and generating an optical path length difference, with the arrayed waveguide comprised of the photonic crystal as the diffraction grating that periodically divides electromagnetic waves and produces a phase difference in the wave fronts of the divided electromagnetic waves.

17. The diffraction device according to claim 16, wherein the arrayed waveguide includes a plurality of waveguides, each comprised of the photonic crystal, and adjacent waveguides have different lengths.

18. The diffraction device according to claim 16, wherein the arrayed waveguide includes a plurality of waveguides, each comprised of the photonic crystal with adjacent waveguides having the same length, and by changing the period, material, or configuration of the photonic crystal comprising each of the waveguides, an optical path length difference is produced between adjacent waveguides.

19. The diffraction device according to claim 16, wherein the input waveguide, the input slab waveguide, and the arrayed waveguide each have an input surface, the diffraction device further comprising:
   an input phase modulating unit for generating a phase modulating wave having a period that is the same or two times the period of the photonic crystal configuring the arrayed waveguide, with the phase modulating unit arranged contacting, near, or integrally with one of the input surface of the input waveguide, the input surface of the input slab waveguide, and the input surface of the arrayed waveguide.

20. The diffraction device according to claim 16, wherein the output waveguide, the output slab waveguide, and the arrayed waveguide each have an output surface, the diffraction device further comprising:
   an output phase modulating unit for converting wave output from the arrayed waveguide to a plane wave, with the output phase modulating unit arranged contacting, near, or integrally with one of the output surface of the output waveguide, the output surface of the output slab waveguide, and the output surface of the arrayed waveguide.

21. The diffraction device according to claim 16, the photonic crystal includes a period and the phase modulating unit is a phase grating having a period that is the same or two times the period of the photonic crystal configuring the arrayed waveguide.

* * * * *

UNITED STATES PATENT AND TRADEMARK OFFICE
CERTIFICATE OF CORRECTION

PATENT NO.    : 6,968,096 B2
DATED         : November 22, 2005
INVENTOR(S)   : Shigeo Kittaka et al.

It is certified that error appears in the above-identified patent and that said Letters Patent is hereby corrected as shown below:

Column 1,
Line 50, delete "$\lambda_{0/\Delta\lambda=}1937.5=mN$", and insert -- $\lambda_0/\Delta\lambda=1937.5 = mN$ --.

Column 2,
Line 42, delete "$2 \leq |(\Delta\lambda/\lambda_O/(\Delta\omega/\omega_O)|$,", and insert -- $2 \leq |(\Delta\lambda/\lambda_0)/(\Delta\omega/\omega_0)|$, --.

Column 11,
Line 67, delete "$2 \leq |K| = |(\Delta\lambda/\lambda_O)/(\Delta\omega/\omega_O)|$", and insert -- $2 \leq |K| = |(\Delta\lambda/\lambda_0)/(\Delta\omega/\omega_0)|$ --.

Column 13,
Line 30, delete "$2 \leq |K| = |(\Delta\lambda/\lambda_O)/(\Delta\omega/\omega_O)|$", and insert -- $2 \leq |K| = |(\Delta\lambda/\lambda_0)/(\Delta\omega/\omega_0)|$ --.

Column 17,
Line 48, delete "$2 \leq |K| = |(\Delta\lambda/\lambda_O)/(\Delta\omega/\omega_O)|$", and insert -- $2 \leq |K| = |(\Delta\lambda/\lambda_0)/(\Delta\omega/\omega_0)|$ --.

Column 20,
Line 40, delete "$2 \leq |K| = |(\Delta\lambda/\lambda_O)/(\Delta\omega/\omega_O)|$", and insert -- $2 \leq |K| = |(\Delta\lambda/\lambda_0)/(\Delta\omega/\omega_0)|$ --.
Line 45, delete "$(\omega_0/A\Delta\omega)$", and insert -- $(\omega_0/\Delta\omega)$ --.

Column, 22,
Line 22, delete "riot", and insert -- not --.

Column 28,
Line 34, delete "$t_m$", and insert -- $t_M$ --.
Line 35, delete "$n_m$", and insert -- $n_M$ --.

Column 34,
Line 27, delete "of. Comparative example 1.", and insert -- of comparative example 1. --.

UNITED STATES PATENT AND TRADEMARK OFFICE
CERTIFICATE OF CORRECTION

PATENT NO. : 6,968,096 B2
DATED : November 22, 2005
INVENTOR(S) : Shigeo Kittaka et al.

It is certified that error appears in the above-identified patent and that said Letters Patent is hereby corrected as shown below:

Column 38,
Line 55, delete "$2 \leqq |(\Delta\lambda/\lambda_0)/(\Delta\omega/\omega_0)|,$", and insert -- $2 \leq |(\Delta\lambda/\lambda_0)/(\Delta\omega/\omega_0)|,$ --.

Signed and Sealed this

Twenty-eighth Day of February, 2006

JON W. DUDAS
*Director of the United States Patent and Trademark Office*